(12) United States Patent
Sano et al.

(10) Patent No.: US 7,978,957 B2
(45) Date of Patent: Jul. 12, 2011

(54) INFORMATION PROCESSING APPARATUS AND METHOD, AND PROGRAM

(75) Inventors: Ikuya Sano, Kanagawa (JP); Yomei Otani, Tokyo (JP); Yoshihiro Toyama, Kanagawa (JP); Kenji Yokoyama, Tokyo (JP); Zhongyao Sheng, Tokyo (JP); Hiroshi Oryoji, Kanagawa (JP); Masashige Hagimori, Kanagawa (JP)

(73) Assignee: Sony Corporation, Tokyo (JP)

( * ) Notice: Subject to any disclaimer, the term of this patent is extended or adjusted under 35 U.S.C. 154(b) by 1310 days.

(21) Appl. No.: 11/518,190

(22) Filed: Sep. 11, 2006

(65) Prior Publication Data

US 2007/0061843 A1  Mar. 15, 2007

(30) Foreign Application Priority Data

Sep. 13, 2005 (JP) ................................. 2005-265376
Oct. 3, 2005 (JP) ................................. 2005-290316

(51) Int. Cl.
*H04N 5/76* (2006.01)

(52) U.S. Cl. ........................................ 386/291; 386/299

(58) Field of Classification Search .......... 386/1, 45–46, 386/83, 125–126
See application file for complete search history.

(56) References Cited

U.S. PATENT DOCUMENTS

| | | | |
|---|---|---|---|
| 6,538,684 B1 | 3/2003 | Sasaki | |
| 2002/0012517 A1 | 1/2002 | Ichioka et al. | |
| 2002/0124256 A1 | 9/2002 | Suzuka | |
| 2002/0168178 A1 | 11/2002 | Rodriguez et al. | |
| 2002/0184637 A1 | 12/2002 | Perlman | |
| 2005/0044570 A1 | 2/2005 | Poslinski | |
| 2006/0140584 A1* | 6/2006 | Ellis et al. ........................ 386/83 |
| 2007/0061843 A1* | 3/2007 | Sano et al. ........................ 725/55 |

FOREIGN PATENT DOCUMENTS

| | | |
|---|---|---|
| EP | 0 726 574 A2 | 8/1996 |
| EP | 1 367 824 A2 | 12/2003 |
| EP | 1 594 137 A1 | 11/2005 |
| JP | 9-9193 | 1/1997 |
| JP | 2001-8122 | 1/2001 |
| JP | 2001-36846 | 2/2001 |
| JP | 2001-186472 | 7/2001 |
| JP | 2001-216325 | 8/2001 |
| JP | 2001-313878 | 11/2001 |
| JP | 2002-44542 | 2/2002 |
| JP | 2002-56651 | 2/2002 |
| JP | 2003-91936 | 3/2003 |
| JP | 2005-37982 | 2/2005 |
| WO | WO 9222983 A2 * | 12/1992 |
| WO | WO 2005/015899 A1 | 2/2005 |
| WO | WO 2005/083977 A1 | 9/2005 |

* cited by examiner

*Primary Examiner* — Thai Tran
*Assistant Examiner* — Nigar Chowdhury
(74) *Attorney, Agent, or Firm* — Oblon, Spivak, McClelland, Maier & Neustadt, L.L.P.

(57) ABSTRACT

Disclosed herein is an information processing apparatus that controls reproduction of a plurality of recorded contents recorded when distributed from a predetermined one of a plurality of distribution sources to each of which a predetermined channel is allocated, including reproduction control means for controlling so that, where reproduction starting absolute time indicative of reproduction starting time is designated by a user and besides a reproduction object channel is designated by the user, that one of the recorded contents of the reproduction object channel whose reproduction starting absolute time is included in a recording time zone is reproduced from a position thereof corresponding to the reproduction starting absolute time.

9 Claims, 32 Drawing Sheets

FIG. 2

| PROGRAM INFORMATION TABLE OF A CHANNEL | | | | |
|---|---|---|---|---|
| CHANNEL | STARTING TIME | ENDING TIME | PROGRAM NAME | MOVING PICTURE ID |
| Ach | 5:00 | | | |
| | | ⋮ | | |
| Ach | 23:00 | 23:15 | PROGRAM 1A | 1A |
| Ach | 23:15 | 23:45 | PROGRAM 1B | 1B |
| Ach | 23:45 | 23:55 | PROGRAM 1C | 1C |
| Ach | 23:55 | 23:57 | PROGRAM 1D | 1D |
| Ach | 23:57 | 0:15 | PROGRAM 1E | 1E |
| | | ⋮ | | |
| | | 5:00 | | |

FIG. 3

| PROGRAM INFORMATION TABLE OF B CHANNEL | | | | |
|---|---|---|---|---|
| CHANNEL | STARTING TIME | ENDING TIME | PROGRAM NAME | MOVING PICTURE ID |
| Bch | 5:00 | | | |
| | | ⋮ | | |
| Bch | 23:00 | 23:25 | PROGRAM 3A | 3A |
| Bch | 23:25 | 23:50 | PROGRAM 3B | 3B |
| Bch | 23:50 | 0:15 | PROGRAM 3C | |
| Bch | 0:15 | 0:40 | PROGRAM 3D | 3D |
| Bch | 0:40 | 0:55 | PROGRAM 3E | 3E |
| | | ⋮ | | |
| | | 5:00 | | |

FIG.4

| PROGRAM INFORMATION TABLE OF C CHANNEL ||||| 
|---|---|---|---|---|
| CHANNEL | STARTING TIME | ENDING TIME | PROGRAM NAME | MOVING PICTURE ID |
| Cch | 5:00 | | | |
| | | ⋮ | | |
| Cch | 22:54 | 23:29 | PROGRAM 4A | 4A |
| Cch | 23:29 | 23:44 | PROGRAM 4B | 4B |
| Cch | 23:44 | 23:59 | PROGRAM 4C | 4C |
| Cch | 23:59 | 0:39 | PROGRAM 4D | 4D |
| Cch | 0:39 | 1:09 | PROGRAM 4E | 4E |
| | | ⋮ | | |
| | | 5:00 | | |

FIG. 9

| PROGRAM NAME | CHANNEL | RECORDING STARTING TIME | RECORDING ENDING TIME |
|---|---|---|---|
| 1-A | Ach | 2005/08/31 00:00:00 | 2005/08/31 01:00:00 |
| 2-A | Bch | 2005/08/31 00:00:00 | 2005/08/31 01:00:00 |
| 1-B | Ach | 2005/08/31 01:00:00 | 2005/08/31 02:00:00 |
| 3-A | Cch | 2005/08/31 00:00:00 | 2005/08/31 01:00:00 |
| 1-C | Ach | 2005/08/31 03:00:00 | 2005/08/31 04:00:00 |

A REPRODUCIBLE PROGRAM IS NOT FOUND
08/31/2005 (WEDNESDAY) 12:45:18 Ach

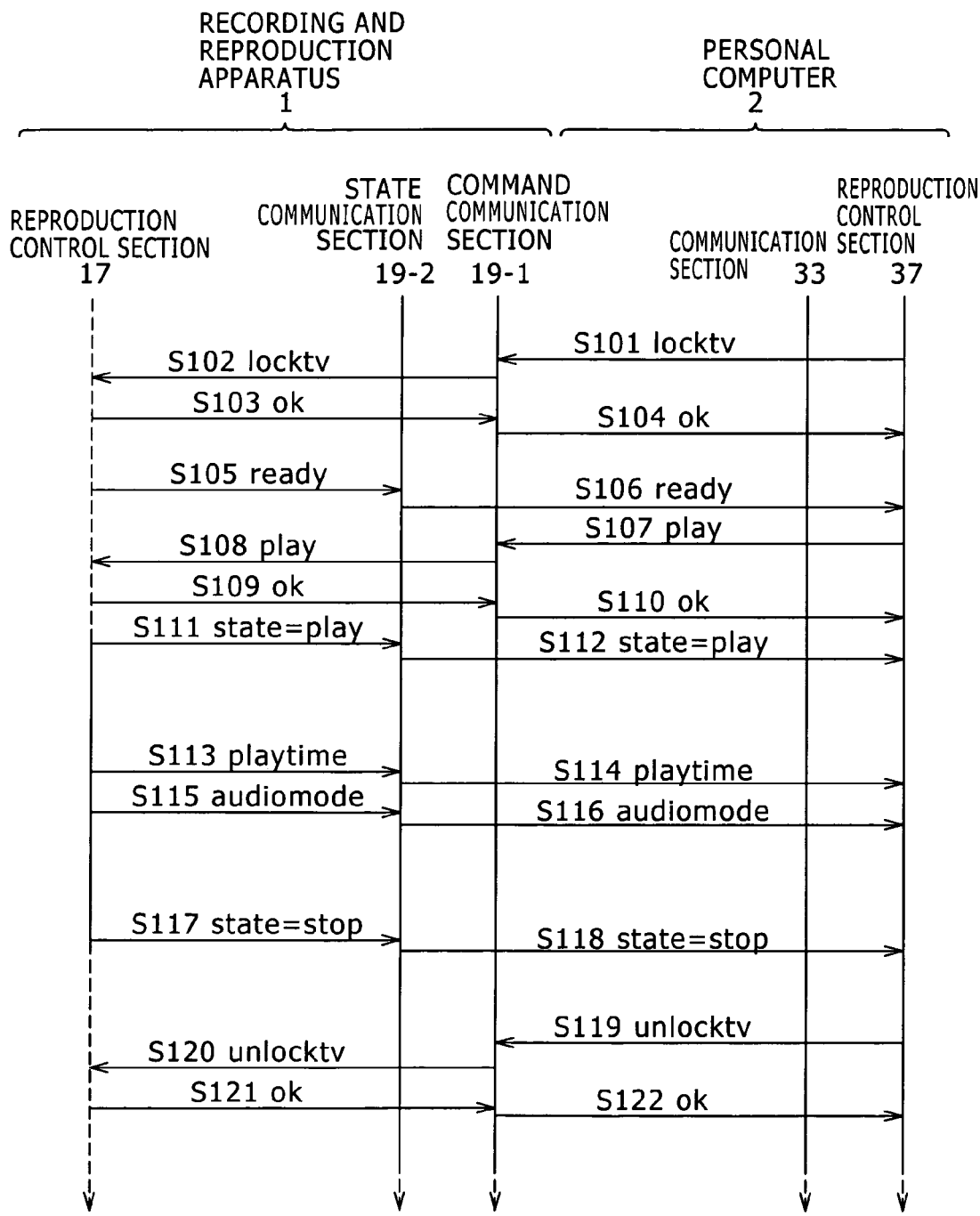

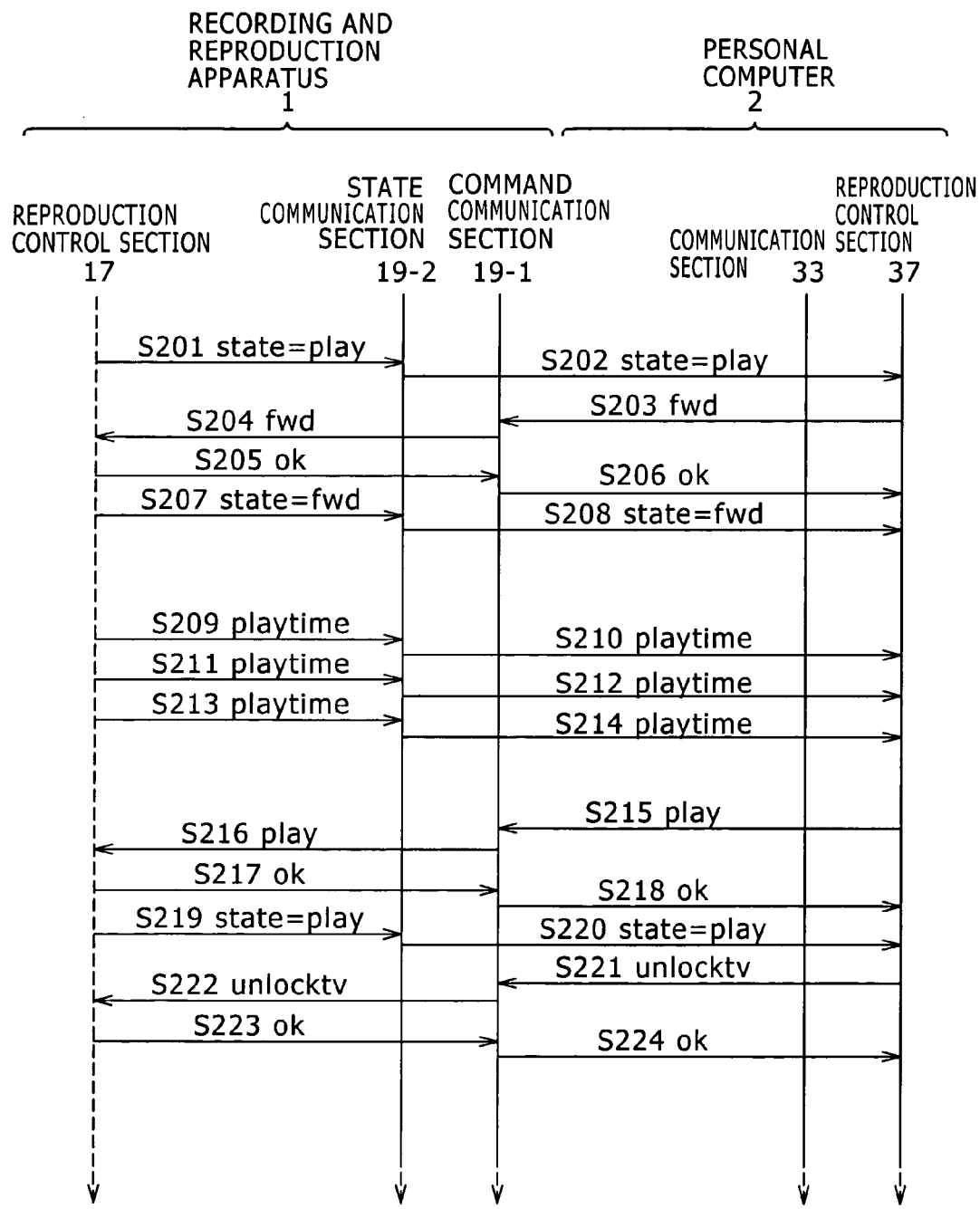

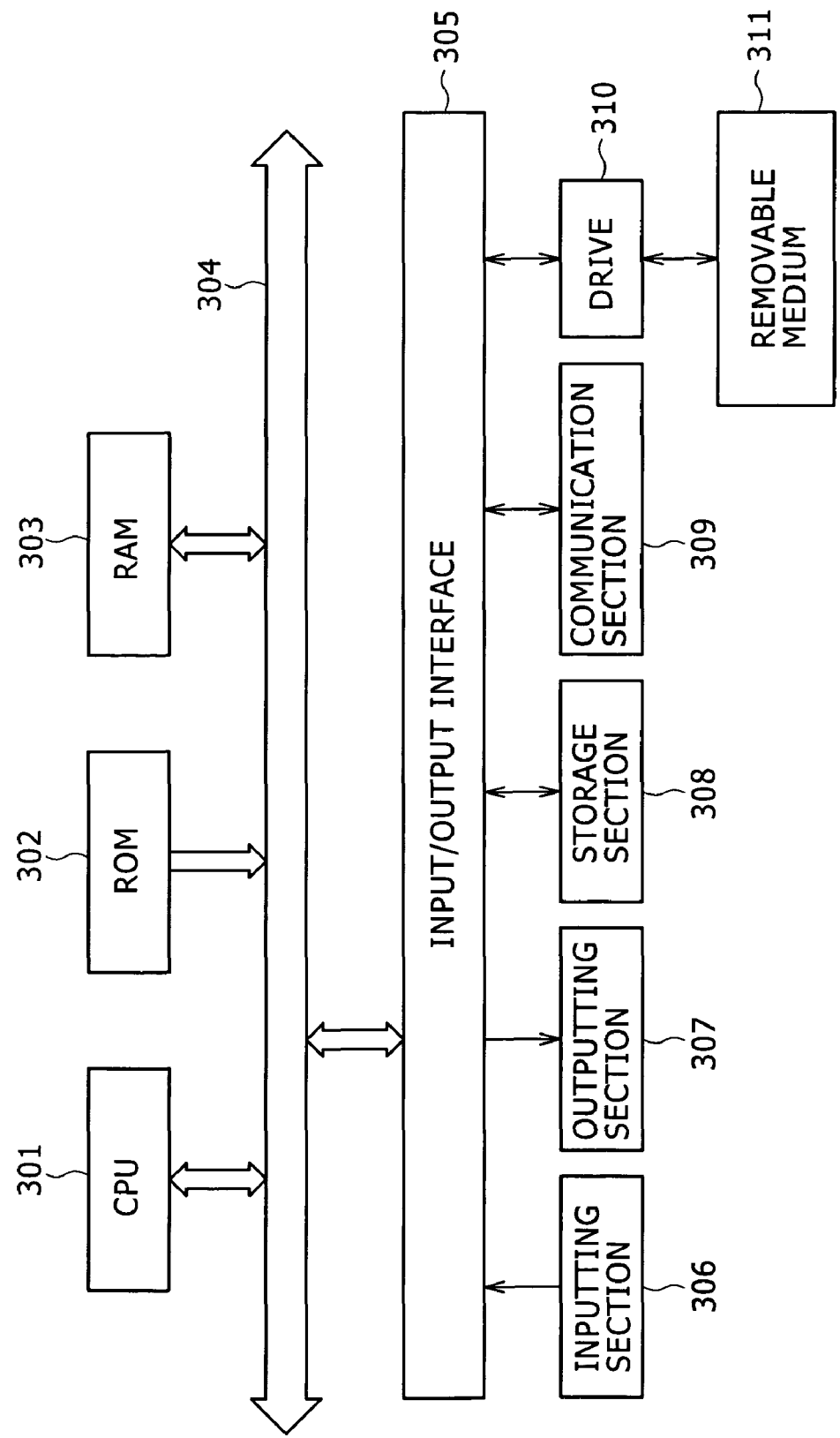

INFORMATION PROCESSING APPARATUS AND METHOD, AND PROGRAM

CROSS REFERENCES TO RELATED APPLICATIONS

The present invention contains subject matter related to Japanese Patent Application JP 2005-265376 filed in the Japanese Patent Office on Sep. 13, 2005 and to Japanese Patent Application JP 2005-290316 filed in the Japanese Patent Office on Oct. 3, 2005, the entire contents of which being incorporated herein by reference.

BACKGROUND OF THE INVENTION

1. Field of the Invention

This invention relates to an information processing apparatus and method and a program, and more particularly to an information processing apparatus and method and a program wherein a user can select a recorded content from among a plurality of recorded contents.

2. Description of the Related Art

In recent years, a recording and reproduction apparatus such as a hard disk video recorder which can record and reproduce a broadcasting program, particularly an image signal and a sound signal of a broadcasting program, has been and is being popularized significantly. Also a recording and reproduction apparatus which can utilize program information of a broadcasting program such as, for example, EPG (Electronic Program Guide) information to execute various processes has been proposed and placed on the market. A recording and reproduction apparatus of the type just mentioned is disclosed, for example, in Japanese Patent Laid-Open No. Hei 9-9193, Japanese Patent Laid-Open No. 2001-313878 or Japanese Patent Laid-Open No. 2001-8122.

The permissible recording amount of such recording and reproduction apparatus as described above has exhibited a remarkable increase in recent years. Consequently, a great number of broadcasting programs can be recorded in a recording and reproduction apparatus of the type described. This gives rise to a problem that, if such a great number of recorded broadcasting programs are not managed appropriately, then it becomes difficult for the user to find out a recorded broadcasting program which the user wants to reproduce. It is to be noted that a recorded broadcasting program is hereinafter referred to simply as recorded program.

Thus, the inventor of the present invention made an invention of an apparatus for managing the recorded substance of a recording and reproduction apparatus making use of a past program table and filed an application for patent in Japan as Japanese Patent Application No. 2004-138594. The past program table is a table which is produced making use of program information of broadcasting programs broadcast in the past and in which program listings representative of broadcasting programs broadcast in the past are indicated in the form of a table. In Japanese Patent Application No. 2004-138594, the program listings indicate recorded programs. It is to be noted that a particular example of the past program table is hereinafter described with reference to FIG. 5.

With the apparatus disclosed in Japanese Patent Application No. 2004-138594, the user can perform a selection operation of a recorded program to be reproduced making use of such a past program table as described above.

SUMMARY OF THE INVENTION

However, in the apparatus disclosed in Japanese Patent Application No. 2004-138594, it is necessary for the user to perform such operation as to cause, during or after reproduction of a program, the past program table to be displayed again in order to search for a different program to be reproduced subsequently and then restore the reproduction screen after the different program is selected. Accordingly, it is estimated to be demanded to select a recorded program or the like desired to be reproduced from among a plurality of recorded programs by a simpler operation than the operation described above.

Furthermore, it is estimated to be demanded to perform such a simple selection operation as described above not only with regard to broadcasting programs but also various contents.

Thus, it is desirable to provide an information processing apparatus and method and a program by which selection of a desired recorded content such as a recorded content to be reproduced from among a plurality of recorded contents can be performed by a simpler operation than ever.

According to an embodiment of the present invention, there is provided an information processing apparatus for controlling reproduction of a plurality of recorded contents recorded when distributed from a predetermined one of a plurality of distribution sources to each of which a predetermined channel is allocated, including reproduction control means for controlling so that, where reproduction starting absolute time indicative of reproduction starting time is designated by a user and besides a reproduction object channel is designated by the user, that one of the recorded contents of the reproduction object channel whose reproduction starting absolute time is included in a recording time zone is reproduced from a position thereof corresponding to the reproduction starting absolute time.

The information processing apparatus may be configured such that, where, at a predetermined timing during reproduction of a first recorded content of a first channel, a second channel is designated as the reproduction object channel by the user, the reproduction control means sets time obtained by conversion of a reproduction position of the first recording content at the predetermined timing into the absolute time as the reproduction starting absolute time, and controls so that the content to be reproduced is changed over from the first recorded content to a second recorded content of the second channel whose reproduction starting absolute time is included in the recording time zone and the second recorded content is reproduced from a position thereof which corresponds to the reproduction starting absolute time.

In this instance, the reproduction control means may accept a command from predetermined operation means and perform, if the command indicates that the second channel is designated by the user, control in accordance with the command.

The operation means may include a first operation element for outputting a first command to shift up its order by one and a second operation element for outputting a second command to shift down its order by one, and the reproduction control means may apply a predetermined order to the channels corresponding to the distribution sources and manage the order and decide, if the first operation element is operated by the user, that the first command is to designate a channel immediately succeeding the first channel in the predetermined order as the second channel and then performs corresponding control, but decide, if the second operation element is operated by the user, that the second command is to designate a channel immediately preceding to the first channel in the predetermined order as the second channel and then performs corresponding control.

The information processing apparatus may be configured such that, where the content which was being distributed at the reproduction starting absolute time from a distribution source corresponding to the reproduction object channel is not recorded, the reproduction control means controls reproduction of a different content for presenting to the user that a recorded content of the reproduction object does not exist.

Or, the information processing apparatus may be configured such that, where the content which was being distributed at the reproduction starting absolute time from a distribution source corresponding to the reproduction object channel is not recorded, the reproduction control means searches the recorded contents for a different recorded content recorded in a recording time zone including the reproduction starting time, and controls, when the search results in success, reproduction of the different recorded content.

According to another embodiment of the present invention, there are provided an information processing method for an information processing apparatus for controlling reproduction of a plurality of recorded contents recorded when distributed from a predetermined one of a plurality of distribution sources to each of which a predetermined channel is allocated and a program for causing a computer to execute control of reproduction of a plurality of recorded contents recorded when distributed from a predetermined one of a plurality of distribution sources to each of which a predetermined channel is allocated. The program includes the step of controlling so that, where reproduction starting absolute time indicative of reproduction starting time is designated by a user and besides a reproduction object channel is designated by the user, that one of the recorded contents of the reproduction object channel whose reproduction starting absolute time is included in a recording time zone is reproduced from a position thereof corresponding to the reproduction starting absolute time.

In the information processing apparatus and method and the program, reproduction of a plurality of recorded contents recorded when distributed from a predetermined one of a plurality of distribution sources to each of which a predetermined channel is allocated is controlled. In particular, the control is performed such that, where reproduction starting absolute time indicative of reproduction starting time is designated by a user and besides a reproduction object channel is designated by the user, that one of the recorded contents of the reproduction object channel whose reproduction starting absolute time is included in a recording time zone is reproduced from a position thereof corresponding to the reproduction starting absolute time.

With the information processing apparatus and method and the program, reproduction of a recorded content designated from among a plurality of recorded contents by the user can be controlled. Particularly to the user, an operation necessary for the control can be performed significantly simpler than ever.

BRIEF DESCRIPTION OF THE DRAWINGS

FIGS. 2, 3 and 4 are views illustrating an example of program information tables of A, B and C channels, respectively;

FIG. 9 is a view illustrating an example of the continuous reproduction process of FIG. 8 and illustrating a particular example of the recorded substance of the recording and reproduction apparatus or the like shown in FIG. 1;

FIGS. 34 and 35 are flow diagrams illustrating different examples of a particular process performed in order to establish reproduction synchronism between the personal computer and the recording and reproduction apparatus shown in FIG. 1; and FIG. 36 is a block diagram showing an example of a configuration of a personal computer which executes a program to which the present invention is applied.

DETAILED DESCRIPTION OF THE PREFERRED EMBODIMENTS

Before a preferred embodiment of the present invention is described in detail, a corresponding relationship between several features recited in the accompanying claims and particular elements of the preferred embodiment described below is described. The description, however, is merely for the confirmation that the particular elements which support the invention as recited in the claims are disclosed in the description of the embodiment of the present invention. Accordingly, even if some particular element which is recited in description of the embodiment is not recited as one of the features in the following description, this does not signify that the particular element does not correspond to the feature. On the contrary, even if some particular element is recited as an element corresponding to one of the features, this does not signify that the element does not correspond to any other feature than the element.

Figure 1:
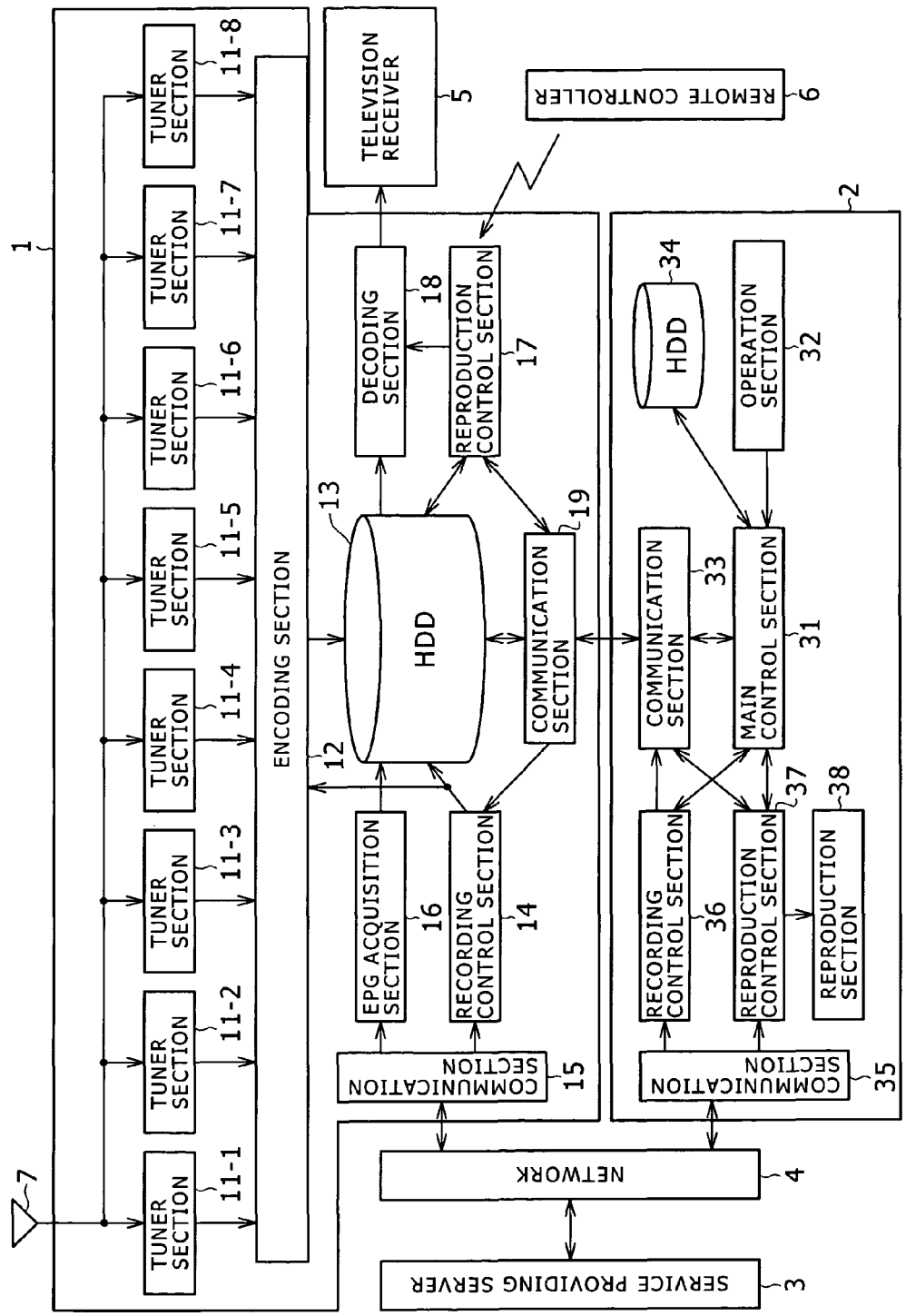
FIG. 1 is a functional block diagram showing an example of a functional configuration of an information processing system to which the present invention is applied.

According to an embodiment of the present invention, there is provided an information processing apparatus (for example, a recording and reproduction apparatus 1 shown in FIG. 1) for controlling reproduction of a plurality of recorded contents (for example, recorded contents recorded in a HDD 13 shown in FIG. 1) recorded when distributed from a predetermined one of a plurality of distribution sources (for example, broadcasting stations from which broadcasting programs hereinafter described are broadcast) to each of which a predetermined channel is allocated, including reproduction control means (for example, a reproduction control section 17 shown in FIG. 1) for controlling so that, where reproduction starting absolute time (for example, a reproduction timing indicated by absolute time hereinafter described) indicative of reproduction starting time is designated by a user and besides a reproduction object channel is designated by the user (for example, where such designation is performed by the user who operates a remote controller 6 shown in FIG. 1), that one of the recorded contents of the reproduction object channel whose reproduction starting absolute time is included in a recording time zone is reproduced from a position thereof corresponding to the reproduction starting absolute time.

Figure 16:
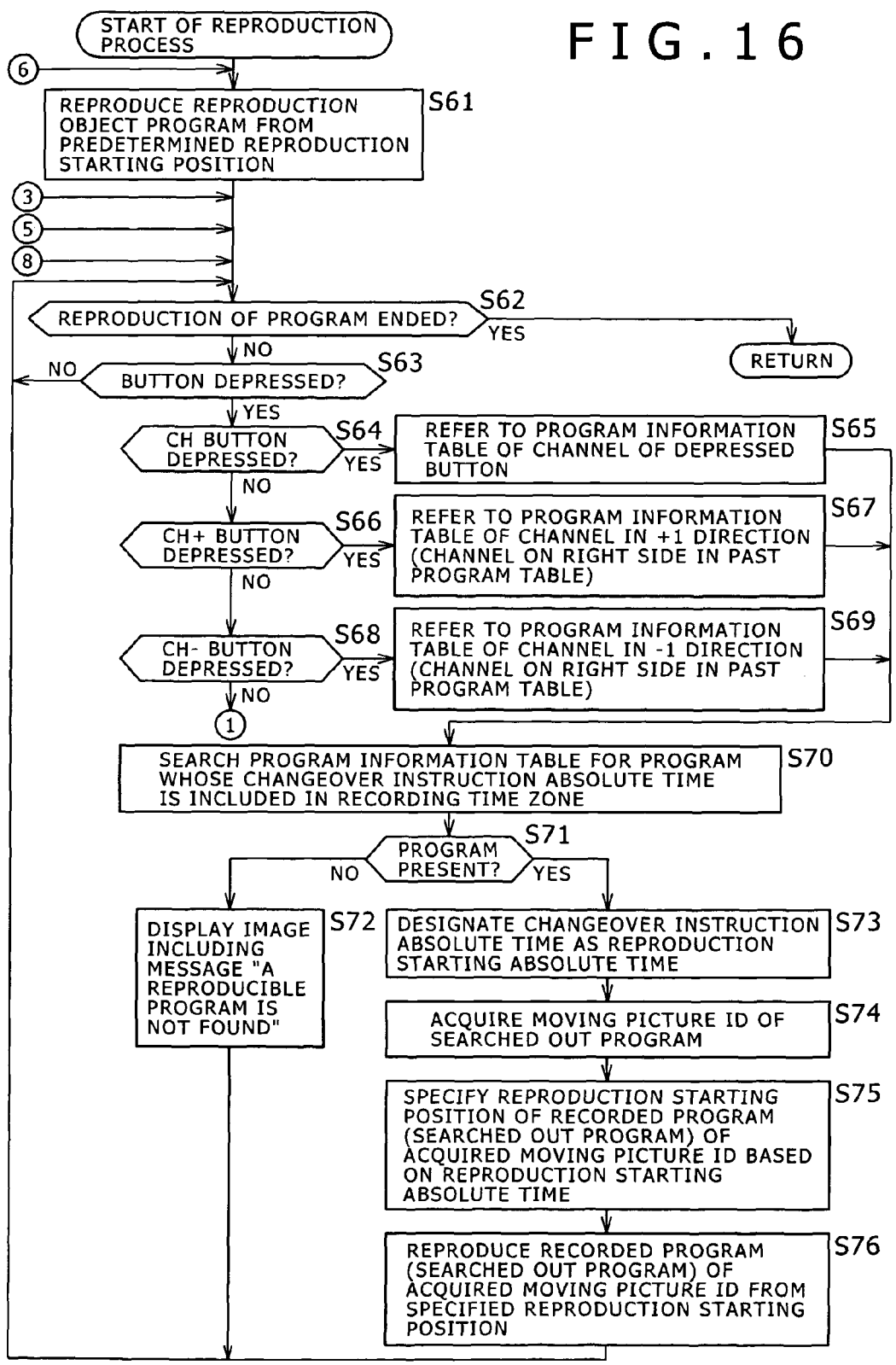
FIGS. 16 to 20 are flow charts illustrating an example of a program reproduction process of the continuous reproduction process of FIG. 8.

The information processing apparatus is configured such that, where, at a predetermined timing during reproduction of a first recorded content of a first channel, a second channel is designated as the reproduction object channel by the user, the reproduction control means sets time obtained by conversion of a reproduction position of the first recording content at the predetermined timing into the absolute time as the reproduction starting absolute time, and controls so that the content to be reproduced is changed over from the first recorded content to a second recorded content of the second channel whose reproduction starting absolute time is included in the recording time zone and the second recorded content is reproduced from a position thereof which corresponds to the reproduction starting absolute time (for example, a series of processes illustrated in FIG. 16 from within a program reproduction process of FIGS. 16 to 20).

In this instance, the reproduction control means accepts a command from predetermined operation means (for example, a remote controller 6 shown in FIG. 1) and perform, if the command indicates that the second channel is designated by the user, control in accordance with the command.

Figure 5:
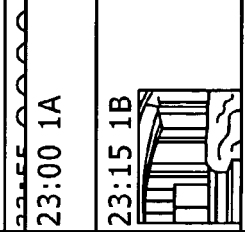
FIG. 5 is a view showing an example of a past program table corresponding to the program information tables of FIGS. 2 to 4.

The operation means includes a first operation element (for example, a Ch + button 58 shown in FIG. 6) for outputting a first command to shift up its order by one and a second operation element (for example, a Ch − button 59 shown in FIG. 6) for outputting a second command to shift down its order by one, and the reproduction control means applies a predetermined order (for example, an order in a horizontal direction of a past program table of FIG. 5) to the channels corresponding to the distribution sources and manage the order and decides, if the first operation element is operated by the user, that the first command is to designate a channel immediately succeeding the first channel in the predetermined order as the second channel and then performs corresponding control, but decides, if the second operation element is operated by the user, that the second command is to designate a channel immediately preceding to the first channel in the predetermined order as the second channel and then performs corresponding control.

The information processing apparatus is configured such that, where the content which was being distributed at the reproduction starting absolute time from a distribution source corresponding to the reproduction object channel is not recorded, the reproduction control means controls reproduction of a different content (for example, an image of FIG. 21) for presenting to the user that a recorded content of the reproduction object does not exist.

According to another embodiment of the present invention, there are provided an information processing method for an information processing apparatus (for example, a recording and reproduction apparatus 1 shown in FIG. 1) for controlling reproduction of a plurality of recorded contents recorded when distributed from a predetermined one of a plurality of distribution sources to each of which a predetermined channel is allocated and a program for causing a computer (for example, a personal computer 2 shown in FIG. 1) to execute control of reproduction of a plurality of recorded contents recorded when distributed from a predetermined one of a plurality of distribution sources to each of which a predetermined channel is allocated. The program includes the step (for example, a program reproduction process of FIGS. 16 to 20) of controlling so that, where reproduction starting absolute time indicative of reproduction starting time is designated by a user and besides a reproduction object channel is designated by the user, that one of the recorded contents of the reproduction object channel whose reproduction starting absolute time is included in a recording time zone is reproduced from a position thereof corresponding to the reproduction starting absolute time.

In the following, preferred embodiments of the present invention are described with reference to the accompanying drawings.

FIG. 1 is a functional block diagram showing an example of a functional configuration of an information processing system to which the present invention is applied.

Referring to FIG. 1, the information processing system shown includes a recording and reproduction apparatus 1 to which a personal computer 2, a television receiver 5, an antenna 7 and so forth are connected.

Further, the recording and reproduction apparatus 1 can establish a connection to a service providing server 3 through a network 4 and enjoy various services provided from the service providing server 3. Also the personal computer 2 can establish a connection to the service providing server 3 through the network 4 and similarly enjoy various services provided from the service providing server 3.

It is to be noted that the form of the network 4 is not limited specifically and, for example, the Internet or a like network may be adopted as the network 4. Or, it is possible to omit the network 4. In other words, each of the recording and reproduction apparatus 1 and the personal computer 2 may communicate directly with the service providing server 3 without the intervention of the network 4.

The recording and reproduction apparatus 1 is configured such that it can receive different broadcasting programs as an example of a content broadcast in the same time zone from a plurality of broadcasting stations at the same time. In particular, for example, the recording and reproduction apparatus 1 shown in FIG. 1 includes eight tuner sections 11-1 to 11-8, an encoding section 12 and a hard disk drive (HDD) 13 so that it can simultaneously receive eight broadcasting programs broadcast individually from eight broadcasting stations.

It is to be noted that, in the following description, where there is no necessity to individually distinguish the eight tuner sections 11-1 to 11-8 from each other, they are referred to collectively as tuner sections 11.

Further, while the number of tuner sections 11 incorporated in the recording and reproduction apparatus 1 in FIG. 1 is eight, actually it may be any number without being specifically limited to that shown in FIG. 1.

The tuner sections 11 demodulate broadcasting radio waves of television broadcasts of ground waves or satellite waves received by the antenna 7 and supply video signals and audio signals obtained by the demodulation as digital signals to the encoding section 12.

In particular, when a broadcasting radio wave of a channel designated, for example, by a recording control section 14 or a recording control section 36 of the personal computer 2 hereinafter described, more particularly a radio wave which forms a broadcasting program broadcast from a broadcasting station to which the channel is allocated, the corresponding tuner section 11 demodulates the broadcasting radio wave. The tuner section 11 supplies a video signal and an audio signal obtained as a result of the demodulation in the form of digital signals to the encoding section 12.

It is to be noted that, while a broadcasting program is broadcast from a broadcasting station in this manner, in the following description, such a representation that a broadcasting program is broadcast from a channel (to which the broadcasting station is allocated) is used for simplified description. For example, such a representation as "broadcasting program broadcast from an A channel" is used in the following description.

Further, in the following description, digital signals outputted from the tuner section 11, that is, a digital video signal and a digital audio signal which form a predetermined broadcasting program, are collectively referred to as content data.

The encoding section 12 encodes or compression encodes content data supplied thereto from a predetermined one of the tuner sections 11, for example, in accordance with an MPEG (Moving Picture Experts Group) system independently of content data supplied from the other tuner sections 11. Then, the encoding section 12 stores the encoded content data into the HDD 13. It is to be noted that content data in an encoded form outputted from the encoding section 12 are hereinafter referred to as compressed content data.

In other words, a file including the compressed content data is stored into the HDD 13. It is to be noted that, in the following description, such action that "compressed content data are stored into the HDD 13" is represented such that "a broadcasting program (which corresponds to the compressed content data) is recorded." In other words, where there is no necessity to distinguish a broadcasting program and content data or compressed content data which form the broadcasting program individually from each other, such broadcasting program, content data or compressed content data as just mentioned is referred to merely as broadcasting program. Further, a recorded broadcasting program is referred to as recorded program as described hereinabove, and also a broadcasting program recorded in the HDD 13 or the like, that is, compressed content data stored in the HDD 13 or the like, are hereinafter referred to as recorded program.

A unit of recording of the HDD 13, that is, data included in one file, may not necessarily be one broadcasting program, but accurately is the broadcast substance of a predetermined channel specified by a single recording reservation. The broadcast substance may include more than one broadcasting program. Further, the broadcast substance may not necessarily include an entire broadcasting program but only part of a broadcasting program. Accordingly, one file recorded in the HDD 13 may include a single broadcasting program broadcast from a predetermined channel or may include two or more broadcasting programs broadcast from the channel.

It is to be noted that, in the following description, such a file as just mentioned is referred to as video capsule. In particular, a video capsule includes at least part of one or more broadcasting programs as compressed content data. It is to be noted that, in the following description, one video capsule includes the entirety of a predetermined one broadcast program for the simplification of description.

Further, program information of broadcasting programs broadcast in the past from the broadcasting stations involved is stored in the HDD 13. Further, in the present embodiment, also EPG information is stored.

The EPG information is provided, for example, in the present embodiment, from the service providing server 3 connected to the network 4. Therefore, the recording and reproduction apparatus 1 of FIG. 1 includes a communication section 15 and an EPG acquisition section 16. The communication section 15 controls communication with the service providing server 3 through the network 4. The EPG acquisition section 16 suitably acquires EPG information of broadcasting programs through the network 4 and the communication section 15 and stores the acquired EPG information into the HDD 13.

It is to be noted that the method of acquiring program information is not limited to the specific method described above but may be any method. For example, such a method as to extract program information from within a vertical blanking period of a television broadcasting signal of a ground wave received by the antenna 7 or extract program information from within a television broadcasting signal of a satellite wave received by the antenna 7 may be adopted.

The recording control section 14 controls the encoding section 12 and the HDD 13 in accordance with a recording command to control recording action of a broadcasting program. The recording command may be provided from the service providing server 3 through the network 4 and the communication section 15 or provided from the personal computer 2 through a communication section 19. The recording action mentioned above includes not only an action itself of actually recording a signal but also an action of performing setting of a recording reservation and managing the substance of the setting. The last-mentioned action is hereinafter referred to as recording reservation management action.

Further, the recording control section 14 suitably produces or updates such program information tables, for example, as shown in FIGS. 2 to 4 during control of the recording action. For the production or updating of a program information table, the recording control section 14 utilizes EPG information of broadcasting programs stored in the HDD 13 and the control substance of the recording control section 14 itself. It is to be noted that the program information tables of FIGS. 2 to 4 are stored, for example, in the HDD 13.

FIGS. 2 to 4 illustrate an example of program information tables of an A channel, a B channel and a C channel, respectively.

In each of the program information tables of FIGS. 2 to 4, one row corresponds to one broadcasting program broadcast from the A to C channel and includes the following information.

In particular, in each of the program information tables of FIGS. 2 to 4, for the item of "channel," the name of the channel from which a broadcasting program corresponding to the row to be noticed was broadcast is described. It is to be noted that the last-mentioned broadcasting program is hereinafter referred to as noticed program. Further, for the item of "starting time," starting time of the noticed program is described, and for the item of "ending time," ending time of the noticed program is described. Further, for the item of "program name," the name of the noticed program is described. It is to be noted that, for example, in the present embodiment, information included in EPG information of the noticed program is utilized for the information described in the items. In other words, in the present embodiment, the starting time and the ending time of the noticed program do not represent the time at which the broadcasting was started actually or the time at which the broadcasting was ended actually, but represent the time at which it is scheduled to start the broadcasting by the broadcasting station side and the time at which it is scheduled to end the broadcasting by the broadcasting station side, respectively. It is to be noted that also it is possible to alternatively adopt the former starting time and ending time, that is, the time at which the broadcasting was started and the time at which the broadcasting was ended actually, as the described values of the items of "starting time" and "ending time," respectively.

In each of the program information tables of FIGS. 2 to 4, where a noticed program is recorded in the HDD 13, that is, where a video capsule including the noticed program is stored in the HDD 13, an identifier for specifying the video capsule is described in the item of "moving picture ID." The identifier may be, for example, a file name and is hereinafter referred to as moving picture ID in accordance with the name of the item in FIGS. 2 to 4.

It is to be noted that, in the program information table of the B channel of FIG. 3, nothing is described in a place of the item of "moving picture ID," that is, in the place of the item of "moving picture ID" in the row in which "program 3C" is described as the "program name." This represents that the broadcasting program named "program 3C" is not recorded.

Referring back to FIG. 1, a reproduction control section 17 controls a decoding section 18 and the HDD 13 in accordance with a reproduction command provided from a remote controller 6, a reproduction command provided from the personal computer 2 through the communication section 19 or the like to control the reproduction action of a broadcasting program. The reproduction command provided from the remote controller 6 may include a command to change over the channel or the program hereinafter described.

In particular, for example, the reproduction control section 17 can produce a past program table shown in FIG. 5 in the form of image data based on the program information tables described hereinabove with reference to FIGS. 2 to 4. The image data produced are provided to the decoding section 18. Consequently, the decoding section 18 causes the television receiver 5 to display a past program table corresponding to the image data.

In this instance, for example, such a past program table as shown in FIG. 5 is displayed on the television receiver 5. In the following, the past program table illustrated in FIG. 5 is described.

The past program table includes program listings or display areas having a form similar to television program listings of a newspaper which is a paper medium. In particular, the past program table includes, for each channel, program listings individually indicating recorded programs and individually disposed in regions each representative of a time zone in which the corresponding program was recorded. Such a time zone as just mentioned is hereinafter referred to as recording time zone. Thus, each of the program listings is displayed with a vertical length direction which indicates the length of the recording time zone.

In a program listing of a recorded program, normally a thumbnail image of a moving picture or a still picture and the title or program name of the recorded program are displayed. It is to be noted that, in a program listing for a recorded program whose recording time period is short, no thumbnail image is displayed as occasion demands. This is because the program listing for a recorded program whose recording time period is short does not have a sufficient length or size to display a thumbnail image therein.

In particular, for example, the past program table of FIG. 5 shows an example of a past program table corresponding to the program information tables of FIGS. 2 to 4 as described hereinabove.

In particular, the column of the A channel is formed based on the program information table of the A channel shown in FIG. 2.

In the column of the A channel, a program listing indicative of the "program 1A" recorded in the time zone from 23:00 to 23:15 is displayed in the third row from above in FIG. 2. It can be seen from this that a broadcasting program entitled "1A" broadcast from the A channel in the recording time zone is recorded. It is to be noted that a broadcasting program of a predetermined title is represented only by the predetermined title. Similarly, also program listings indicative of "program 1B" to "program 1E" included in the program information table of the A channel of FIG. 2 are displayed in respective corresponding recording time zones. Therefore, it can be recognized that also the "program 1B" to "program 1E" are recorded.

Meanwhile, a column of the B channel is formed based on the program information table of the B channel of FIG. 3.

In the column of the B channel, a program listing indicative of the "program 3A" recorded in the time zone from 23:00 to 23:25 is displayed in the third row from above in FIG. 3. It can be seen from this that a broadcasting program "program 3A" broadcast from the B channel in the recording time zone is recorded. Similarly, also program listings indicative of "program 3B," "program 3D" and "program 3E" included in the program information table of the B channel of FIG. 3 are displayed in respective corresponding recording time zones. Therefore, it can be recognized that also the "program 3B," "program 3D" and "program 3E" are recorded.

In contrast, in the column of the B channel, no program listing is displayed in a region indicative of the time zone from 23:50 to 0:15. From this, it can be seen that the "program 3C" broadcast from the B channel in this time zone, that is, a broadcasting program corresponding to the fifth row from above in FIG. 3, is not recorded.

Further, a column of the C channel is formed based on the program information table of the C channel of FIG. 4.

In the column of the C channel, a program listing indicative of the "program 4A" recorded in the time zone from 22:54 to 23:29 is displayed in the third row from above in FIG. 4. It can be seen from this that a "program 4A" broadcast from the C channel in the recording time zone is recorded. Similarly, also program listings indicative of "program 4B" to "program 4E" included in the program information table of the C channel of FIG. 4 are displayed in respective corresponding recording time zones. Therefore, it can be recognized that also the "program 4B" to "program 4E" are recorded.

In this instance, the user can operate, for example, the remote controller 6 shown in FIG. 1 to select the program listing of a desired recorded program to be reproduced from within the past program table.

Referring back to FIG. 1, the reproduction control section 17 recognizes the substance of the operation of the remote controller 6 in this instance and controls reproduction of the recorded program indicated by the program listing selected by the user based on a result of the recognition.

More particularly, if the program listing indicative of the "program 1E" of the A channel in FIG. 5 is selected, then the reproduction control section 17 reads out a video capsule, to which "1E" is applied as the moving picture ID, from the HDD 13 and controls provision of the read out video capsule to the decoding section 18.

Then, the reproduction control section 17 issues an instruction to the decoding section 18 to reproduce the program 1E in the form of compressed content data included in the video capsule from the top of the same. Consequently, the decoding section 18 decodes the compressed content data of the program 1E included in the video capsule and provides a video signal and an audio signal, which correspond to the program 1E, obtained as a result of the decoding to the television receiver 5. Consequently, the "program 1E" is reproduced from the television receiver 5. In particular, an image corresponding to the "program 1E" is displayed on the screen of the television receiver 5, and sound corresponding to the "program 1E" is outputted from a speaker or the like of the television receiver 5.

Incidentally, some user knows that a favorite broadcasting program such as, for example, a broadcasting program which is broadcast in the same time zone every week such as a broadcasting program of a drama and knows the broadcasting time zone of the favorite broadcasting program. Such a user as just described may possibly feel cumbersome to perform, when the user wants to reproduce the favorite recorded broadcasting program, such a series of operations to cause the past program table to be displayed and select the program listing of the favorite broadcasting program from within the past program table. In such an instance, the user may possibly demand to perform a reproduction instruction operation of the favorite broadcasting program by a further simpler operation than that of the reproduction instruction operation which utilizes the past program table.

In order to satisfy such a demand as just described, the inventor of the present invention made an invention of such a method as described below. In particular, according to the method, the user designates absolute time indicative of a reproduction timing at which the user wants to start reproduction and a channel desired to reproduce. Such absolute time is hereinafter referred to as reproduction starting absolute time, and such a channel desired to reproduce is hereinafter referred to as reproduction object channel. In response to the designation, the apparatus reproduces, from among a plurality of recorded programs, a recorded program of the recording object channel having a recording time zone which includes the reproduction starting absolute time from its position corresponding to the reproduction starting absolute time. A technique of implementing such a series of processes as just described was invented by the inventor of the present invention. The technique mentioned is hereinafter referred to as absolute time designation reproduction technique.

The absolute time here signifies time such as, for example, month, day, hour and minute of a point of time at which the apparatus recorded a broadcasting program. In the present embodiment, since the recording and reproduction apparatus 1 makes use of the program information tables of FIGS. 2 to 4 and so forth to perform recording of a program, time defined with reference to a recording time zone designated with the "starting time" and the "ending time" of the program information tables is absolute time.

In other words, if it is assumed that the values of time managed by the recording and reproduction apparatus 1, broadcasting stations and so forth all coincide with one other, then it is considered that time such as, for example, month, day, hour and minute included in a broadcasting time zone in which a recorded program of a reproduction object was broadcast actually or time such as, for example, month, day, hour and minute included in a broadcasting time zone within which broadcasting of the program was scheduled to be broadcast, is absolute time.

However, since actually the time values managed by the recording and reproduction apparatus 1, broadcasting stations and so forth do not necessarily coincide with one another, in the present embodiment, it is assumed that the time managed by the recording apparatus side is adopted as the absolute time. In other words, in the present embodiment, the time managed by the apparatus at a point of time at which the apparatus actually records a broadcasting program is adopted as the time zone.

It is to be noted that, in order to clearly indicate that some value of time is represented in absolute time, time at which the top position of a program was recorded, that is, for example, the "starting time" of the program information tables of FIGS. 2 to 4, is hereinafter referred to as recording starting absolute time. Similarly, time at which the tail end position of the program was recorded, that is, for example, the "ending time" of the program information tables of FIGS. 2 to 4 or the like, is hereinafter referred to as recording ending absolute time.

Such an absolute time designation reproduction technique as described above is applied, for example, to the recording and reproduction apparatus 1 of FIG. 1 and also to the personal computer 2 hereinafter described. In particular, the user may operate the remote controller 6 to designate reproduction starting absolute time and a reproduction object channel. Details are hereinafter described with reference to FIGS. 7, 11 to 13 and so forth. In response to the operation, the reproduction control section 17 performs control of reproducing, from among a plurality of recorded programs recorded in the HDD 13, a recorded program of the reproduction object channel whose reproduction time zone includes the reproduction starting absolute time from the position corresponding to the reproduction starting absolute time.

In particular, for example, it is assumed that "August 30, 1:05" is designated as the reproduction starting absolute time and the A channel is designated as the reproduction object channel by the user.

In this instance, the reproduction control section 17 refers to the program information table of the A channel of FIG. 2 in the HDD 13 and determines, from within the program information table, a recorded program whose recording time zone includes "0:05," that is, the "program 1E" whose recording time zone is "23:57 to 0:15," as the reproduction object.

Then, the reproduction control section 17 controls reading of a video capsule specified by the moving picture ID of the "program 1E" of the reproduction object, that is, "1E" from the HDD 13 and providing of the video capsule to the decoding section 18.

Then, the reproduction control section 17 issues an instruction to the decoding section 18 to reproduce the program 1E in the form of compressed content data included in the video capsule from the position of "0:05" in absolute time.

It is to be noted, however, that the decoding section 18 performs its processing based on relative time with reference to reference time 00:00 provided by the top position of the content of the recorded program. In order to avoid confusion with absolute time, relative time at which reproduction of a content is started is hereinafter referred to as reproduction starting position.

To this end, the reproduction control section 17 specifies or arithmetically operates a reproduction starting position based on the reproduction starting absolute time and issues an instruction to the decoding section 18 to reproduce the reproduction object program from the reproduction starting position. For example, the reproduction control section 17 arithmetically operates the difference between the reproduction starting absolute time and the recording starting absolute time, which is the "starting time" of the program information table and specifies a result of the arithmetic operation as a reproduction starting position. In particular, for example, in the case described above, since the recording time zone of the "program 1E" of the reproduction object is "23:57 to 0:15," the recording starting absolute time is "23:57," and the reproduction starting absolute time is "0:05" as described above. Therefore, the difference "0:08" is determined as the reproduction starting position.

Consequently, the decoding section 18 decodes the video capsule of the compressed content data to which "1E" is applied as the moving picture ID in accordance with an MPEG system or the like. Then, the decoding section 18 determines the position of the program 1E obtained by the decoding which is later by eight minutes from the top, that is, the position of "0:08" of the program 1E, as the reproduction starting position, and performs reproduction, that is, outputting from the television receiver 5, of the program 1E from the reproduction starting position.

Further, as described already in the description of the subject to be solved by the invention, where such a past program table as described above is used, it is necessary for the user to perform such operation as to cause, during or after reproduction of a program, the past program table to be displayed again in order to search for a different program to be reproduced subsequently and then restore the reproduction screen after the different program is selected. Accordingly, it is likely to be demanded to select a recorded program or the like desired to be reproduced by simpler operation than the operation described above.

Also in order to satisfy the demand just described, the absolute time designation reproduction technique may be applied.

In particular, for example, the user would designate only a reproduction object channel without causing the past program table to be displayed in order to search for a different program to be reproduced subsequently during reproduction or after an end of the preproduction of a program. In other words, the user would perform only an operation for changing over the channel.

In this instance, when a channel changing over operation is detected during reproduction of a program, the apparatus, that is, the recording and reproduction apparatus 1 here, converts the reproduction position of the program at the point of time of the changing over operation into absolute time and regards the resulting absolute time as the reproduction starting absolute time. It is to be noted that the time obtained by the conversion is hereinafter referred to as changeover instruction absolute time. On the other hand, when a channel changing over operation is detected after an end of reproduction of a program, the apparatus regards the recording ending absolute time of the program, which is the "ending time" in the program information tables of FIGS. 2 to 4 and so forth, as the reproduction ending absolute time. Thereafter, the apparatus performs control to reproduce a recorded program of a reproduction object channel after the changeover whose recording time zone includes the reproduction starting absolute time, which is same as the changeover instruction absolute time or ending time from the position corresponding to the reproduction starting absolute time, that is, the reproduction starting position.

It is to be noted that details of such a series of processes as described above are hereinafter described with reference to FIGS. 16 to 20 and so forth.

In this manner, only it is necessary for the user to perform such a simple operation as to designate, while reproduction of a program is proceeding or after such reproduction comes to an end, only a channel desired to use subsequently, that is, a channel different from the channel in which the program being reproduced is broadcast, without causing the past program table to be displayed in order to search for a recorded program to be reproduced subsequently.

Figure 6:
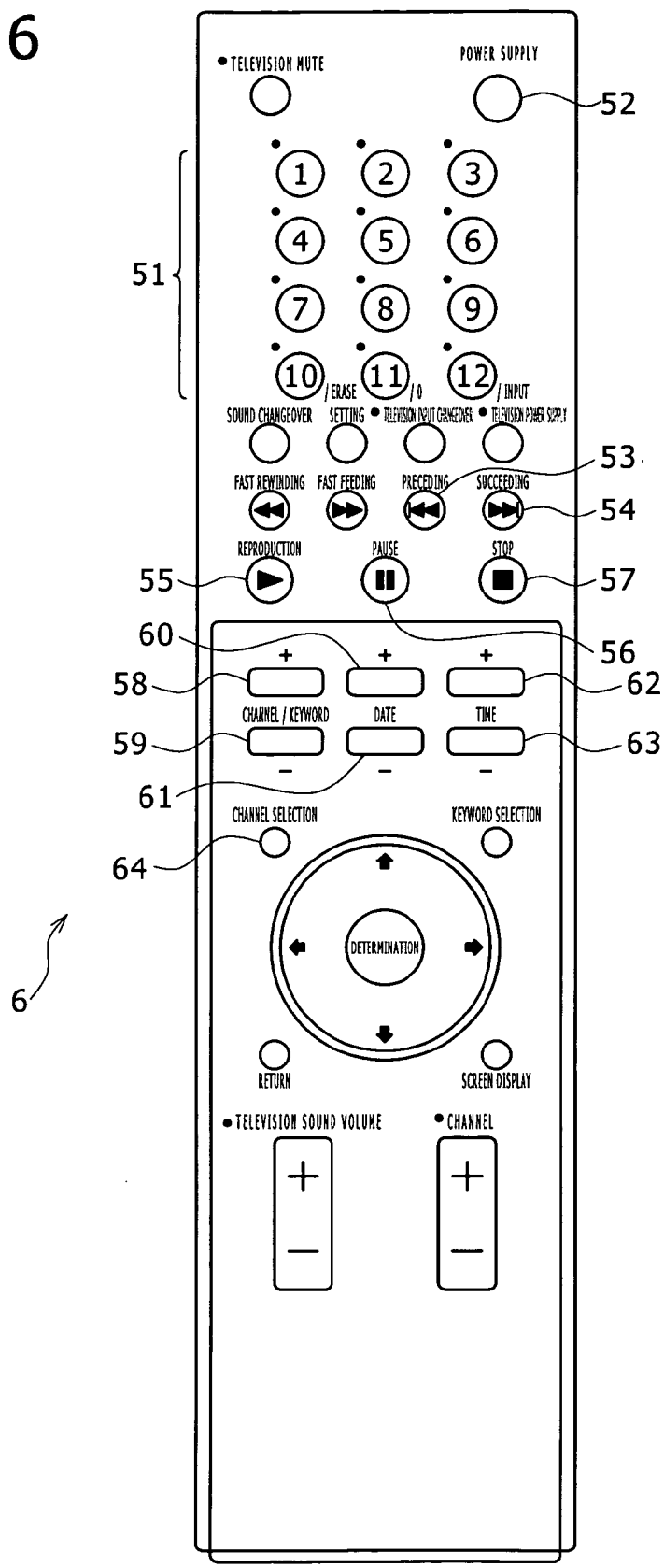
FIG. 6 is a schematic view showing an example of an appearance configuration of the surface of a remote controller configured to issue an instruction to a recording and reproduction apparatus shown in FIG. 1.

Further, the user can perform such a channel changing over operation of a recorded program as described above more simply, for example, through utilization of the remote controller 6 having such an appearance configuration as shown in FIG. 6.

In particular, FIG. 6 shows an example of an appearance configuration of the surface or operation face of the remote controller 6.

Referring to FIG. 6, a plurality of buttons is disposed on the surface of the remote controller 6 and has predetermined functions allocated thereto. In order to prevent the description from becoming redundant, description is given only of those ones of the buttons to which functions relating to the absolute time designation reproduction technique are allocated. In other words, although two or more functions may be allocated to some of the buttons described below, only those functions which relate to the absolute time designation reproduction technique are described below.

A function for designating a predetermined one channel is allocated to each of buttons 51 on which numerals 1 to 12 are printed. For example, where the channel A is allocated to the button on which 1 is printed, the user can perform designation of, that is, selection of or changeover to, the channel A by depression of the button. Thus, the buttons 51 are hereinafter referred to as Ch buttons 51. Further, where it is described in the following description that a "Ch button 51 is depressed," this description signifies that one of the 12 buttons on which the numerals 1 to 12 are printed individually is depressed.

Accordingly, when the user wants to search, while reproduction of a program is proceeding or after such production comes to an end, for another recorded program to be reproduced subsequently without causing the past program table to be displayed, only it is necessary for the user to perform such a simple operation as to depress a Ch button 51 to which a channel to which the selected channel is to be changed over, that is, a channel different from the channel in which the program being reproduced was broadcast, is allocated.

It is to be noted that an example of a process of the recording and reproduction apparatus 1 to be performed in response to such a user operation as described above, that is, a depressing operation of a Ch button 51, is hereinafter described as a process which is performed after a decision of YES is made by a process at step S64 of FIG. 16.

To a button 52, a function of changing over the power supply condition of the recording and reproduction apparatus 1 is allocated. Therefore, the button 52 is hereinafter referred to as power supply button 52.

To a button 53, a function of designating a recorded program which was broadcast from the same channel prior in time to a program or content being currently reproduced is allocated. In contrast, to a button 54, a function of designating a recorded program which was broadcast from the same channel later in time than, that is, next to, a program or content being currently reproduced is allocated. Therefore, the button 53 is hereinafter referred to as preceding button 53, and the button 54 is hereinafter referred to as succeeding button 54. It is to be noted that an example of a process of the recording and reproduction apparatus 1 when the preceding button 53 is depressed is hereinafter described as a process to be executed after a decision of YES is made by a process at step S77 of FIG. 17. On the other hand, an example of a process of the recording and reproduction apparatus 1 when the succeeding button 54 is depressed is hereinafter described as a process to be executed after a decision of YES is made by a process at step S84 of FIG. 18.

To a button 55, a function of issuing a reproduction instruction of a program to the recording and reproduction apparatus 1 is allocated. To a button 56, a function of issuing a temporary stopping command of a program being reproduced to the recording and reproduction apparatus 1 is allocated. To a button 57, a function of issuing a stopping instruction of a program being reproduced to the recording and reproduction apparatus 1 is allocated. Therefore, the button 55 is hereinafter referred to as reproduction button 55, the button 56 as pause button 56, and the button 57 as stop button 57.

It is to be noted that an example of a process of the recording and reproduction apparatus 1 where the stop button 57 is depressed during reproduction of a recorded program is hereinafter referred to as a process to be executed after a decision of YES is made by a process at step S95 of FIG. 20.

To a button 58, a function of changing over the reproduction object channel to a channel displaced by one channel distance in the + direction from the channel of a program or content being currently reproduced. Therefore, the button 58 is hereinafter referred to as Ch + button 58. Here, the + direction signifies, for example, a direction from the left to the right in the past program table shown in FIG. 5. Naturally, the + direction may otherwise be a direction opposite to the direction just described as occasion demands. Accordingly, for example, if the Ch + button 58 is depressed once when the channel of the program being currently reproduced is the A channel, then the reproduction object channel is changed over to the B channel. Then, if the Ch + button 58 is depressed once again, then the reproduction object channel is further changed over to the C channel.

On the other hand, to a button 59, a function of changing over the reproduction object channel to another channel displaced by one channel distance in the − direction from the channel of the program or content being current reproduced. Therefore, the button 59 is hereinafter referred to as Ch − button 59. Here, the − direction signifies the opposite direction to the + direction, that is, for example, a direction from the right to the left in the past program table shown in FIG. 5. Naturally, the − direction may otherwise be the direction opposite to the direction just described as occasion demands. Accordingly, for example, if the Ch − button 59 is depressed once when the channel of the program being currently reproduced is the C channel, then the reproduction object channel is changed over to the B channel. Then, if the Ch − button 59 is depressed once again, then the reproduction object channel is further changed over to the A channel.

Accordingly, when the user wants to search for a different program to be reproduced subsequently without causing the past program table to be displayed while reproduction of a program is proceeding or after such reproduction comes to an end, the user can perform such a simple operation as to depress the Ch + button 58 or the Ch − button 59 several times until the program of the desired channel is reproduced in place of the Ch buttons 51 described hereinabove.

It is to be noted that an example of a process of the recording and reproduction apparatus 1 to be executed in response to such a user operation as described above, that is, a depression operation of the Ch + button 58, is hereinafter described as a process performed after a decision of YES is made by a process at step S66 of FIG. 16. Further, an example of a process of the recording and reproduction apparatus 1 to be executed in response to a depression operation of the Ch − button 59 is hereinafter described as a process performed after a decision of YES is made by a process at step S68 of FIG. 16.

To buttons 60 to 63, a function of changing over absolute time of an operation object such as, for example, reproduction starting absolute time described hereinabove from time set or displayed at present to different time is allocated.

In particular, to the button 60, a function of changing over the date from within the absolute time of an operation object from the date set or displayed currently to another date later by one day, that is, to a date displaced by one day distance in the + direction is allocated. In contract, to the button 61, a function of changing over the date from within the absolute time of an operation object from the date set or displayed currently to another date preceding by one day, that is, to a date displaced by one day distance in the − direction is allocated. Therefore, the button 60 is hereinafter referred to as date + button 60, and the button 61 is hereinafter referred to as date − button 61.

To the button 62, a function of changing over the time (for example, hour: minute) from within the absolute time of an operation object from the time set or displayed currently to another time later by one predetermined unit such as, for example, one minute, that is, to time displaced by one unit distance in the + direction is allocated. In contrast, to the button 63, a function of changing over the time (for example, hour: minute) from within the absolute time of an operation object from the time set or displayed currently to another time preceding by one predetermined unit such as, for example, one minute, that is, to time displaced by one unit distance in the − direction is allocated. Therefore, the button 62 is hereinafter referred to as time + button 62, and the button 63 is hereinafter referred to as time − button 63.

Accordingly, the user can designate desired absolute time simply, for example, as reproduction starting absolute time by repetitions of a depression operation of the buttons from the date + button 60 to the time − button 63.

Figure 7:
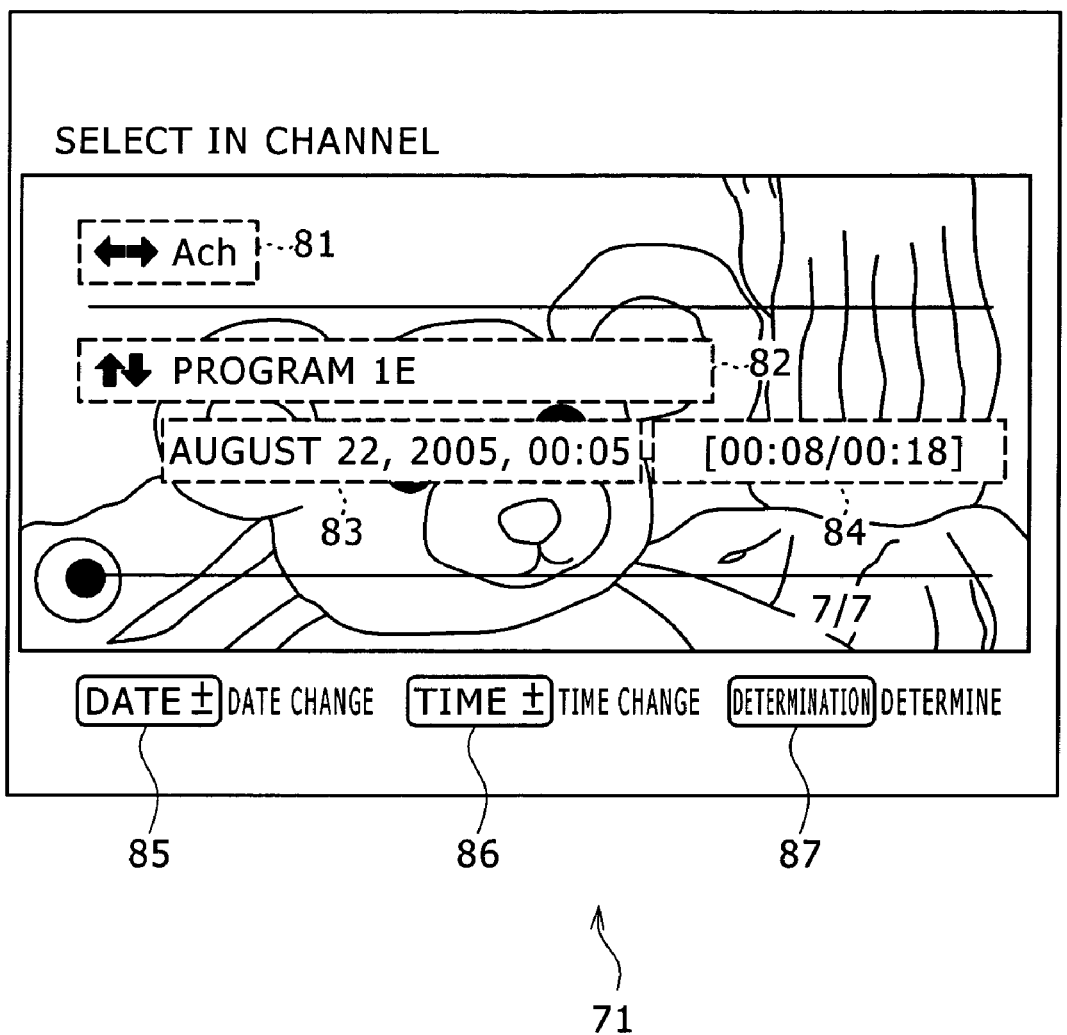
FIG. 7 is a schematic view showing an example of a channel selection image.

Further, to a button 64, a function of issuing a displaying command of, for example, an image 71 shown in FIG. 7 to the recording and reproduction apparatus 1 is allocated.

The user can utilize the image 71 to perform an operation of designating a desired recorded program to be reproduced. For example, the user can perform an operation of designating, after a desired channel is selected, a desired recorded program to be reproduced from among recorded programs of the desired channel. Therefore, such an image 71 as described above is hereinafter referred to as channel selection image 71. Further, in accordance with this, the button 64 shown in FIG. 6 of the remote controller 6 which is depressed in order to display the channel selection image 71 is hereinafter referred to as channel selection button 64.

The channel selection image 71 includes a display of a message of "Select in channel" and includes a display region 81 below the message. In the display region 81, the name of a channel currently designated or selected as a reproduction object channel by the user is displayed. In the example of FIG. 7, A ch is displayed in the display region 81.

It is to be noted that the user can change the reproduction object channel by performing a depression operation of a predetermined button of the remote controller 6 while such a channel selection image 71 as described above is displayed. It is to be noted that description of which one of the buttons should be depressed is omitted. In this instance, the channel name of the reproduction object channel after the change is displayed in the display region 81.

A display region 82 is displayed below the display region 81, and the program name of the reproduction object program designated or selected by the user at present is displayed in the display region 82. In FIG. 7, the program 1E is displayed in the display region 82.

It is to be noted that the user can change the reproduction object program by performing a depression operation of a predetermined button of the remote controller 6 while such a channel selection image 71 as described above is displayed. It is to be noted that description of which one of the buttons should be depressed is omitted. In this instance, the program name of the reproduction object program after the change is displayed in the display region 82.

A display region 83 is displayed on the left side below the display region 82, and the reproduction starting absolute time described hereinabove is displayed in the display region 83. In FIG. 7, Aug. 22, 2005, 00:05 is displayed in the display region 83. Further, a display region 84 is displayed rightwardly of the display region 83, that is, on the right side below the display region 82. In the display region 84, the reproduction starting position described hereinabove and the time length of the reproduction object program to be reproduced from the reproduction starting position, that is, a recorded program having the program name displayed in the display region 82 at present, are displayed in order. In particular, in FIG. 7, 0:08 as the reproduction starting position and 0:18 as the time length are displayed forwardly and rearwardly of "/."

It is to be noted that, as a background image disposed in an overlapping relationship with the display regions 81 to 84 described above, an image of the program having been reproduced before the depression operation of the channel selection button 64 shown in FIG. 6 remains displayed as it is. It is to be noted that the background image in FIG. 7 is an image of a bear.

Further, below the display regions 81 to 84 described above, displays 85 to 87 indicative of simple operation descriptions regarding those of the buttons of the remote controller 6 shown in FIG. 6 which can be operated on the channel selection image 71 are disposed. In other words, the user can recognize from the substance of the displays 85 to 87 what can be carried out on the channel selection image 71 without reading a manual.

In particular, the user can recognize from the substance of the display 85 that a desired date can be designated or changed simply as the date from within the reproduction starting absolute time by repeating a depression operation of the date + button 60 or the date − button 61 shown in FIG. 6 of the remote controller 6.

Further, the user can recognize from the substance of the display 86 that desired time can be designated or changed simply as the time from within the reproduction starting absolute time by repeating a depression operation of the time + button 62 or the time − button 63 shown in FIG. 6 of the remote controller 6.

Furthermore, the user can recognize from the substance of the display 87 that reproduction according to the display substance at the point of time of the channel selection image 71 can be performed by performing a depression operation of a button of the remote controller 6 shown in FIG. 6 which has a print of "determination" thereon. It is to be noted that the button mentioned just above is hereinafter referred to as determination button. Further, where the determination button is depressed, for example, in the present embodiment, a program reproduction process hereinafter described with reference to FIGS. 16 to 20 is executed.

In this manner, the user can simply perform an operation of issuing an instruction to start reproduction based on a designation of reproduction starting absolute time, that is, a reproduction starting instruction operation, by utilizing the channel selection image 71. It is to be noted that a detailed example of a process of the reproduction control section 17 of the recording and reproduction apparatus 1 of FIG. 1 for the reproduction starting instruction operation is hereinafter described with reference to FIGS. 11 to 15 and so forth. Further, the process of the reproduction control section 17 in this instance is hereinafter referred to as reproduction starting instruction process.

Referring back to FIG. 1, the recording and reproduction apparatus 1 includes the communication section 19 for controlling communication with the personal computer 2 in addition to the components or blocks such as the reproduction control section 17 described above.

The personal computer 2 can produce a predetermined recording command in response to various kinds of information provided thereto, for example, from the service providing server 3 through the network 4 or an instruction from the user or the like and issue the recording instruction to the recording and reproduction apparatus 1. Further, the personal computer 2 can implement functions similar to the functions described hereinabove of the recording and reproduction apparatus 1 except the functions of the tuner section 11 and the encoding section 12, that is, except the broadcasting program receiving and recording functions.

To this end, the personal computer 2 includes a main control section 31, an operation section 32, a communication section 33, an HDD 34, another communication section 35, a recording control section 36, a reproduction control section 37 and a reproduction section 38.

The main control section 31 controls action of the entire personal computer 2. Upon such control, the main control section 31 suitably utilizes the substance of an operation of the operation section 32 by the user.

The communication section 33 controls communication with the communication section 19 of the recording and reproduction apparatus 1.

The HDD 34 stores various kinds of information necessary for execution of the control by the main control section 31 and can store also a copy of the stored substance of the HDD 13 of the recording and reproduction apparatus 1 including video capsules, EPG information, a program information table and so forth.

The communication section 35 control communication with the service providing server 3 through the network 4.

The recording control section 36 controls recoding action into the HDD 13 of the recording and reproduction apparatus 1 or on the HDD 34 of the personal computer 2. For example, the recording control section 36 can produce a predetermined recording command including a recording reservation command in accordance with various kinds of information provided thereto from the service providing server 3 through the network 4 and the communication section 35 or a user instruction provided thereto through the operation section 32 and the main control section 31. Then, the recording control section 36 can issue the recording command to the recording and reproduction apparatus 1 through the communication section 33.

The reproduction control section 37 controls the reproduction section 38 based on a reproduction command from the operation section 32 or the like to reproduce a predetermined recorded program in the HDD 13 of the recording and reproduction apparatus 1 or the HDD 34 of the personal computer 2. The command from the operation section 32 or the like includes a channel changeover command or a program changeover command hereinafter described. Further, the reproduction control section 37 can control the reproduction section 38 to display the past program table described hereinabove with reference to FIG. 5 and so forth. In particular, while the reproduction control section 17 of the recording and reproduction apparatus 1 controls a reproduction action of the television receiver 5, the reproduction control section 37 performs a reproduction action of the reproduction section 38 similar to the reproduction action of the reproduction control section 17 of the recording and reproduction apparatus 1.

In other words, in the present embodiment, a recorded program in the HDD 13 of the recording and reproduction apparatus 1 or the HDD 34 of the personal computer 2 can be reproduced from any of the television receiver 5 and the reproduction section 38 of the personal computer 2 such as a display unit and a speaker built in the personal computer 2.

It is to be noted that an example of an image, that is, a reproduction image, which is utilized when a recorded program is to be reproduced or displayed on the display unit of the reproduction section 38 or the like, is hereinafter described with reference to FIGS. 25 to 30 and so forth.

Figure 8:
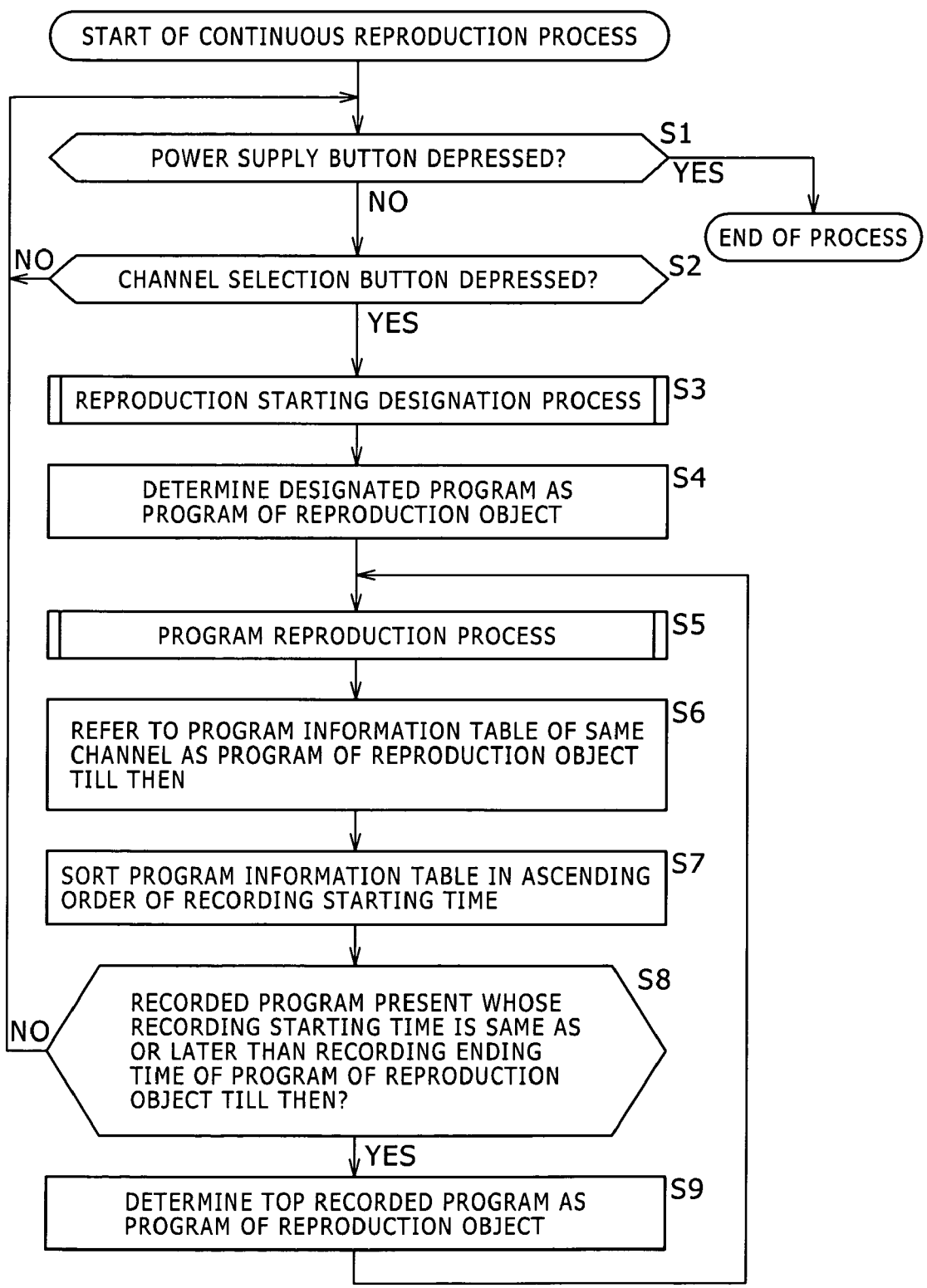
FIG. 8 is a flow chart illustrating an example of a continuous reproduction process of the recording and reproduction apparatus or a personal computer shown in FIG. 1.

Now, a reproduction process of the recording and reproduction apparatus 1 shown in FIG. 1 is described with reference to a flow chart of FIG. 8 and so forth. It is to be noted that, although details are hereinafter described, if, in the reproduction process illustrated in FIG. 8, reproduction is started once in response to a reproduction starting instruction operation of the user, then the reproduction is thereafter performed continuously until the power supply button 52 shown in FIG. 6 of the remote controller 6 is depressed later. Therefore, in the following description, the reproduction process of FIG. 8 is hereinafter referred to particularly as continuous reproduction process.

At step S1, the reproduction control section 17 of the recording and reproduction apparatus 1 decides whether or not the power supply button 52 is depressed.

If it is decided at step S1 that the power supply button 52 is depressed, then the continuous reproduction process is ended. Then, the power supply condition of the recording and reproduction apparatus 1 is changed over from an on state into an off state.

On the other hand, if it is decided at step S1 that the power supply button 52 is not depressed, then the processing advances to step S2.

At step S2, the reproduction control section 17 decides whether or not the channel selection button 64 shown in FIG. 6 is depressed.

If it is decided at step S2 that the channel selection button 64 is not depressed, then the processing is returned to step S1 so that the processes at the steps beginning with step S1 is repeated. In other words, at a stage prior to starting of reproduction, the processes at steps S1 and S2 are repeated until the channel selection button 64 is depressed as long as the power supply button 52 is not depressed so that the continuous reproduction process remains in a waiting state.

If the channel selection button 64 is selected thereafter, then a decision of YES is made at step S2 and the processing advances to step S3. In this instance, the user can perform a reproduction starting instruction operation making use of the channel selection image 71 shown in FIG. 7. Accordingly, a reproduction starting instruction process corresponding to the reproduction starting instruction operation is executed as a process at step S3. It is to be noted that a detailed example of the reproduction starting instruction process is hereinafter described with reference to FIGS. 11 to 15 and so forth.

If a predetermined program is designated by the user as a result of the preproduction starting instruction process at step S3, then the processing advances to step S4. At step S4, the reproduction control section 17 determines the designated program as a program of a reproduction object.

Then at step S5, the reproduction control section 17 executes a control process of controlling the television receiver 5 to reproduce the reproduction object program. Such a reproduction process as just mentioned is hereinafter referred to as program reproduction process. It is to be noted that a detailed example of the program reproduction process is hereinafter described with reference to FIGS. 16 to 20 and so forth.

When the reproduction of the reproduction object program comes to an end as hereinafter described, the program reproduction process at step S5 is ended (refer to step S62 of FIG. 16), and the processing advances to step S6.

At step S6, the reproduction control section 17 refers to the program information table of the channel same as that of the reproduction object program in the HDD 13. Then at step S7, the reproduction control section 17 sorts the program information table in an ascending order of the recording starting time in the form of absolute time.

It is to be noted that, where the program information table is sorted in advance in the recording starting time as in the program information tables described hereinabove with reference to FIGS. 2 to 4, the process at step S7 can be omitted. Further, in FIGS. 2 to 4, the recording starting time is represented merely as "starting time."

Then at step S8, the reproduction control section 17 decides whether or not the program information table includes a recorded program whose recording starting time in absolute time is same as or later than the recording ending time in absolute time of the current reproduction object program.

Thus, if a different program which was broadcast at absolute time later than that of the current reproduction object program and is of the same channel as that of the current reproduction object program is not recorded in the HDD 13, then a decision of NO is made at step S8. In this instance, the processing returns to step S1 so that the processes at the steps beginning with step S1 are repeated. In other words, if the reproduction of the current reproduction object program comes to an end, then the reproduction of the television receiver 5 is ended once, and the continuous reproduction process is placed into a waiting state. It is to be noted that such a different program as mentioned above is hereinafter referred to as different recorded program.

On the other hand, if one or more different recorded programs are recorded in the HDD 13, then a decision of YES is made at step S8, and the processing advances to step S9.

At step S9, the reproduction control section 17 determines the most preceding one of the one or more different recorded programs as a reproduction object program. Here, the most preceding program is a recorded program whose recording starting time in absolute time is closest (including the same time) to the recording ending time in absolute time of the reproduction object program till then. Thereafter, the processing returns to step S5 so that the processes at the steps beginning with step S5 are repeated. In other words, the different recorded program determined as the reproduction object program by the process at step S9 is reproduced on the television receiver 5.

In this manner, where a plurality of recorded programs of the same channel are present, such a continuous reproduction process as described above is executed by the reproduction control section 17. Consequently, the plural recorded programs can be reproduced continuously.

In particular, it is assumed that recorded programs having program names of "1-A," "2-A," "1-B," "3-A" and "1-C" illustrated in FIG. 9 from among programs which were scheduled to be broadcast within a time zone of 00:00:00 to 04:00:00 of Aug. 31, 2005 are stored in the HDD 13.

More accurately, the broadcasting substance broadcast actually from the A ch within the time zone of 00:00:00 to 01:00:00 of Aug. 31, 2005 is recorded as a program having the program name of "1-A." The program of the program name of "1-A" is hereinafter referred to as program "1-A."

Similarly, the broadcasting substance broadcast actually from the B ch within the time zone of 00:00:00 to 01:00:00 of Aug. 31, 2005 is recorded as a program having the program name of "2-A." The program of the program name of "2-A" is hereinafter referred to as program "2-A."

The broadcasting substance broadcast actually from the A ch within the time zone of 01:00:00 to 02:00:00 of Aug. 31, 2005 is recorded as a program having the program name of "1-B." The program of the program name of "1-B" is hereinafter referred to as program "1-B."

The broadcasting substance broadcast actually from the C ch within the time zone of 00:00:00 to 01:00:00 of Aug. 31, 2005 is recorded as a program having the program name of "3-A." The program of the program name of "3-A" is hereinafter referred to as program "3-A."

The broadcasting substance broadcast actually from the A ch within the time zone of 03:00:00 to 04:00:00 of Aug. 31, 2005 is recorded as a program having the program name of "1-C." The program of the program name of "1-C" is hereinafter referred to as program "1-C."

In particular, if broadcasting of the A channel was performed as scheduled, then the entire program "1-A" is the broadcasting content actually broadcast from the A ch within the time zone of 00:00:00 to 01:00:00 of Aug. 31, 2005. Similarly, the entire program "1-B" is the broadcasting program actually broadcast from the A ch within the time zone of 01:00:00 to 02:00:00 of Aug. 31, 2005.

However, if a different program such as, for example, a baseball program preceding in time to the program "1-A" was broadcast from the A ch within some extended time period, then the rear half of the preceding program and the front half of the program "1-A" are the program substance actually broadcast from the A ch within the time zone of 00:00:00 to 01:00:00 of Aug. 31, 2005.

In this instance, a problem occurs that, while the user thinks that the entire program "1-A" has been recorded, the rear half of the program "1-A" is not recorded actually.

It is to be noted, however, that, in this instance, the rear half of the program "1-A" and the front half of the program "1-B" are the broadcasting substance actually broadcast from the A ch within the time zone of 01:00:00 to 02:00:00 of Aug. 31, 2005 and are recorded as the program "1-B." Accordingly, as viewed from the entire recorded substance of the HDD 13, the entire program "1-A" is recorded in the HDD 13. In this manner, such a program as mentioned above can be solved by recording a plurality of programs which are contiguous to each other in time.

However, in this instance, if the user performs a reproduction instruction operation of the program "1-A," then according to a conventional reproduction process, only the broadcasting content actually broadcast from the A ch within the time zone of 01:00:00 to 02:00:00 of Aug. 31, 2005 is reproduced. In other words, according to the conventional reproduction process, only the front half of the program "1-A" is reproduced. Accordingly, where a conventional recording and reproduction apparatus which executes the conventional reproduction process is used, such a new problem occurs that, when the user wants to enjoy the rear half of the program "1-A," the user must perform such a cumbersome operation as to perform a reproduction instruction operation of the program "1-B" separately.

Thus, in order to solve such a new problem as described above, in the present embodiment, the recording and reproduction apparatus 1 executes the continuous reproduction process. In particular, if the continuous reproduction process of FIG. 8 is executed, then the broadcasting substance actually broadcast from the A ch within the time zone of 00:00:00 to 01:00:00 of Aug. 31, 2005 and the broadcasting substance actually broadcast from the A ch within the time zone of 01:00:00 to 02:00:00 of Aug. 31, 2005 are reproduced continuously. As a result, the entire program "1-A" is reproduced continuously, and such a new program as described above can be solved.

In particular, if the "designated program" in the process at step S4 of FIG. 8 is the program "1-A," then the broadcasting substance actually broadcast from the A ch within the time zone of 00:00:00 to 01:00:00 of Aug. 31, 2005 is reproduced by the program reproduction process at next step S5.

Then at next step S6, a pertaining program information table of the A ch, which is different from that shown in FIG. 2 but is not shown in the drawings, is referred to, and the program "1-A," program "1-B" and program "1-C" are sorted in order by the process at step S7 as occasion demands.

In this instance, a decision of YES is made at step S8, and the program "1-B" is determined as a reproduction object program by the process at step S9. Accordingly, in the program process at next step S5, the broadcasting substance actually broadcast and recorded as the program "1-B," that is, the broadcasting substance actually broadcast from the A ch within the time zone of 01:00:00 to 02:00:00 of Aug. 31, 2005, is reproduced. As a result, the entire program "1-A" is reproduced continuously.

It is to be noted that, later at next step S6, the program information table of the A ch is referred to again, and the program "1-A," program "1-B" and program "1-C" are sorted in order by the process at step S7 as occasion demands. Actually, however, since the sorting was performed by the process at step S7 in the preceding operation cycle, the process at step S7 for the second time and so forth is not required.

In this instance, a decision of YES is made by the process at step S8, and the program "1-C" is determined as a recorded program of a reproduction object by the process at step S9. Accordingly, in the program process at next step S5, the actual broadcasting program recorded as the program "1-C," that is, the broadcasting program actually broadcast from the A ch within the time zone of 03:00:00 to 04:00:00 of Aug. 31, 2005, is reproduced.

In particular, the program "1-B" and the program "1-C" which are not continuous to each other in an actual broadcasting time zone are reproduced continuously. More accurately, since an actual broadcasting time zone is sometimes displaced from a scheduled broadcasting time zone because of extension of a baseball broadcast as described above, the broadcasting substance actually broadcast from the A ch within the time zone of 01:00:00 to 02:00:00 of Aug. 31, 2005 and the broadcasting substance actually broadcast from the A ch within the time zone of 03:00:00 to 04:00:00 of Aug. 31, 2005 are reproduced continuously.

In other words, when the broadcasting substance changes over from the broadcasting substance actually broadcast from the A ch within the time zone of 01:00:00 to 02:00:00 of Aug. 31, 2005, that is, the recorded substance recorded as the program "1-B," to the broadcasting substance actually broadcast from the A ch within the time zone of 03:00:00 to 04:00:00 of Aug. 31, 2005, that is, the recorded substance recorded as the program "1-C," the scene or frame reproduced on the television receiver 5 becomes discontinuous. Thus, the user may possibly have a sense of incongruity.

Figure 10:
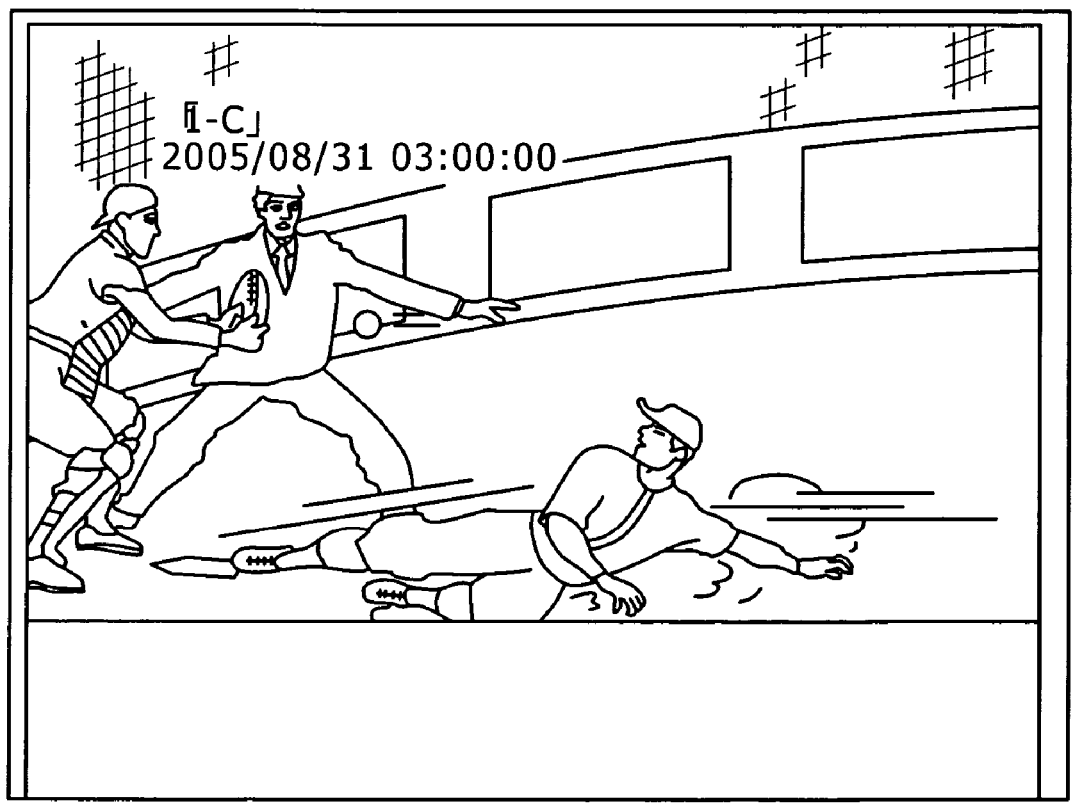
FIG. 10 is a schematic view showing an example of a recorded program reproduced by a television apparatus or the personal computer shown in FIG. 1.

Therefore, in the present embodiment, in order to notify the user that the broadcasting content changes over from the recorded substance recorded as the program "1-B" to the recorded substance recorded as the program "1-C," the reproduction control section 17 presents an indication of this on the television receiver 5. This presentation is performed not only upon changeover from the program "1-B" to the program "1-C" but also upon every such changeover among all programs. It is to be noted that any presentation method may be used for the presentation. For example, such a presentation method may be adopted that the program name after the changeover is displayed on the screen of the television receiver 5 as seen in FIG. 10 for a period of time after the changeover of the program or until after an erasure instruction is issued by the user. In particular, FIG. 10 illustrates changeover from the program "1-B" to the program "1-C," and therefore, "1-C" is displayed as the program name. In this instance, also 2005/08/31 03:00:00 which is the recording starting time in absolute time is displayed.

Further, while the recorded substance of the HDD 13 in the present embodiment is managed through such program information tables for the individual channels as seen in FIGS. 2 to 4, also such an alternative management form may possibly be adopted wherein the recorded substance is managed merely through such a table as shown in FIG. 9 which does not involve any classification in channel. In such an instance, the reproduction control section 17 may execute the following process as the continuous reproduction process.

In particular, the reproduction control section 17 may execute, in place of the process at step S6 of FIG. 8, a process of "filtering information (rows) of programs of the same channel as that of a current reproduction object program from within the table of FIG. 9 or the like." Then, the reproduction control section 17 may execute, in place of the process at step S7 of FIG. 8, a process of "sorting the filtered information in an ascending order of the recording starting time." It is to be noted that, for the other processes, the corresponding processes of the continuous reproduction process of FIG. 8 may be adopted as they are.

In particular, for example, where the current reproduction object program is the program "1-A," by the alternative processes described above, information of the program "1-A," information of the program "1-B" and information of the program "1-C," which are information of the first, third and fourth rows of the table of FIG. 9 are filtered and sorted in this order.

An outline of the continuous reproduction process of FIG. 8 is such as described above. Now, a detailed example of the reproduction starting instruction process at step S3 as details of the continuous reproduction process is described.

Figure 11:
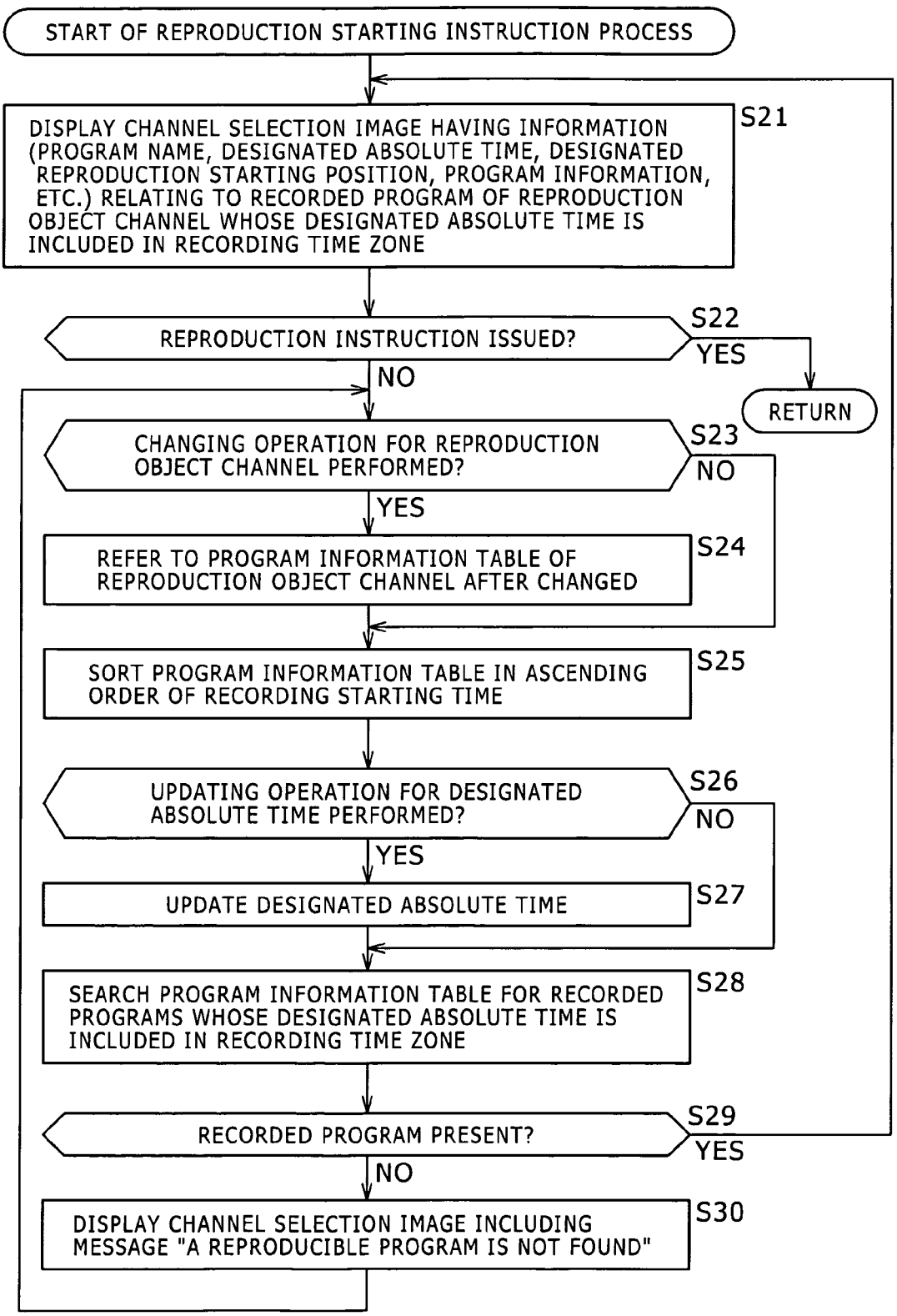
FIG. 11 is a flow chart illustrating an example of details of a reproduction starting instruction process of the continuous reproduction process of FIG. 8.

FIG. 11 illustrates an example of details of the reproduction starting instruction process.

At step S21, the reproduction control section 17 shown in FIG. 1 controls the television receiver 5 to display a channel selection screen having information regarding recorded programs of the reproduction object channel from among recorded programs whose designated absolute time is included in the recording time zone. The information relating to recorded programs includes the program name, designated absolute time, designated reproduction starting position, program information and so forth.

Here, the designated absolute time is time designated or indicated as reproduction starting absolute time by the user. However, only in the process at step S21 for the first time, for example, in the present embodiment, a channel registered as an initial value becomes a reproduction object channel, and the recording starting time of a predetermined one of recorded programs of the reproduction object channel is adopted as designated absolute time.

Further, for example, in the present embodiment, the channel selection image 71 described hereinabove with reference to FIG. 7 is displayed by the process at step S21. In this instance, the reproduction object channel from within the "information relating to recorded programs of the reproduction object channel whose designated absolute time is included in the recording time zone" at step S21 is displayed in the display region 81. Meanwhile, the program name is displayed in the display region 82, and the designated absolute time is displayed as reproduction starting absolute time in the display region 83. Further, the designated reproduction starting position is displayed as a reproduction starting position corresponding to the reproduction starting absolute time in the display region 84 together with the time length of the program. It is to be noted that, in the example of FIG. 7, display of the program information is omitted.

At step S22, the reproduction control section 17 decides whether or not a reproduction instruction is issued.

For example, in the present embodiment, when the determination button of the remote controller 6 of FIG. 6 is depressed, it is decided at step S22 that a reproduction instruction is issued, and the reproduction starting instruction is ended. In particular, the process at step S3 of FIG. 8 is ended, and the processing advances to step S4.

In particular, for example, if the determination button of the remote controller 6 is depressed in the display state of FIG. 7, then the program 1E becomes the "designated program" as viewed at step S4. Then, the program 1E is determined as a program of a reproduction object by the process at step S4, and reproduction of the program 1E is started from the position later than 8 minutes from the top of the program 1E (refer to the display substance of the display region 84 of FIG. 7) by the program reproduction process at step S5.

On the other hand, if the determination button of the remote controller 6 of FIG. 6 is not depressed, then it is decided at step S22 that a reproduction instruction is not issued, and the processing advances to step S23.

At step S23, the reproduction control section 17 decides whether or not a changing operation of the reproduction object channel is performed.

In particular, as described hereinabove, the user can change the reproduction object channel by the user performing a depression operation of the predetermined button of the remote controller 6 while the channel selection image 71 of FIG. 7 is displayed. It is to be noted that description of which one of the buttons is to be depressed is omitted. Accordingly, where such a depression operation is performed, it is decided at step S23 that a changing operation of the reproduction object channel is performed, and the processing advances to step S24.

At step S24, the reproduction control section 17 refers to the program information table of the reproduction object channel after the change in the HDD 13. Thereafter, the processing advances to step S25.

On the other hand, if it is decided at step S23 that a changing operation of the reproduction object channel is not performed, then the process at step S24 is not executed, that is, the reproduction object channel is not changed. Therefore, the program information table of the current reproduction object channel continues to be referred to, and in this state, the processing advances to step S25.

At step S25, the reproduction control section 17 sorts the program information table in an ascending order of the recording starting time in absolute time. However, where the program information table is sorted in advance in an ascending order of the recording starting time as in the program information tables of FIGS. 2 to 4 described hereinabove, the process at step S25 can be omitted.

At step S26, the reproduction control section 17 decides whether or not a changing operation of the designated absolute time is performed.

As described hereinabove, the user can designate desired time simply as the designated absolute time, which is time designated as reproduction starting absolute time, by repeating a depression operation of the buttons of the remote controller 6 of FIG. 6 from the date + button 60 to the time − button 63. Accordingly, where such a depression operation is performed, it is decided at step S26 that an updating operation of the designated absolute time is performed, and the processing advances to step S27.

At step S27, the reproduction control section 17 updates the designated absolute time. Thereafter, the processing advances to step S28.

On the other hand, if it is decided at step S26 that an updating operation of the designated absolute time is not performed, then the process at step S27 is not executed, that is, the designated absolute time is not updated. Thus, the processing advances to step S28.

At step S28, the reproduction control section 17 searches the program information table for recorded programs whose designated absolute time is included in the recording time zone. Then, at step S28, the reproduction control section 17 decides from a result of the search whether or not a recorded program is present.

If it is decided at step S29 that a recorded program is present, then the processing is returned to step S21 so that the processes at the steps beginning with step S21 are repeated. In particular, the display substance of the television receiver 5 is updated to a channel selection image having information regarding the recorded program searched out by the process at step S28. However, if a decision of NO is made by the process at step S23 and then a decision of NO is made by the process at step S26, that is, if none of a changing operation of the reproduction object channel and an updating operation of the designated absolute value is performed, then the display substance of the channel selection image after the updating coincides with that before the updating. That is, no particular updating is performed.

Figure 12:
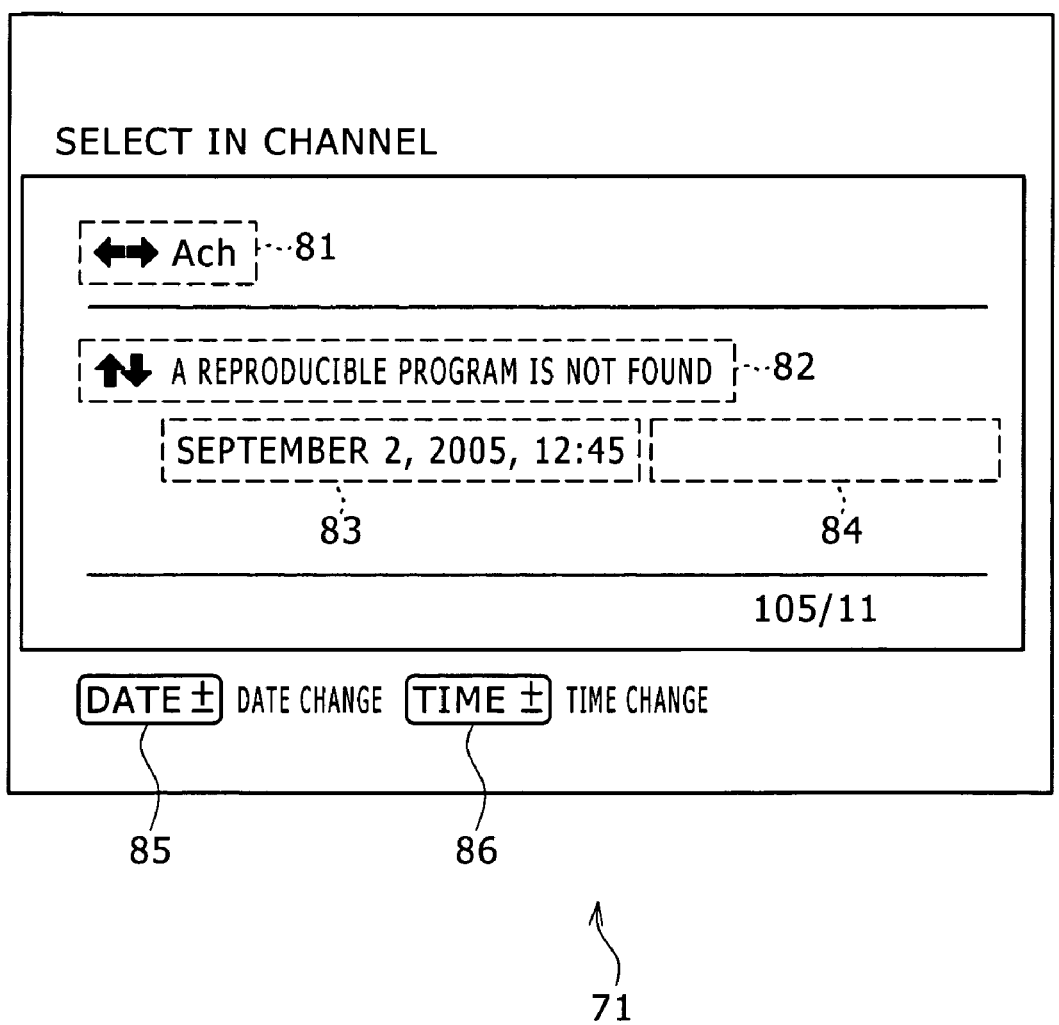
FIG. 12 is a schematic view showing an example of a channel selection image.

On the other hand, if it is decided at step S29 that no recorded program is present, then the reproduction control section 17 controls at step S30 so that the television receiver 5 displays a channel selection image including a message of "A reproducible program is not found," more particularly, for example, the channel selection image 71 shown in FIG. 12. Thereafter, the processing is returned to step S23 so that the processes at the steps beginning with step S23 are repeated.

Figure 13:
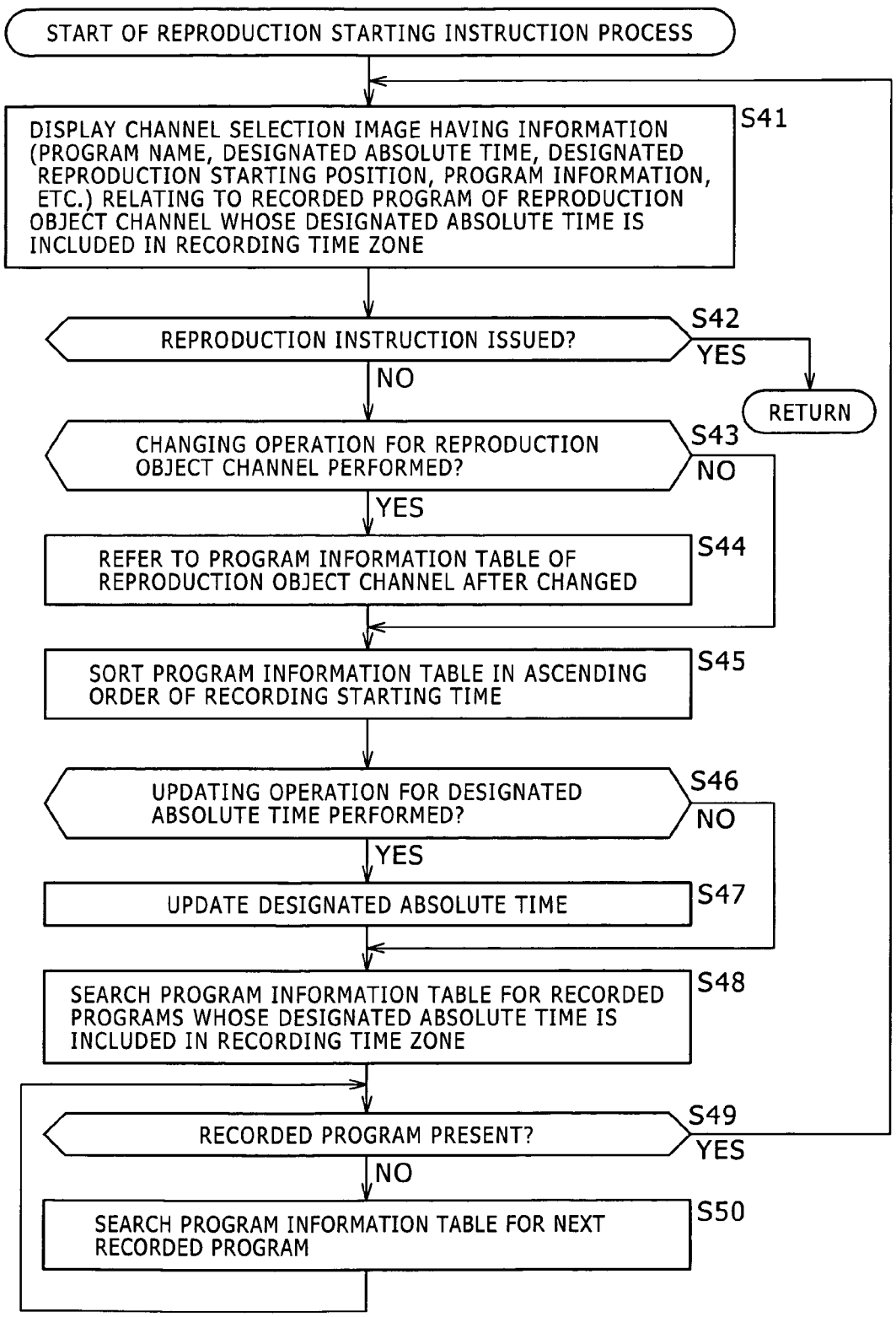
FIG. 13 is a flow chart illustrating another example of details of the reproduction starting instruction process of the continuous reproduction process of FIG. 8.

A reproduction starting instruction process different from that described hereinabove with reference to FIG. 11 is illustrated in FIG. 13.

It is to be noted that processes at steps S41 to S49 are similar to those at steps S21 to S29 of FIG. 11, respectively, and therefore, description of them is omitted herein to avoid redundancy.

In other words, the reproduction starting instruction process of FIG. 13 is different only in succeeding processes when it is decided by the process at step S49 that a recorded program is not present from those in the reproduction starting instruction process of FIG. 11.

In particular, in the reproduction starting instruction process of FIG. 13, if it is decided by the process at step S49 that a recorded program is not present, then the reproduction control section 17 does not display the message of "A reproducible program is not found." Instead, the reproduction control section 17 searches the program information table for a next recorded program at step S50, and then returns the processing to step S49 so that the processes at the steps beginning with step S49 are repeated. In particular, in this instance, a decision of YES is made by the process at step S48, and then by the process at step S41, the display substance of the television receiver 5 is updated to a channel selection image having information regarding the next recorded program searched out by the process at step S50. It is to be noted that, in this instance, the recording starting time, for example, of the next recorded program searched out by the process at step S50 is adopted as the designated absolute time.

Figure 14:
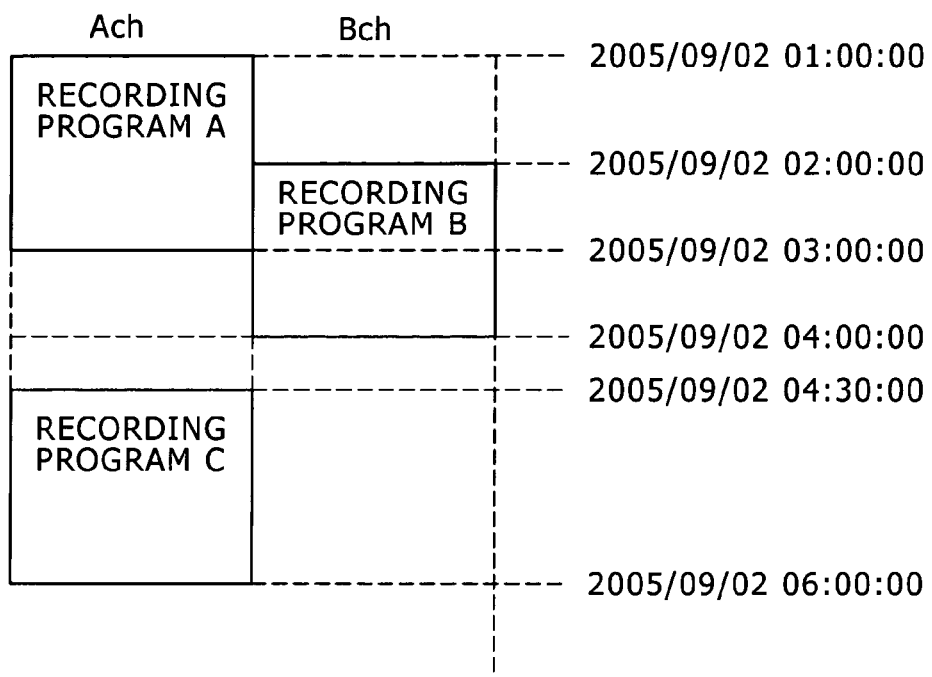
FIGS. 14 and 15 are views illustrating examples of the reproduction starting instruction process of FIG. 11 or 13 and illustrating particular examples of the recorded substance of the recording and reproduction apparatus or the like shown FIG. 1.

In particular, it is assumed that, for example, from among programs broadcast within the time zone from 01:00:00 to 06:00:00 of Sep. 2, 2005, recorded programs A, B and C illustrated in FIG. 14 are present in the HDD 13. Here, it is assumed that the programs mentioned are broadcast as scheduled without any extension of a program such as a baseball program for the simplification of description.

The recorded program A is a program broadcast from the A ch within the time zone of 01:00:00 to 03:00:00 of Sep. 2, 2005. The recorded program B was broadcast from the B ch within the time zone of 02:00:00 to 04:00:00 of Sep. 2, 2005. The recorded program C was broadcast from the A ch within the time zone of 04:30:00 to 06:00:00 of Sep. 2, 2005.

In this instance, if it is assumed that the A ch is designated as a reproduction object channel by the user and absolute time within the time zone of 01:00:00 to 03:00:00 of Sep. 2, 2005 is designated as the designated absolute time, that is, as time designated as reproduction starting time, a channel selection image regarding the recorded program A is displayed.

Thereafter, if an updating operation is performed to designate predetermined time within the time period of 03:00:00 to 04:30:00 of Sep. 2, 2005, then in the example of FIG. 11, a channel selection image including the message "A reproducible program is not found." is displayed by the process at step S30. On the other hand, in the example of FIG. 13, the recorded program C is searched out by the process at step S50, and a decision of YES is made by the process at step S49. Then, a channel selection image regarding the recorded program C is displayed by the process at next step S41.

Further, if an updating operation is performed to designate predetermined time within the time period of 03:00:00 to 04:00:00 of Sep. 2, 2005 as designated absolute time and besides an updating operation is performed to change the reproduction object channel to the B ch, then the recorded program B is searched for by the process at step S28 in the example of FIG. 11 and by the process at step S48 in the example of FIG. 13. Then, a decision of YES is made by the process at step S29 or S49, and a channel selection image regarding the recorded program B is displayed by the process at next step S21 or S41.

Figure 15:
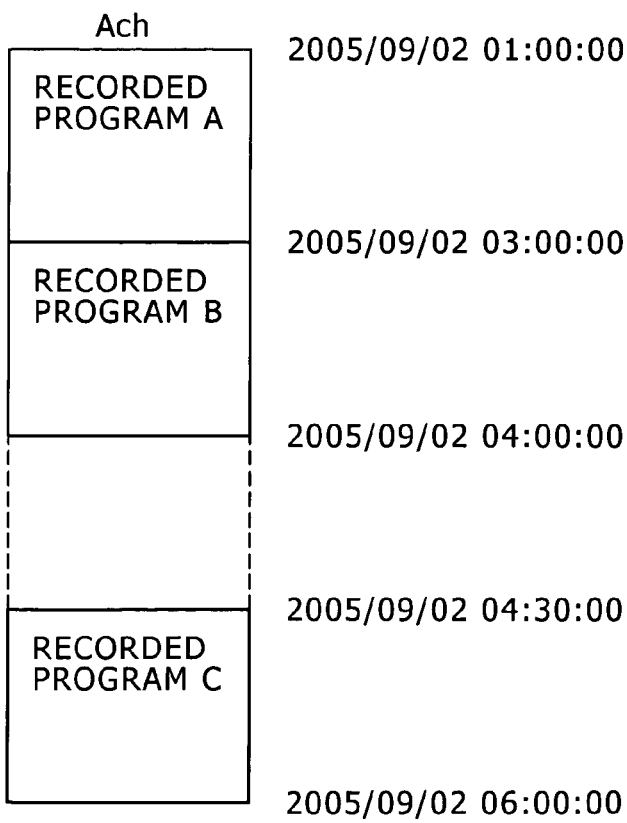

Further, it is assumed that, for example, from among programs broadcast within the time zone from 01:00:00 to 06:00:00 of Sep. 2, 2005, recorded programs A, C and D illustrated in FIG. 15 are present in the HDD 13. Also here, it is assumed that the broadcast programs mentioned were broadcast as scheduled without any extension of a program such as a baseball program for the simplification of description.

The recorded programs A, C and D were all broadcast from the A ch. From among them, the recorded programs A and C are illustrated also in FIG. 14. On the other hand, the recorded program D was broadcast from the A ch within the time zone of 03:00:00 to 04:00:00 of Sep. 2, 2005. In other words, the recorded programs A and D were broadcast continuously in time from the A ch.

In this instance, if the A ch is designated as a reproduction object channel by the user and besides absolute time within the time zone of 01:00:00 to 03:00:00 of Sep. 2, 2005 is designated as the designated absolute time, that is, as time designated as reproduction starting time, then a channel selection image regarding the recorded program A is displayed in a quite similar manner as in the example of FIG. 14.

It is to be noted, however, that, even if an updating operation is thereafter performed to designate time later than 03:00:00 of Sep. 2, 2005 as designated absolute time, if the updated time is prior to 04:00:00 of Sep. 2, 2005, then the recorded program D is searched for by the process at step S28 in FIG. 11 or by the process at step S48 in FIG. 13. Then, a decision of YES is made by the process at next step S29 or S49, and then a channel selection image regarding the recorded program D is displayed by the process at next step S21 or S41.

Further, even if an updating operation is performed to designate time later than 03:00:00 of Sep. 2, 2005 as designated absolute time, if the updated time is within the time zone of 04:00:00 to 04:30:00 of Sep. 2, 2005, then in the example of FIG. 11, a channel selection image including the message "A reproducible program is not found." is displayed by the process at step S30. On the other hand, in the example of FIG. 13, the recorded program C is searched out by the process at step S50, and a decision of YES is made by the process at step S49. Then, a channel selection image regarding the recorded program C is displayed by the process at next step S41.

Further, even if an updating operation is performed to designate time later than 03:00:00 of Sep. 2, 2005, if the updated time is within the time zone of 04:30:00 to 06:00:00 of Sep. 2, 2005, then the recorded program C is searched for by the process at step S28 in the example of FIG. 11 and by the process at step S48 in the example of FIG. 13. Then, a decision of YES is made by the process at step S29 or S49, and a channel selection image regarding the recorded program C is displayed by the process at next step S21 or S41.

In this manner, in the present embodiment, since the reproduction control section 17 executes the reproduction starting instruction process of FIG. 11 or 13, the user can carry out an intuitive reproduction starting instruction operation based on absolute time.

Now, a detailed example of the program reproduction process at step S5 from within the continuous reproduction process of FIG. 8 is described with reference to flow charts of FIGS. 16 to 20.

It is to be noted that, in the program reproduction process of FIGS. 16 to 20, a channel changeover instruction operation is performed by a depression operation of at least one of the Ch buttons 51, Ch + button 58 and Ch − button 59 of the remote controller 6 described hereinabove with reference to FIG. 6. Further, a program changeover operation which is an instruction operation to change over the channel to a channel preceding or succeeding in time is performed by a depression operation of at least one of the preceding button 53 and the succeeding button 54 of the remote controller 6 described hereinabove with reference to FIG. 6. It is to be noted that those of the buttons of the remote controller 6 other than the preceding button 53 and the succeeding button 54 as well as the channel selection button 64 and the stop button 57 are hereinafter referred to collectively as the other buttons.

Referring first to FIG. 16, the reproduction control section 17 controls so that the television receiver 5 reproduces a reproduction object program from a predetermined reproduction starting position at step S61.

In the process at step S61 which is performed for the first time, that is, in the process at step S61 executed immediately after the process at step S4 of FIG. 8, the reproduction object program determined by the process at step S4, that is, a program designated so as to be reproduced by the reproduction starting instruction process at step S3, is reproduced. Thereupon, the reproduction starting position corresponds to the reproduction starting absolute time, which is the designated absolute time in FIG. 11 or 13, designated by the reproduction starting instruction process at step S3. The position corresponding to the reproduction starting absolute time is given as a value obtained by conversion of the time of the top of the program into relative time with reference to the reference time 00:00.

On the other hand, in the process at step S61 executed after a process at step S94 of FIG. 19 hereinafter described, a reproduction object program determined by the process at step S94, that is, a program designated so as to be reproduced by a reproduction staring instruction process at step S93 hereinafter described, is reproduced. The reproduction starting instruction process at step S93 is similar to that of the flow chart of FIG. 11 or 13 described hereinabove. Upon such reproduction, the reproduction starting position is given as a position corresponding to reproduction starting absolute time, which is the designated absolute time in FIG. 11 or 13, designated by the reproduction starting instruction process at step S93. The position corresponding to reproduction starting absolute time here is given as a value obtained by conversion of the time of the top of the program into relative time with reference to the reference time 00:00.

At step S62, the reproduction control section 17 decides whether or not reproduction of the program comes to an end. It is to be noted that the reason why the term of recorded program is not used here is that a program which is currently being broadcast may be reproduced (refer to step S91 of FIG. 18 hereinafter described).

If reproduction of the program comes to an end, then a decision of YES is made at step S62, and the present program reproduction process is ended. In other words, the process at step S5 of FIG. 8 is ended, and the processing advances to step S6.

On the other hand, if the program is still being reproduced, then a decision of NO is made at step S62, and the processing advances to step S63.

At step S63, the reproduction control section 17 decides whether or not any of the buttons of the remote controller 6 is depressed.

If it is decided at step S63 that any of the buttons of the remote controller 6 is depressed, then the processing is returned to step S62 so that the processes at the steps beginning with step S62 are repeated. In other words, loop processing at steps S62 (NO) and S63 (NO) is repeated until after one of the buttons of the remote controller 6 is depressed, or in other words, until after reproduction of the program comes to an end, that is, during reproduction of the program. Consequently, the present program reproduction process remains in a waiting state.

Thereafter, if one of the buttons of the remote controller 6 is depressed, then a decision of YES is made by the process at step S63, and the processing advances to step S64.

At step S64, the reproduction control section 17 decides whether or not one of the Ch buttons 51 shown in FIG. 6 is depressed.

If it is decided at step S64 that one of the Ch buttons 51 is depressed, then the reproduction control section 17 refers to a program information table corresponding to a channel designated by the Ch button 51, that is, a channel allocated to the depressed Ch button 51 in the HDD 13. Then, the processing advances to step S70. Processes at steps beginning with step S70 are hereinafter described.

On the other hand, if it is decided at step S64 that none of the Ch buttons 51 is depressed, then the processing advances to step S66.

At step S66, the reproduction control section 17 decides whether or not the Ch + button 58 shown in FIG. 6 is depressed.

If it is decided at step S66 that the Ch + button 58 is depressed, then the reproduction control section 17 refers to a program information table of a channel next in the + direction to the channel of the program being currently reproduced in the HDD 13 at step S67. The next channel in this instance is a channel indicated on the right side in the past program table. Then, the processing advances to step S70. The processes at steps beginning with step S70 are hereinafter described.

On the other hand, if it is decided at step S66 that the Ch + button 58 is not depressed, then the processing advances to step S68.

At step S68, the reproduction control section 17 decides whether or not the Ch − button 59 shown in FIG. 6 is depressed.

Figure 17:
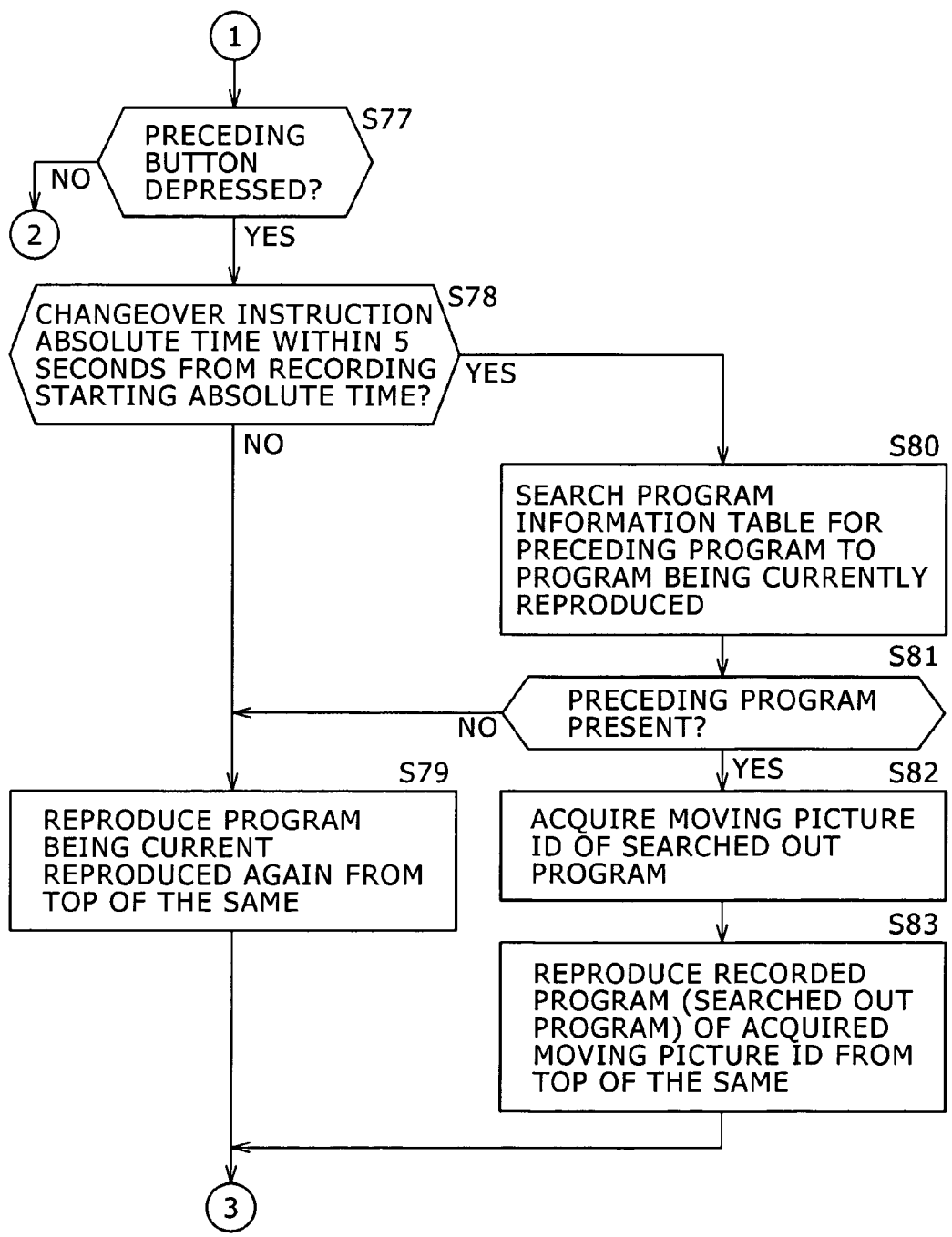

If it is decided at step S68 that the Ch − button 59 is not depressed, then the processing advances to step S77 of FIG. 17. Also processes at steps beginning with step S77 are hereinafter described.

On the other hand, if it is decided at step S68 that the Ch − button 59 is depressed, then the reproduction control section 17 refers to a program information table of a channel next in the − direction to the channel of the program being currently reproduced in the HDD 13 at step S69. The next channel in this instance is indicated on the left side in the past program table. Then, the processing advances to step S70.

After the process at step S65, S67 or S69 is ended in this manner, the processing advances to step S70. In particular, if a channel changeover instruction is issued in accordance with a depression operation of one of the Ch buttons 51, the Ch + button 58 and the Ch − button 59 and a program information table of the channel designated by the changeover instruction is referred to, then the processing advances to step S70.

At step S70, the reproduction control section 17 searches the program information table for programs whose changeover instruction absolute time is included in the recording time zone. Here, the changeover instruction absolute time is time obtained by conversion of the reproduction position of a program being reproduced at a point of time at which the depression operation of one of the Ch buttons 51, the Ch + button 58 and the Ch − button 59 is performed as described above into absolute time.

At step S71, the reproduction control section 17 decides from a result of the search at step S70 whether or not a program whose changeover instruction absolute time is included in the recording time zone is present in the program information table.

Figures 21, 22:
FIGS. 21 and 22 are schematic views illustrating different examples of an image to be displayed on the television receiver or the personal computer shown in FIG. 1.

If it is decided at step S71 that no such program is present, then the reproduction control section 17 controls so that the television receiver 5 displays an image including such a message "A reproducible program is not found." as shown in FIG. 21 at step S72. Thereafter, the processing is returned to step S62 so that the processes at the steps beginning with step S62 are repeated.

It is to be noted here that the case when it is decided that no program is present signifies a case wherein the program is not recorded in the HDD 13. Accordingly, where a row itself which corresponds to a program whose changeover instruction absolute time is included in the recording time zone is not included in the program information table and also where, even if such a corresponding row as described above is included in the program information table, a "moving picture ID" is not described in the row, it is decided at step S71 that no program is present.

In particular, it is assumed, for example, that, as a result of reference to the program information table of the B channel of FIG. 3 by the process at step S65, S67 or S69, the changeover instruction absolute time is predetermined time between 23:50 and 0:15. In this instance, the "program 3C" corresponding to the fifth row of the program information table of the B channel of FIG. 3 corresponds to the program included in the recording time zone. However, since the "moving picture ID" of the "program 3C" is not described, that is, since the "program 3C" is not recorded in the HDD 13, it is decided at step S71 that no program exists. Consequently, at step S72, an image, for example, of FIG. 21 is displayed on the television receiver 5.

On the other hand, if it is decided at step S71 that a program is present, then the processing advances to step S73.

Here, the case wherein it is decided at step S71 that a program is present signifies a case wherein a corresponding row is included in the program information table and besides, a "moving picture ID" is described in the row, that is, the program is recorded in the HDD 13.

At step S73, the reproduction control section 17 designates the changeover instruction absolute time as the reproduction starting absolute time.

It is to be noted that, if reproduction of the program is ended before the depression operation of any of the Ch buttons 51, Ch + button 58 and Ch − button 59 is performed, then the recording ending absolute time is regarded as the changeover instruction absolute time. In other words, in such a case as just mentioned, the recording ending absolute time is designated as the reproduction starting absolute time by the process at step S73.

At step S74, the reproduction control section 17 acquires the moving picture ID of the program searched out by the process at step S70, that is, the moving picture ID of a program whose changeover instruction absolute time (=reproduction starting absolute time) is included in the recording time zone.

At step S75, the reproduction control section 17 specifies, based on the reproduction starting absolute time, the reproduction starting position of the recorded program of the moving picture ID acquired by the process at step S74, that is, the program searched out by the process at step S70.

At step S76, the reproduction control section 17 controls so that the television receiver 5 reproduces the recoded program of the moving picture ID acquired by the process at step S74, that is, the program searched out by the process at step S70, from the reproduction starting position specified by the process at step S75.

Thereafter, the processing is returned to step S62 so that the processes at the steps beginning with step S62 are repeated.

In particular, it is assumed that, for example, when a portion of the "program 1A" of the A channel at the absolute time of "23:10" is being reproduced, the user desires to change over the reproduction object program to a recorded program of the B channel.

In this instance, it is conventionally necessary for the user to perform such a series of operations as to cause the past program table of FIG. 5 to be displayed on the screen of the television receiver 5 and select the program listing of the "program 3A" from within the past program table.

In contrast, in the present embodiment, since the recording and reproduction apparatus 1 can execute the program reproduction process, the user can change over the reproduction object program to the "program 3A" of the B channel only by performing such a simple operation as to depress the Ch + button 58 or depress that one of the Ch buttons 51 to which the B channel is allocated during reproduction of the "program 1A."

Further, the recording and reproduction apparatus 1 can successively change over the reproduction of recorded programs of different channels recorded at the same timing in response to a channel changeover instruction operation by the user. Consequently, if recorded programs of different channels were recorded at the same time, then the user may feel as if the user were zapping enjoying the recorded programs retrospectively in the past.

In particular, for example, if the Ch + button 58 is depressed, then the program information table of the B channel of FIG. 3 is referred to by the process at step S67. On the other hand, if the Ch button 51 to which the B channel is allocated is depressed, then the program information table of the B channel of FIG. 3 is referred to by the process at step S65.

In the present case, the Ch + button 58 or the Ch button 51 is depressed when the portion of the "program 1A" of the A channel at the absolute time of "23:10" is being reproduced. Therefore, the changeover instruction absolute time is "23: 10."

Accordingly, the program whose changeover instruction absolute time of "23:10" is included in the recording time zone is the "program 3A" which corresponds to the third row of the program information table of the B channel of FIG. 3. Therefore, the "program 3A" is searched out by the process at step S70, and a decision of YES is made by the process at step S71. Thereafter, the processing advances to step S73.

Thus, "23:10" is designated as the reproduction starting absolute time by the process at step S73, and "3A" is acquired as the moving picture ID by the process at step S74.

Here, since the recording time zone of the "program 3A" is "23:00 to 23:25," the recording starting absolute time is "23: 00," and the reproduction starting absolute time is "23:10" as described hereinabove. Accordingly, the difference "0:10" between the recording starting absolute time and the reproduction starting absolute time is specified as the reproduction starting position.

Then, reproduction is started from the portion of the "program 3A" whose reproduction starting position is "0:10," that is, the portion at 10 minutes from the top, by the process at step S76.

The process where a channel changeover instruction operation is performed from within the program reproduction process, that is, the process where at least one of the Ch buttons 51, Ch + button 58 and Ch − button 59 of the remote controller 6 shown in FIG. 6 is depressed, is such as described above.

In the following, the remaining process of the program reproduction process is described. The remaining process may be a process executed where a program changing over instruction is issued by a depression operation of at least one of the preceding button 53 and the succeeding button 54 of the remote controller 6 shown in FIG. 6, that is, where an instruction to change over the reproduction object program to a program preceding or succeeding in time. Or, the remaining process may be a process executed where the channel selection button 64 of the remote controller 6 is depressed, where the stop button 57 of the remote controller 6 is depressed or where one of the other buttons of the remote controller 6 is depressed.

In such instances as mentioned above, a decision of NO is made by the process at step S68 as described hereinabove, and the processing advances to step S77 illustrated in FIG. 17.

Referring to FIG. 17, the reproduction control section 17 decides at step S77 whether or not the preceding button 53 is depressed.

Figure 18:
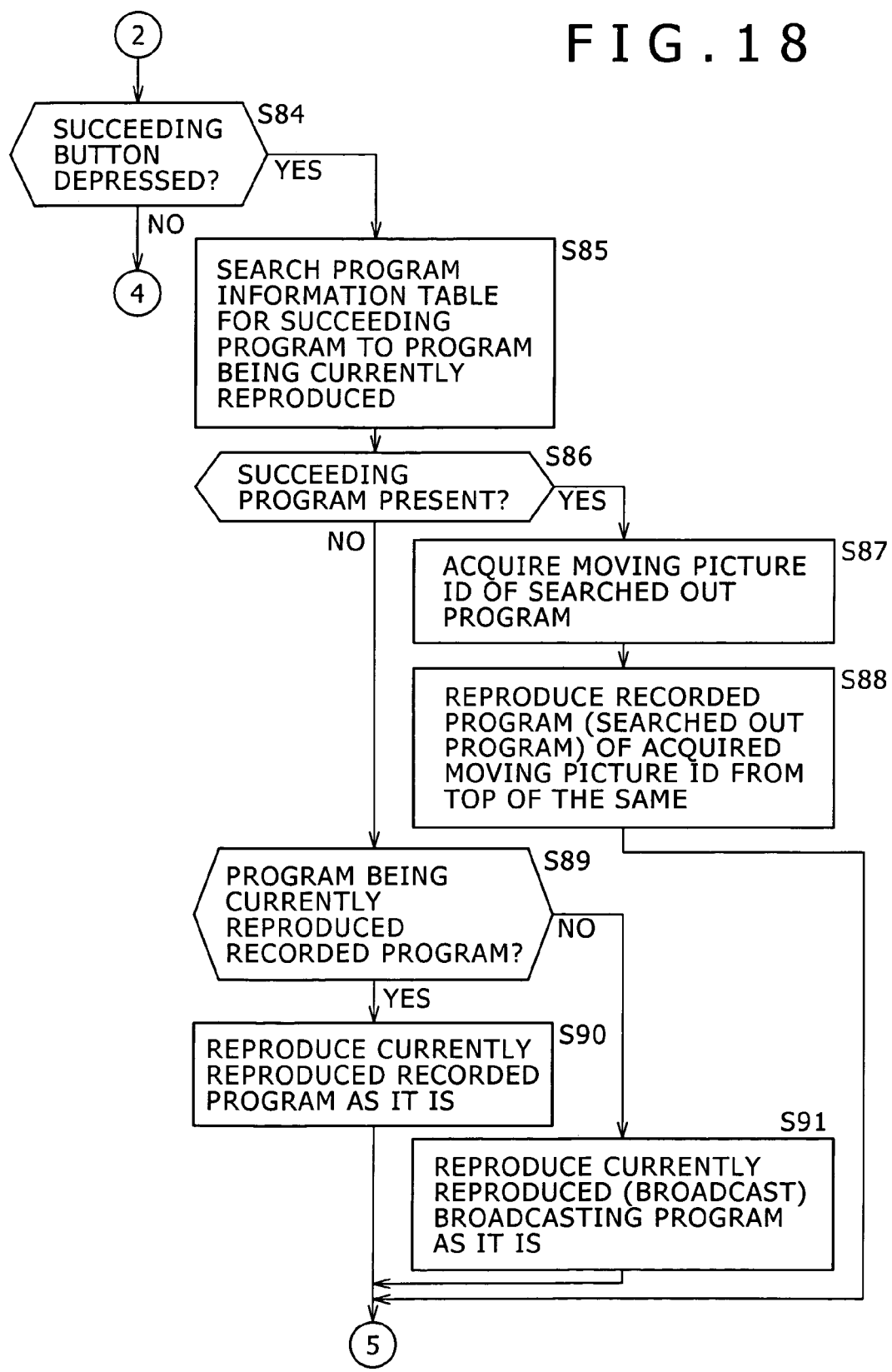

If it is decided at step S77 that the preceding button 53 is not depressed, then the processing advances to step S84 of FIG. 18. It is to be noted that processes at steps beginning with step S84 are hereinafter described.

On the contrary, if it is decided at step S77 that the preceding button 53 is depressed, then the processing advances to step S78.

At step S78, the reproduction control section 17 decides whether or not the changeover instruction absolute time is within 5 seconds from the recording starting absolute time. It is to be noted that, while the time period of 5 seconds is adopted here, the time period is not limited specifically to 5 seconds but may be any time period.

If it is decided at step S78 that the changeover instruction absolute time is not within 5 seconds from the recording starting absolute time, that is, if the reproduction position of the program being currently reproduced is later than the time period of 5 seconds from the top of the program, then the processing advances to step S79.

At step S79, the reproduction control section 17 controls so that the television receiver 5 reproduces the program being currently reproduced from the top of the program again. Thereafter, the processing returns to step S62 of FIG. 16 so that the processes at the steps beginning with step S62 are repeated.

On the other hand, if it is decided at step S78 that the changeover instruction absolute time is within 5 seconds from the recording starting absolute time, that is, if the reproduction position of the program being currently reproduced is a position within 5 seconds, then the processing advances to step S80.

At step S80, the reproduction control section 17 searches the program information table for a program preceding to the program being currently reproduced.

Here, the program preceding to the program being currently reproduced may be a program reproduced immediately prior in time to the program being currently reproduced or a program broadcast in the past with respect to the program being currently reproduced. However, for the simplification of description, the program preceding to the program being currently reproduced here signifies a program broadcast immediately prior in time to the program being currently reproduced.

At step S81, the reproduction control section 17 decides from a result of the search at step S80 whether or not a program preceding to the program being currently reproduced, here, an immediately preceding program, is present in the program information table.

If it is decided at step S81 that a preceding program is not present, then the processing advances to step S79. In other words, the program being currently reproduced is reproduced from the top thereof again.

Here, the case wherein a preceding program is not present at step S81 may be a case wherein a row itself corresponding to the preceding program is not included in the program information table or the following case similarly as in the case at step S71 illustrated in FIG. 16. In particular, even if a corresponding row is included in the program information table, if the "moving picture ID" is not described in the corresponding row, that is, if the immediately preceding program is not recorded in the HDD 13, then it is decided at step S81 that a preceding program is not present.

On the other hand, the case wherein it is decided at step S81 that a program is present is a case wherein a corresponding row is included in the program information table and besides the "moving picture ID" is described in the corresponding row, that is, the preceding program is recorded in the HDD 13, similarly as in the case at step S71. In such an instance, it is decided that a preceding program is present, and the processing advances to step S82.

At step S82, the reproduction control section 17 acquires the moving picture ID of the program searched out by the process at step S80, that is, a program preceding to the program being currently reproduced, here, an immediately preceding program.

At step S83, the reproduction control section 17 controls so that the television receiver 5 reproduces the recorded program of the moving picture ID acquired by the process at step S82, that is, the program searched out as a program preceding to the program being currently reproduced by the process at step S80, from the top of the program.

Thereafter, the processing is returned to step S62 of FIG. 16 so that the processes at the steps beginning with step S62 are repeated.

In this manner, when the user wants to reproduce a program preceding to a program being currently reproduced, if the program being currently reproduced has been reproduced for more than 5 seconds, then the user should depress the preceding button 53 once to reproduce the program being currently reproduced from the top again and then depress the preceding button 53 once again within 5 seconds.

The process when the preceding button 53 is depressed is such as described above. On the other hand, if the succeeding button 54, channel selection button 64, stop button 57 or one of the other buttons is depressed, then the following process is executed.

In this instance, a decision of NO is made by the process at step S77, and the processing advances to step S84 illustrated in FIG. 18.

Referring to FIG. 18, the reproduction control section 17 decides at step S84 whether or not the succeeding button 54 is depressed.

Figure 19:
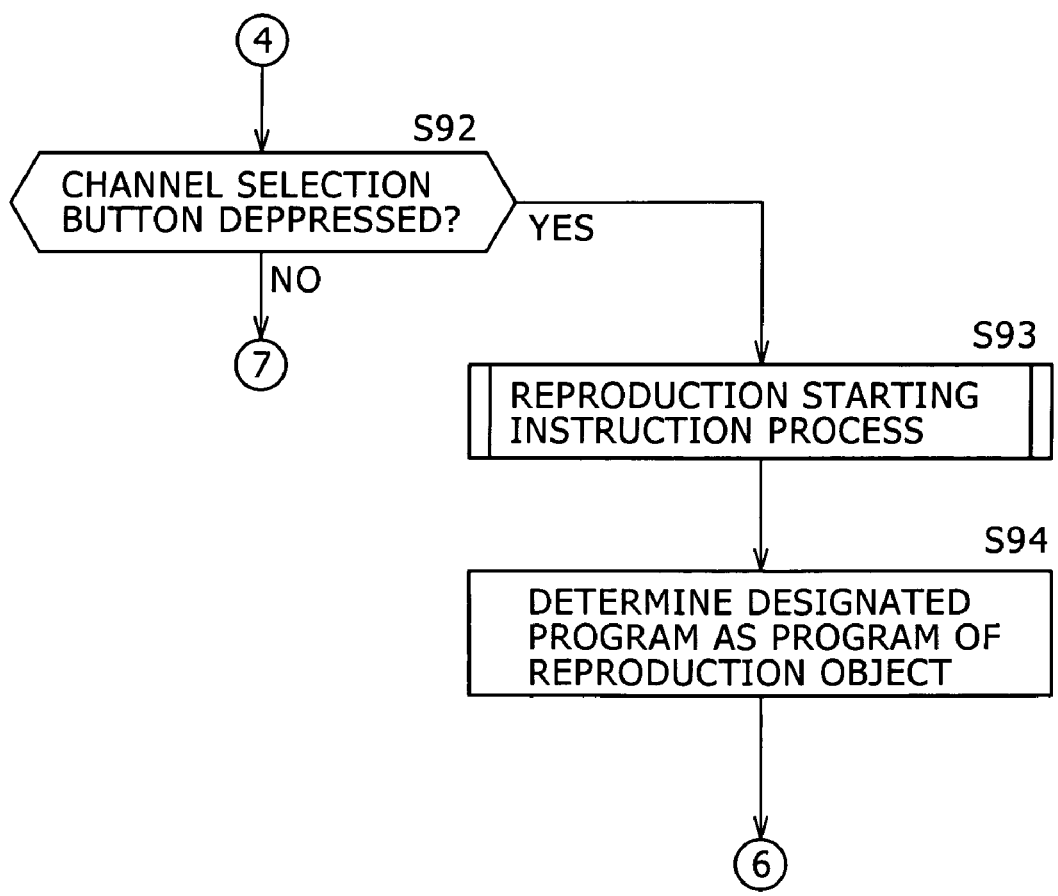

If it is decided at step S84 that the succeeding button 54 is not depressed, then the processing advances to step S92 of FIG. 19. It is to be noted that processes at steps beginning with step S92 are hereinafter described.

On the other hand, if it is decided at step S84 that the succeeding button 54 is depressed, then the reproduction control section 17 searches, at step S85, the program information table for a program succeeding the program being currently reproduced.

The program succeeding the program currently being reproduced may be a program which was broadcast immediately next in time to the program being currently reproduced or may be a program which was broadcast later than the program being currently reproduced. It is to be noted here that, for the simplification of description, the program next to the program being currently reproduced signifies a program which was broadcast immediately next in time to the program being currently reproduced.

At step S86, the reproduction control section 17 decides from a result of the search at step S85 whether or not a program next to the program being currently reproduced, here a program immediately succeeding the program being currently reproduced, is present in the program information table.

If it is decided at step S86 that a next program is not present, then the processing advances to step S89.

Here, the case wherein it is decided at step S86 that a next program is not present may be a case wherein a row itself which corresponds to the immediately succeeding program is not included in the program information table or may be such a case as described below. In particular, even if a corresponding row is included in the program information table, if the "moving picture ID" is not described in the corresponding row, that is, if the immediately succeeding program is not recorded in the HDD 13, then it is decided at step S86 that a next program is not present.

Also when the program being currently reproduced is a program which is being currently broadcast, that is, when the program being currently reproduced is not a recorded program of the HDD 13, it is decided at step S86 that a next program is not present.

Therefore, if it is decided at step S86 that a next program is not present, then the reproduction control section 17 decides at step S89 whether or not the program being currently reproduced is a recorded program.

If it is decided at step S89 that the program being currently reproduced is a recorded program, then the reproduction control section 17 controls at step S90 so that the television receiver 5 reproduces the recorded program being currently reproduced as it is. Thereafter, the processing is returned to step S62 of FIG. 16 so that the processes at the steps beginning with step S62 are repeated.

It is to be noted that, in order to cause the user to recognize that the program being currently reproduced is a recorded program, if it is decided at step S89 that the program being currently reproduced is a recorded program, then the reproduction control section 17 may control at step S90 so that the television receiver 5 reproduces the recorded program being currently reproduced, for example, from the top of the program.

On the other hand, if it is decided at step S89 that the program being currently reproduced is not a recorded program, then the reproduction control section 17 controls so that the television receiver 5 reproduces the broadcast program being currently reproduced, that is, currently broadcast, as it is. Thereafter, the processing is returned to step S62 of FIG. 16 so that the processes at the steps beginning with step S62 are repeated.

Meanwhile, if a row corresponding to a program next to the program being currently reproduced is included in the program information table and the "moving picture ID" is described in the corresponding row, that is, if the next program is recorded in the HDD 13, then it is decided at step S86 that a next program is present. Thus, the processing advances to step S87.

At step S87, the reproduction control section 17 acquires the moving picture ID of the program searched out by the process at step S85, that is, the next program, here the immediately next program, to the program being currently reproduced.

At step S88, the reproduction control section 17 controls so that the television receiver 5 reproduces the recorded program of the moving picture ID acquired by the process at step S87, that is, the program searched out as a program next to the program being currently reproduced by the process at step S85, from the top of the program.

Thereafter, the processing is returned to step S62 of FIG. 16 so that the processes at the steps beginning with step S62 are repeated.

The process when the succeeding button 54 is depressed is such as described above. On the other hand, if the channel selection button 64, stop button 57 or one of the other buttons is depressed, then the following process is executed.

In particular, a decision of NO is made by the process at step S84, and the processing advances to step S92 of FIG. 19.

Referring to FIG. 19, at step S92, the reproduction control section 17 decides whether or not the channel selection button 64 shown in FIG. 6 is depressed.

Figure 20:
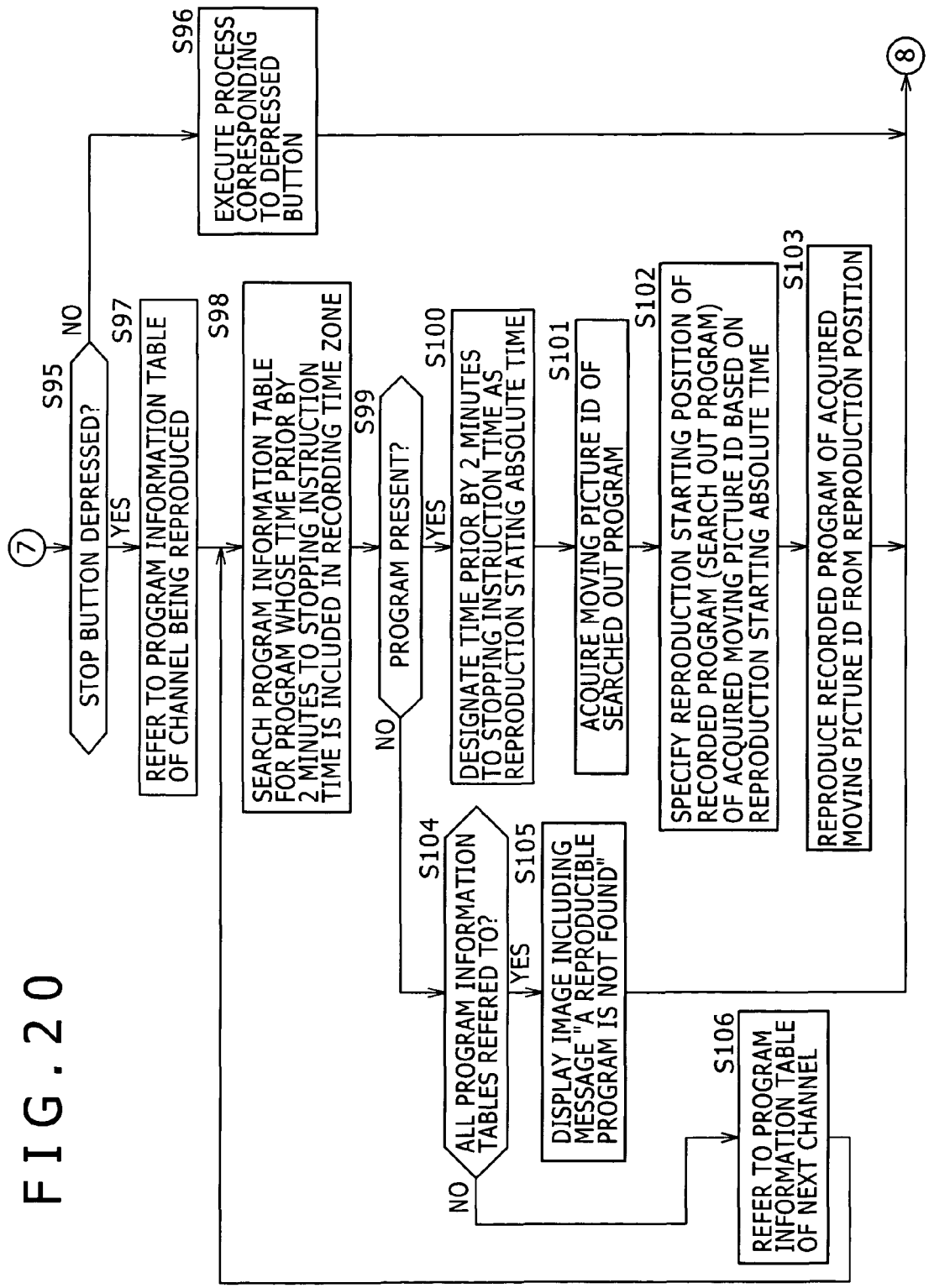

If it is decided at step S92 that the channel selection button 64 is not depressed, then the processing advances to step S95 illustrated in FIG. 20. It is to be noted that processes at steps beginning with step S95 are hereinafter described.

On the other hand, if it is decided at step S92 that the channel selection button 64 is depressed, then the reproduction control section 17 executes, at step S93, a reproduction starting instruction process in accordance with the flow chart described hereinabove with reference to FIG. 11 or 13. Then at step S94, the reproduction control section 17 determines a program designated by the reproduction starting instruction process as a reproduction object program. Thereafter, the processing is returned to step S61 illustrated in FIG. 16 so that the processes at the steps beginning with step S61 are repeated.

The process where the channel selection button 64 is depressed is such as described above. On the other hand, if the stop button 57 or one of the other buttons is depressed, then the following process is executed.

In particular, a decision of NO is made by the process at step S92, and the processing advances to step S95 illustrated in FIG. 20.

Referring to FIG. 20, the reproduction control section 17 decides whether or not the stop button 57 shown in FIG. 6 is depressed.

If it is decided at step S95 that the stop button 57 is not depressed, then the reproduction control section 17 executes, at step S96, a process corresponding to the depressed one of the other buttons. Thereafter, the processing is returned to step S62 illustrated in FIG. 16 so that the processes at the steps beginning with step S62 are repeated.

On the other hand, if it is decided at step S95 that the stop button 57 is depressed, then the processing advances to step S97.

At step S97, the reproduction control section 17 refers to the program information table of the channel of the program having been reproduced till then, more accurately, the channel of the program being still reproduced at this point of time, in the HDD 13.

At step S98, the reproduction control section 17 searches the program information table for a program whose stopping instruction time precedes by two minutes to time which is included in the recording time zone. Here, the stopping instruction absolute time is time at which the stop button 57 is depressed, more accurately, time which is managed as current time in the recording and reproduction apparatus 1 at a timing at which the stop button 57 is depressed. In other words, as a result of the depression of the stop button 57, reproduction of the program having been reproduced till then stops. However, the absolute time indicative of the stopping time in the program is not called stopping instruction time.

At step S99, the reproduction control section 17 decides from a result of the search at step S98 whether or not the program whose stopping instruction time precedes by two minutes to time which is included in the recording time zone is present in the program information table.

If it is decided at step S99 that a program is present, then the processing advances to step S100.

Here, the case wherein it is decided at step S99 that a program is present is a case wherein a corresponding row is included in the program information table and besides the "moving picture ID" is described in the corresponding row, that is, the preceding program is recorded in the HDD 13, similarly as in the case at step S71 illustrated in FIG. 16. In particular, where it is taken into consideration that the time on which the search at step S98 is based is the "time preceding by two minutes to the stopping instruction time," generally it is decided at step S99 that a program is present if a broadcasting program being currently broadcast from a channel same as the channel whose program has been reproduced till then is being recorded. Such a broadcasting program as described above is hereinafter referred to as current broadcasting program.

At step S100, the reproduction control section 17 designates the time preceding by two minutes to the stopping instruction time as reproduction starting absolute time.

At step S101, the reproduction control section 17 acquires the moving picture ID of the program searched out by the process at step S98, that is, the program whose stopping instruction time precedes by two minutes to time (=reproduction starting absolute time) which is included in the recording time zone, usually a current broadcasting program.

At step S102, the reproduction control section 17 specifies, based on the reproduction starting absolute time, the reproduction starting position of the recorded program of the moving picture ID acquired by the process at step S101, that is, the program searched out by the process at step S98 and generally a current broadcasting program.

At step S103, the reproduction control section 17 controls so that the television receiver 5 reproduces the recorded program whose moving picture ID is acquired by the process at step S101, that is, the program searched out by the process at step S98 and generally a current broadcasting program, from the reproduction starting position of the program specified by the process at step S102, that is, the time preceding by two minutes to the stopping instruction time in absolute time.

Thereafter, the processing is returned to step S62 illustrated in FIG. 16 so that the processes at the steps beginning with step S62 are repeated.

It is to be noted that, while, in the example of FIG. 20, the "time preceding by two minutes to the stopping instruction time" is adopted as the time on which the search is based in the process at step S98, that is, the time designated as the reproduction starting absolute time by the process at step S100, the time on which the search is based is not limited to that of FIG. 20, but any time may be adopted if it is not later than the stopping instruction time. In other words, it is possible to adopt the stopping instruction time as it is as the reproduction starting absolute time.

The process after a decision of YES is made at step S99 is such as described above. On the other hand, if a decision of NO is made at step S99, then the following process is executed.

In particular, if a decision of NO is made at step S99, then the reproduction control section 17 decides at step S104 whether or not all program information tables, that is, all of the program information tables of all channels, are referred to.

Here, the case wherein a decision of NO is made at step S99, that is, it is decided that a program is not present, signifies a case wherein the program is not recorded in the HDD 13 similarly as in the case of the process at step S71 illustrated in FIG. 16. Accordingly, not only where a row itself corresponding to a program "whose stopping instruction time precedes by two minutes to time which is included in the recording time zone" is not included in the program information table, but also where, even if a corresponding row is included in the program information table, the "moving picture ID" is not described in the corresponding row, it is decided at step S99 that a program is not present. In particular, where it is taken into consideration that the time on which the search at step S98 is based is the "time preceding by two minutes to the stopping instruction time," generally where a current broadcasting program of a channel same as the channel whose program has been reproduced till then, or even if the current broadcasting program is being recorded, where the "moving picture ID" is not provided to the current broadcasting program, it is decided at step S99 that a program is not present.

If it is decided at step S104 that all program information tables are not referred to as yet, then the reproduction control section 17 refers, at step S106, to the program information table of a next channel. The next channel in this instance is the "channel in the +1 direction" at step S67 of FIG. 16 or the "channel in the −1 direction" at step S69. Thereafter, the processing is returned to step S98 so that the processes at the steps beginning with step S98 are repeated. In particular, the loop processing at steps S98, S99 (NO), S104 (NO) and S106 is executed repetitively until after the program information table which includes information of a program "whose stopping instruction time precedes by two minutes to time which is included in the recording time zone," or in other words, the program information table of the channel in which the current broadcasting program is being recorded, is referred to. Then, after the program information table of such a channel as described above is referred to, the current broadcasting program of the channel, or more accurately the recorded program whose stopping instruction time precedes by two minutes to time which is included in the recording time zone, is recorded from the time thereof preceding by two minutes to the stopping instruction time.

However, if no program information table is present which includes information of a program "whose stopping instruction time precedes by two minutes to time which is included in the recording time zone," generally of a current broadcasting program, or in other words, if a current broadcasting program is not being recorded with regard to any channel, it is decided at step S104 that all program information tables are referred to. Thus, the processing advances to step S105.

At step S105, the reproduction control section 17 controls so that the television receiver 5 displays an image including such a message of "A reproducible program is not found." as seen in FIG. 21 similarly as in the case at step S72 of FIG. 16. Thereafter, the processing is returned to step S62 of FIG. 16 so that the processes at the steps beginning with step S62 are repeated.

Since such a program reproduction process as described above is executed, not only before reproduction of a program is performed but also while a program is being reproduced, the user can perform a reproduction starting instruction operation, that is, a reproduction starting instruction operation of another recorded program, making use of the channel selection image 71 shown in FIG. 7 by depressing the channel selection button 64 of the remote controller 6.

Further, if such a program reproduction process as described above is executed to reproduce a predetermined recorded program and then the stop button 57 shown in FIG. 6 is depressed during the reproduction of the recorded program, then the reproduction of the recorded program is stopped and reproduction of a current broadcasting program is started. More accurately, reproduction of a current broadcasting program recorded once in the HDD 13, that is, reproduction of a recorded program, is started from the position of the recorded program which corresponds to time preceding by two minutes from the point of time at which the stop button 57 is depressed, that is, from the stopping instruction time. In other words, the display substance of the television receiver 5 at the present point of time accurately is the broadcasting substance which was broadcast two minutes prior to the present point of time.

Accordingly, when the program reproduced by the television receiver 5 changes over from a predetermined recorded program to a current broadcasting program which is a recorded program, the scene or frame reproduced by the television receiver 5 becomes discontinuous, and the user may have a sense of incongruity.

Therefore, in the present embodiment, in order to notify the user of the fact that the program reproduced by the television receiver 5 changes over from a predetermined recorded program to a current broadcasting program which is a recorded program, the reproduction control section 17 presents this fact on the television receiver 5. The presentation technique in this instance is not restricted specifically. For example, such a technique as to display the program name of the program after changeover, that is, the program name of the current broadcasting program, on the screen of the television receiver 5 for a predetermined period of time after the program is changed over or until after an erasure instruction is issued by the user as seen in FIG. 22 can be taken. In particular, FIG. 22 illustrates an example where the program to be reproduced is changed over to a current broadcasting program having the program name of "1E." Therefore, "1E" as the program name and 2005/08/30 23:58:34 as the reproduction starting absolute time (in the example of FIG. 20, the time preceding by 2 minutes to the stopping instruction time) are displayed.

The example of the program reproduction process is such as described above with reference to FIGS. 16 to 20.

It is to be noted, however, that the program reproduction process is not limited to the example of FIGS. 16 to 20. For example, when it is decided by the process at step S71 of FIG. 16 that a program is not present, a process of referring to the program information table of a further channel such as, for example, a neighboring channel may be executed without executing the process at step S72, that is, without displaying such an image as shown in FIG. 21, whereafter the processing is returned to step S70. In this instance, the recording and reproduction apparatus 1 successively changes over the reproduction object channel until a different program of a different channel whose changeover instruction absolute time is included in the recording time zone is found, and repetitively executes the loop processing of the processes at steps S70 to S72 every time the reproduction object channel is changed over. Then, when such a different program is found, the recording and reproduction apparatus 1 decides at step S71 that a program is present. Then, the recording and reproduction apparatus 1 may execute the processes at steps S73 to S76 to control reproduction of the different program.

The channel changeover instruction operation involved in the program reproduction process described above is an operation similar to the channel changeover instruction operation of a current broadcasting program which is conventionally performed on the television receiver 5 daily. Therefore, the channel changeover instruction operation is considered to be a user interface (UI) which is easy for the user to understand. Accordingly, the user can change over a recorded program of a reproduction object only by performing a channel changeover instruction operation which the user feels as a natural operation similar to a conventional operation without utilizing such a past program table as described hereinabove with reference to FIG. 5.

Further, within a time zone of 19:00 to 22:00 defined as golden time, the possibility is high that various programs which users or viewers feel interesting may be broadcast from individual broadcasting stations. Accordingly, only by performing a very simple channel changeover instruction operation described above, a user can easily search out a program which the user feels interesting from among the recorded programs broadcast from the broadcasting stations within the prime time.

Further, the program reproduction process is described below in comparison with a conventional process.

Figure 23:
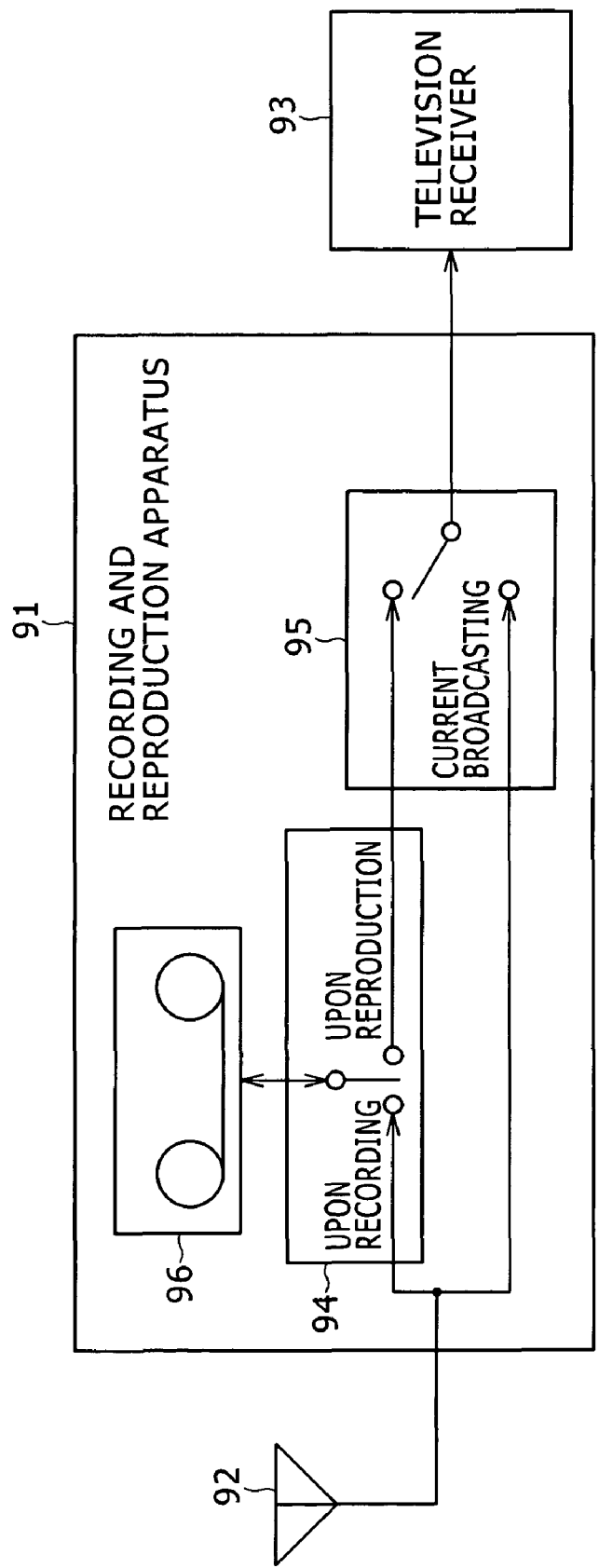
FIG. 23 is a functional block diagram showing an example of a functional configuration of a recording and reproduction apparatus in the past.

FIG. 23 shows a simplified functional block diagram of a conventional recording and reproduction apparatus.

Referring to FIG. 23, the conventional recording and reproduction apparatus 91 shown includes switches 94 and 95 whose changeover is controlled so that the following processes can be executed. In particular, where the switch 94 is changed over to the recording side, the conventional recording and reproduction apparatus 91 can record broadcasting programs recorded by an antenna 92 on a recording medium 96 of a video tape recorder or the like. On the other hand, where the switch 94 is changed over to the reproduction side, the conventional recording and reproduction apparatus 91 can reproduce a recorded program recorded on the recording medium 96 from a television receiver 93. Meanwhile, where the switch 95 is changed over to the current broadcasting side, the conventional recording and reproduction apparatus 91 can reproduce a current broadcasting program being currently received by the antenna 92 as it is from the television receiver 93.

In this instance, where the switch 94 is changed over to the recording side and the switch 95 is changed over to the current broadcasting side, the conventional recording and reproduction apparatus 91 can record a current broadcasting program being currently received by the antenna 92 on the recording medium 96 and reproduce the current broadcasting program from the television receiver 93. In other words, the user can cause the conventional recording and reproduction apparatus 91 to record a current broadcasting program while it enjoys the current broadcasting program.

However, the conventional recording and reproduction apparatus 91 has various problems including a first problem that it cannot record a plurality of current broadcasting programs and a second problem that, while a current broadcasting program of a predetermined channel or broadcasting station is recorded, the user cannot enjoy the recorded program (chasing reproduction).

Figure 24:
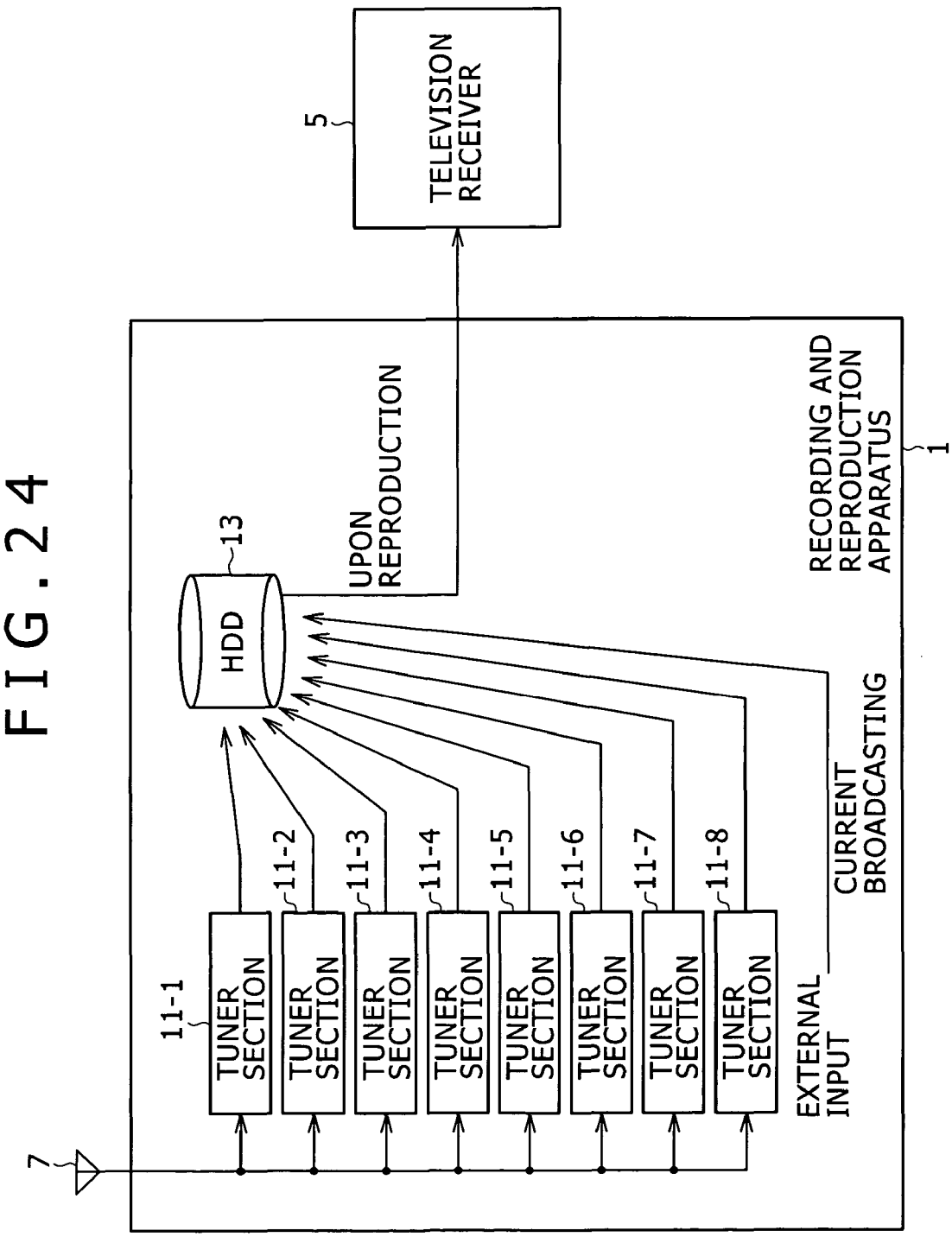
FIG. 24 is a simplified functional block diagram showing an example of a functional configuration of the recording and reproduction apparatus shown in FIG. 1 to which the present invention is applied for comparison with the functional configuration shown in FIG. 23.

Thus, in order to solve the problems described above, the recording and reproduction apparatus 1 of the present embodiment has such a functional configuration as shown in FIG. 1. More particularly, in order to facilitate comparison with the functional configuration of the conventional recording and reproduction apparatus 91 of FIG. 23, a simplified functional block diagram of the recording and reproduction apparatus 1 of FIG. 1 is shown in FIG. 24. Referring to FIG. 24, the recording and reproduction apparatus 1 of the present embodiment can solve the problems described above because a route connected to the television receiver 5, which is a route denoted as "upon reproduction" in FIG. 24, and a route for recording a current broadcasting program, that is, routes denoted as "current broadcasting" in FIG. 24, are provided separately from each other.

More particularly, in the recording and reproduction apparatus 1 of the present embodiment having such a functional configuration as described above, a plurality of current broadcasting programs can be recorded in the HDD 13 or a different recording medium such as a semiconductor medium hereinafter described. In other words, the first problem described above can be solved.

Further, in the recording and reproduction apparatus 1 of the present embodiment having such a functional configuration as described above, a recorded program in the HDD 13 can be reproduced from the television receiver 5 while broadcasting programs received by the antenna 7 are recorded into the HDD 13. Thereupon, not only one program but also a plurality of programs can be set as an object of recording and reproduction.

In this instance, since separate routes are used for recording and reproduction, it appears as if a current broadcasting program could not be enjoyed during recording of the current broadcasting program. However, if a recorded portion of the current broadcasting program, that is, a portion of the current broadcasting program which has been broadcast and recorded immediately before then, then even during recording of the current broadcasting program, the user can enjoy the current broadcasting program although some time lag exists. In other words, the second problem described above can be solved.

In other words, that the second problem can be solved signifies that the user can enjoy a program without specifically being aware of whether the process upon reproduction is being performed for a content distributed in the past, in the present embodiment, a program broadcast already, or a content being currently distributed, that is, in the present embodiment, a program being currently broadcast, that is, a current broadcasting program.

In the following, a reproduction process of the recording and reproduction apparatus 1 of the present embodiment which can solve such first and second problems as described above is further described from a different point of view.

For example, although it is described hereinabove that such a program table as shown in FIG. 5 is a past program table, where a situation at present that also EPG information of programs scheduled for broadcasting in the future can be acquired readily is taken into consideration, it is possible to produce not only a past program table but also a full program table. The full program table here includes information of all of programs broadcast already in the past, current broadcasting programs and programs scheduled for broadcasting in the future.

It is assumed that, in such a full program table as in the example of FIG. 5, for example, 00:30:00 of August 30 (Tuesday) is the time at present. In this instance, in the C channel, the "program 4D" is a current broadcasting program. Further, it is assumed that current broadcasting programs of all channels are being recorded. Furthermore, it is assumed that, in all channels, scheduled broadcasting has been and is broadcast in the past, at present and in the future without any extension of a program such as a baseball program.

Further, it is assumed that the user wants to enjoy, for example, during reproduction of the C channel at a position corresponding to 23:57:00 of August 30 (Tuesday), that is, during the "program 4C" which is a recorded program broadcast in the past, the recorded substance recorded one hour prior, that is, the recorded substance at 22:57:00 which is the recorded substance of the C channel one hour prior. In this instance, the user can immediately enjoy or reproduce the "program 4A" whose broadcasting time zone or recorded time zone includes 22:57:00 only by performing a simple operation of depressing a suitable button of the remote controller 6.

Here, attention should be paid to the following point. In particular, some conventional recording and reproduction apparatus can perform reproduction of the recorded program "4A" in such an instance as just described. It is to be noted, however, that a conventional recording and reproduction apparatus of the type described can reproduce the recorded program "4A" only from the top position, that is, a portion at 22:54 in absolute time. However, the reproduction starting position which the user desires is not the top position of the recorded program "4A" but is a position corresponding to 22:57:00 which is one hour prior to the point of time of 23:57:00 of August 30 (Tuesday) at all. Accordingly, the conventional recording and reproduction apparatus has a problem that, even if it is used, the user cannot enjoy a program from a position of the same desired actually by the user itself. In contrast, if the recording and reproduction apparatus 1 of the present embodiment is used, then the user can easily designate desired absolute time as the reproduction starting absolute time using the remote controller 6 or the like. In particular, in the example described above, the user can easily designate 22:57:00 one hour prior to the point of time of 23:57:00 of August 30 (Tuesday) as the reproduction starting absolute time. Accordingly, the problem described above can be solved.

Further, if a function of designating time prior by one hour, later by one hour or the like is allocated to a predetermined button of the remote controller 6, then the user can perform the operation described above further simply.

Furthermore, where the operation described above is possible, for example, when the user wants to perform changeover to the A channel during reproduction of a portion of the broadcasting content of the C channel at the recorded position of 23:57:00 of August 30 (Tuesday), that is, during reproduction of the recorded program "4C," the user can immediately enjoy or reproduce the recorded program "1D," whose broadcasting time zone or recording time zone includes 23:57:00, from a position of the same corresponding to 23:57:00 in absolute time only by performing a simple operation to depress a suitable button of the remote controller 6.

In this manner, the user can select a program broadcast on a different channel also in the past by an operation quite similar to a conventional channel changeover instruction operation of a current broadcasting program. In particular, the user who is a viewer can perform such an operation as described above while calling the full program table to mind.

In other words, the recording and reproduction apparatus 1 of the present embodiment can reproduce a content such as a television broadcasting program or a video content and record a content being currently distributed on a recording medium such as the HDD 13. Such a content being currently distributed as just mentioned is hereinafter referred to as currently distributed content. Accordingly, the user can perform reproduction control such as, for example, reproduction, stopping, temporary stopping, fast feeding or rewinding by an operation quite similar to a conventional operation conventionally performed for a currently distributed content without being specifically aware of whether the content has been distributed in the past or is a currently distributed content.

Further, the user can enjoy a content, which has not been enjoyed as yet, later at any time when the user desires even if the user did not actually enjoy the content when the content was distributed. Thereupon, the recording and reproduction apparatus 1 of the present embodiment can manage various kinds of information of the recorded content such as the title, recording time zone, distribution source such as a channel and so forth, and display the information as a full program table. Accordingly, the user can perform an operation while being aware of the full program table, including an operation when the full program table is not displayed.

Furthermore, where the conventional recording and reproduction apparatus 91 of FIG. 23 is used, while a current broadcasting program of a predetermined channel is being enjoyed, the user can change over the viewing object channel only to a current broadcasting program of a different channel. In other words, the user cannot change the reproduction time in absolute time to change over the viewing object program to a program of the predetermined channel broadcast already in the past. On the other hand, where the recording and reproduction apparatus 1 of the present embodiment shown in FIG. 24 and so forth is utilized, even while a currently distributed content of a predetermined distribution source is being enjoyed, the user can change over the viewing object content to a currently distributed content of a different distribution source or can change over the viewing object to a different content of the same distribution source or a different distribution source distributed in the past. Also such operations can be performed in a quite similar sense.

Further, for example, if the stop button 57 of the remote controller 6 is depressed during reproduction of a predetermined content, then the recording and reproduction apparatus 1 stops the predetermined content. In this instance, the recording and reproduction apparatus 1 can reproduce a portion of the predetermined content as near as possible to a currently distributed content, that is, in the example of FIG. 20, a portion corresponding to time two minute prior to stopping instruction time which is time at which the stop button 57 is depressed. Consequently, the user can enjoy the content similarly as upon enjoyment of a currently distributed content.

In particular, in the example described hereinabove, the time at present is 00:30:00 of August 30 (Tuesday), and the C channel at the position of 23:57:00 of August 30 (Tuesday) is being reproduced, that is, the "program 4C" is being reproduced. In this instance, if the stop button 57 is depressed, then reproduction of the "program 4D" which is a current broadcast of the C channel is started at the position of 23:55:00. Consequently, the user can enjoy equivalently as upon enjoyment of the current broadcast.

In summary, in the recording and reproduction apparatus 1 of the present embodiment, if reproduction of a content recorded already such as a recorded program is stopped in response to a stopping operation, then reproduction of a content recorded already of the same distribution source or same channel such as a recorded program of a current broadcasting program can be started from a position of the content corresponding to stopping instruction time itself or time around the stopping instruction time which is time when the stopping operation is performed, or more accurately, the time managed as the time at present by the recording and reproduction apparatus 1. In other words, the recording and reproduction apparatus 1 of the present embodiment can make use of repetitive recording normally called panning according to pattern reservation or the like to apparently seamlessly change over the reproduction from reproduction of a content recorded already to reproduction of a currently distributed content. Consequently, where the program being reproduced is a currently broadcast program, the portion of a reproduction object of the program can be seamlessly changed over readily from a portion broadcast already in the past to another portion which is being currently reproduced or which is nearer to a portion being currently reproduced.

In contract, with the recording and reproduction apparatus 91 in related art of FIG. 23, if reproduction of a recorded program of the recording medium 96 is stopped, then only it is possible to change over the switch 95 to the current broadcasting side so that the reproduction is changed over to reproduction of the currently broadcast program. In this instance, a currently broadcast program of a channel having no relationship to the channel of the recorded program whose reproduction is stopped is frequently reproduced by the television receiver 93.

However, many users frequently know well of a channel or a broadcasting station of a recorded program to such a degree that they intentionally enjoy the recorded program after it is recorded. In other words, many users frequently know well of the broadcasting substance of the channel, that is, the substance of the program listings which form the column of the channel in the full program table. Thus, many users have a characteristic that they can readily imagine the broadcasting substance without looking at the full program table. Accordingly, it is supposed from the characteristic that it is demanded by many users to reproduce a currently broadcast program of a channel same as the channel of the recorded program whose reproduction is stopped.

Thus, taking the characteristic into consideration, the recording and reproduction apparatus 1 of the present embodiment is configured such that, when the reproduction is to be changed over to a currently distributed content, it is changed over to a currently distributed content of a distribution source same as the distribution source or channel of a content which has been reproduced till then under the condition that recording is proceeding, or in other words, at any time if recording is proceeding.

Various examples of the program reproduction process of the recording and reproduction apparatus 1 of the present embodiment as viewed from various points of view are described above.

Incidentally, while the continuous reproduction process described hereinabove with reference to FIG. 8 and so forth is described as an example of a process of the recording and reproduction apparatus 1 of FIG. 1, it may otherwise be adopted also as a process of the personal computer 2.

Figure 25:
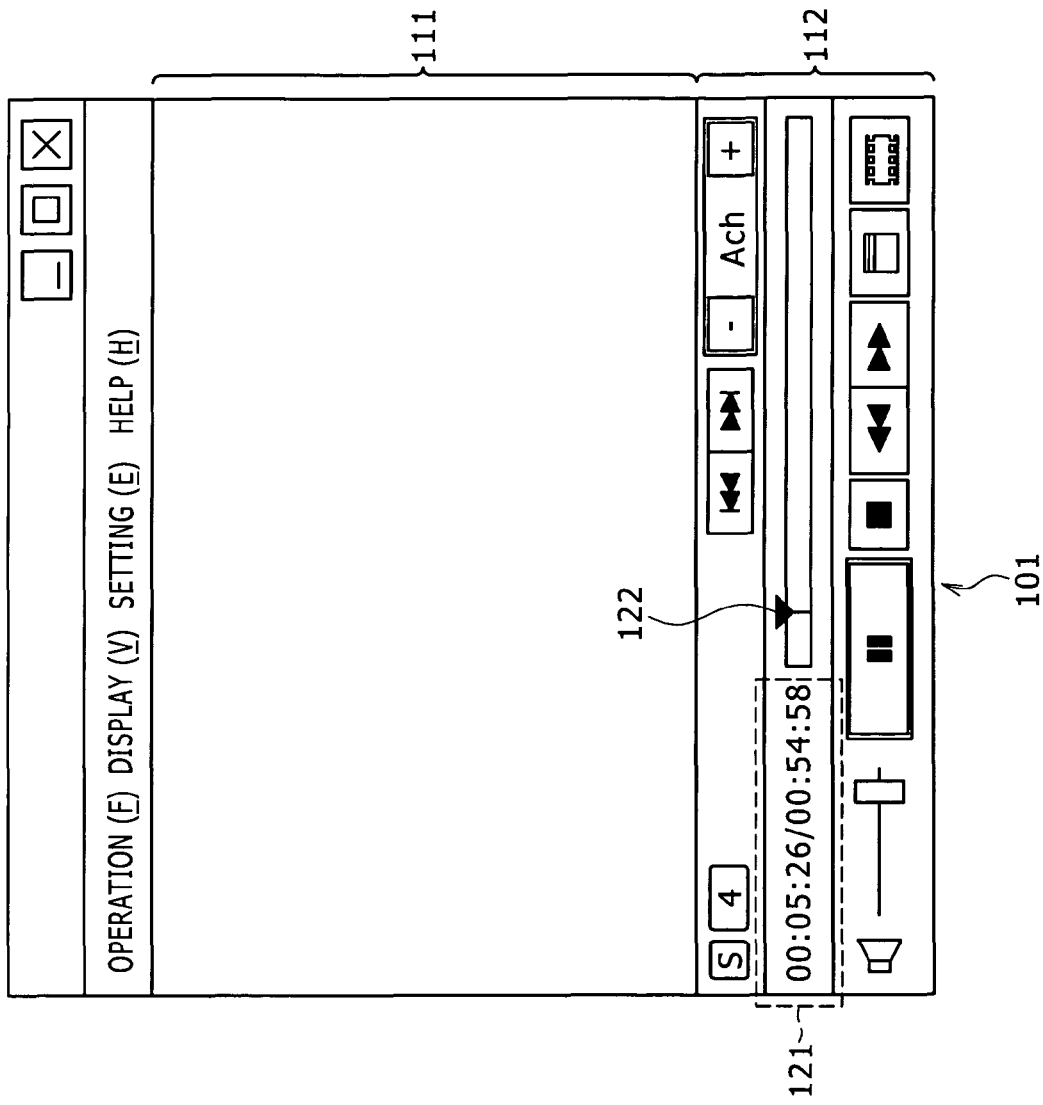
FIGS. 25 to 30 are schematic views showing different examples of a reproduction image to be displayed on the personal computer or the like of FIG. 1.

In this instance, the reproduction control section 37 of the personal computer 2 shown in FIG. 1 can display, for example, an image 101 shown in FIG. 25 as a reproduction image for display of a reproduction program on a display unit of the reproduction section 38 or the like.

Referring to FIG. 25, the image 101 includes a region 111 and another region 112. The region 111 is used to display an image which forms a reproduction program. The region 112 is used as a GUI region in which a user instruction operation for various reproduction control of the reproduction program is to be performed. Accordingly, the user can use a mouse or the like of the operation section 32 to operate various software buttons in the region 112 to perform operations similar to those which are performed making use of the remote controller 6.

For example, the user can use the mouse or the like to move a slider 122 to a predetermined position in a bar therefor to designate a reproduction starting position of the reproduction program.

In other words, while a reproduction program is being reproduced and a corresponding image is displayed in the region 111, if a moving operation of the slider 122 is not performed, then the location of the slider 122 indicates the reproduction position of the reproduction program at present. Then, the particular reproduction position is displayed in a region 121 leftwardly of the slider 122.

Figure 26:
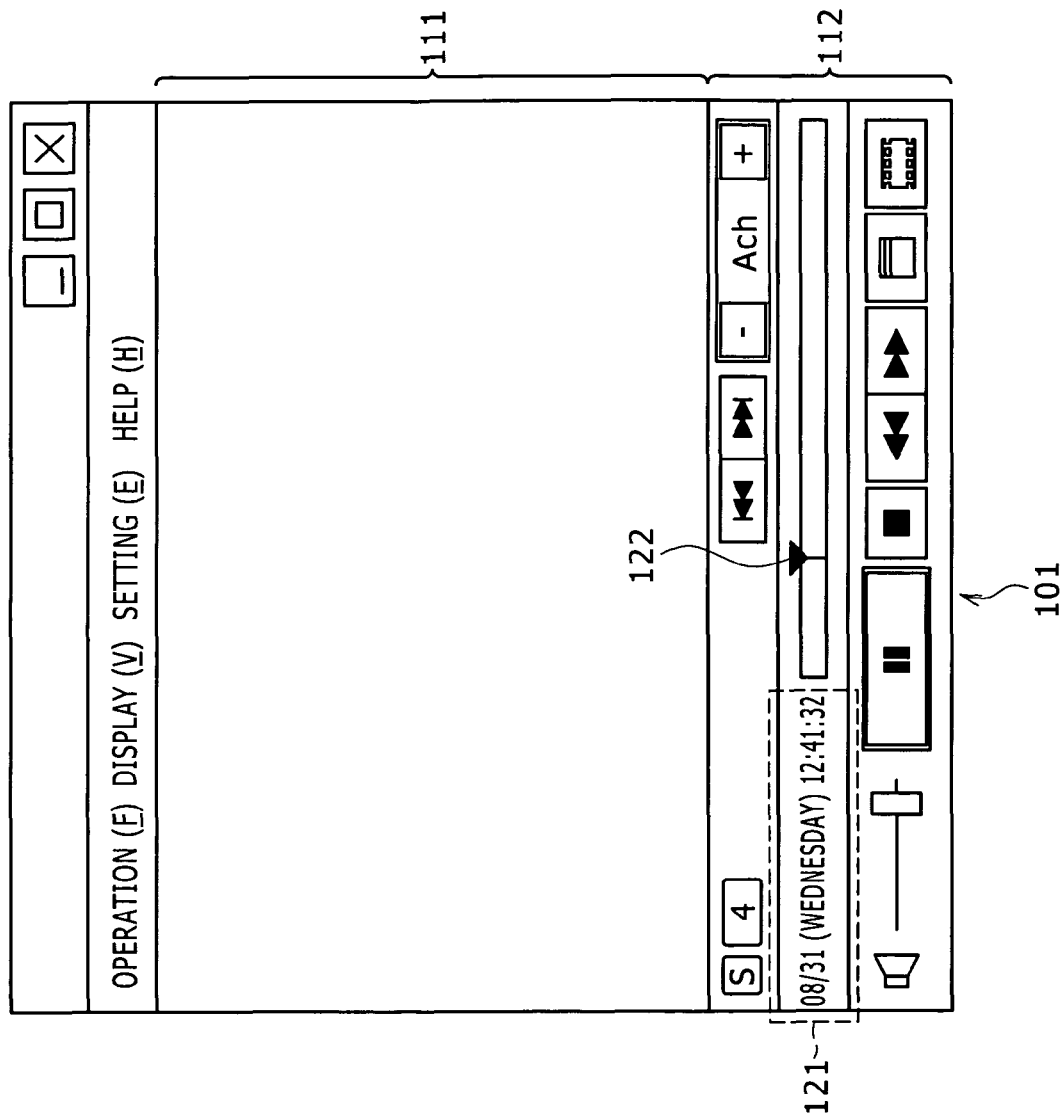

The display form of the reproduction position of the region 121 may be relative time, that is, time with respect to the top position of the reproduction program defined as reference time 00:00 as seen in FIG. 25 or absolute time as seen in FIG. 26. The user can select any of the two display forms freely and at any time by performing a predetermined operation using the mouse or the like.

Figure 27:
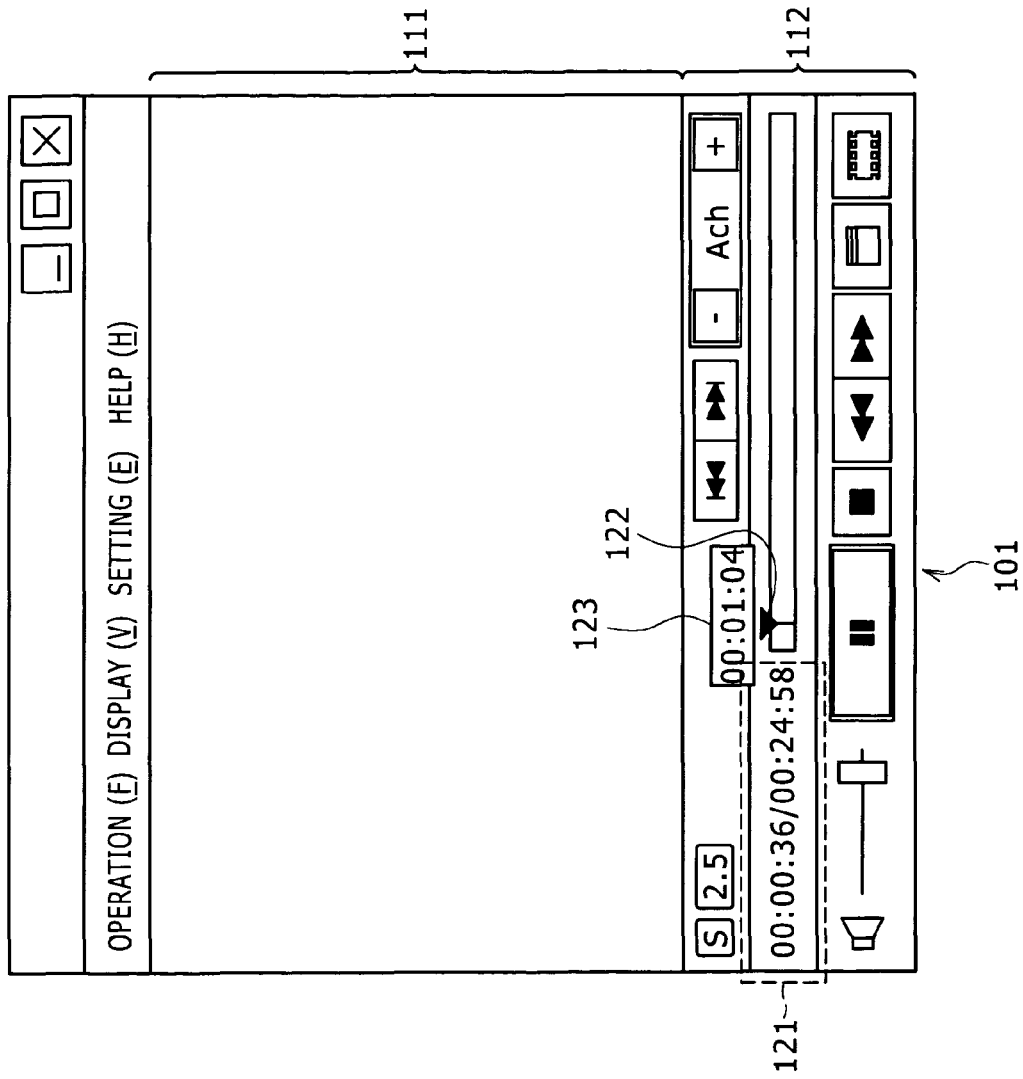
Figure 28:
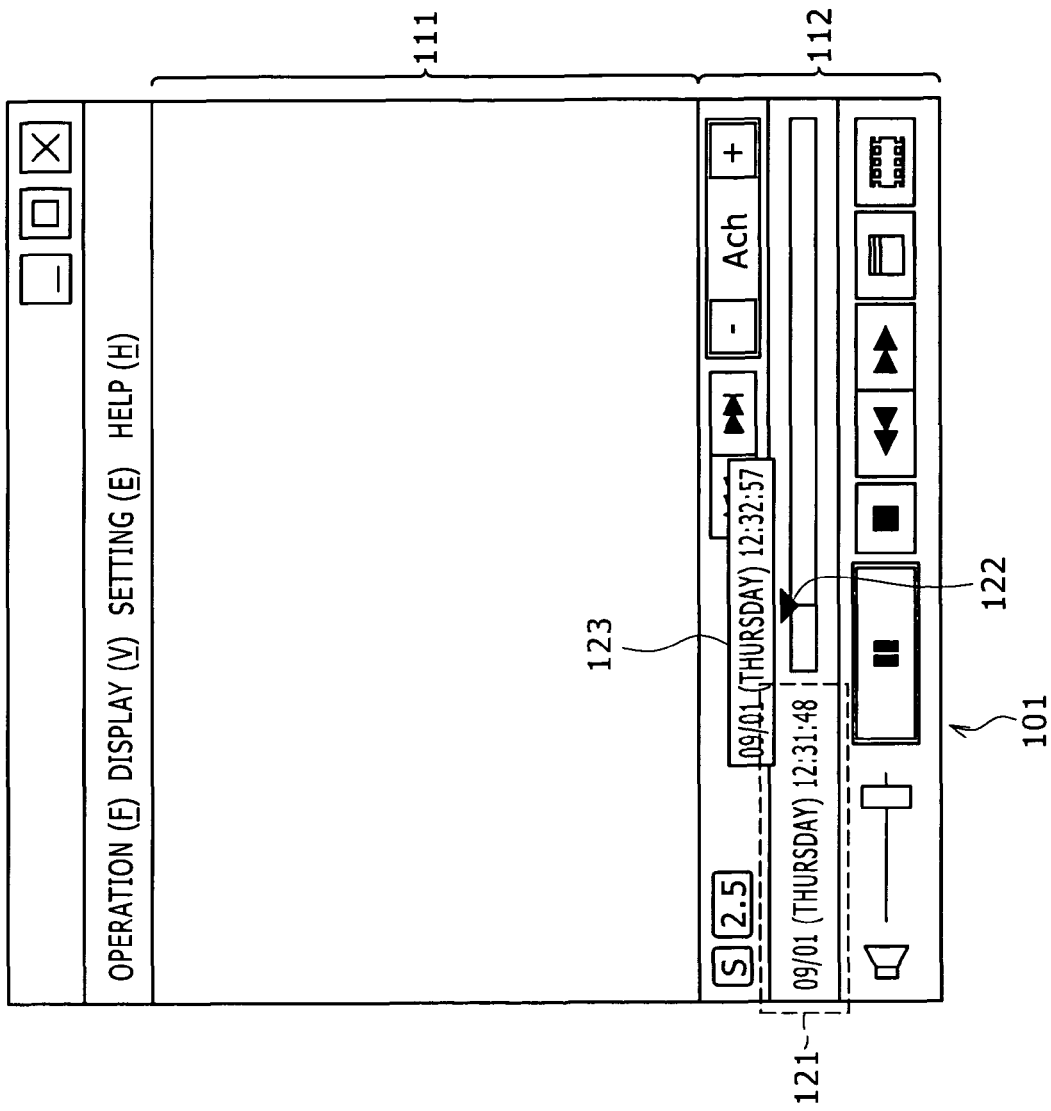

Further, as described hereinabove, the user can designate the reproduction starting position of a reproduction program by moving the slider 122 to a predetermined position in the bar for the slider 122 making use of the mouse or the like. Thereupon, for example, in the present embodiment, an indication 123 indicative of a position in a reproduction program is presented in the proximity of the slider 122 as seen in FIG. 27 or 28. It is to be noted that the indication 123 is hereinafter referred to as reproduction starting desired position indication 123, and the reproduction starting desired position indication 123 is presented above the slider 122 in the examples of FIGS. 27 and 28. Also the display form of the reproduction starting desired position indication 123 may be relative time, that is, the reproduction starting position itself as seen in FIG. 27 or absolute time illustrated in FIG. 28, which has a value obtained by conversion of the reproduction starting position into absolute time. The user can select any of the display forms freely and at any time by performing a predetermined operation using the mouse or the like. Consequently, the user can perform an intuitive reproduction instruction operation making use of absolute time similarly as in the case of the remote controller 6.

The continuous reproduction process in this instance is performed in the following manner. In particular, in place of the processes at step S1 to S4 of FIG. 8 which are based on an operation of the remote controller 6, various processes such as a reproduction starting instruction process corresponding to various operations for the region 112 of the image 101 are executed. Thereafter, the loop processing at steps S5 to S9 is executed.

Further, in the program reproduction process at step S5, processes corresponding to various operations for the region 112 of the image 101 are executed in place of processes corresponding to depression operations of the buttons of the remote controller 6.

It is to be noted that the reproduction image to be displayed on the display unit of the reproduction section 38 of the personal computer 2 or the like is not specifically limited to the image 101 of FIGS. 25 to 28, but an arbitrary reproduction image can be adopted. In particular, for example, such a reproduction image 201 as shown in FIG. 29 may be adopted.

Figure 29:
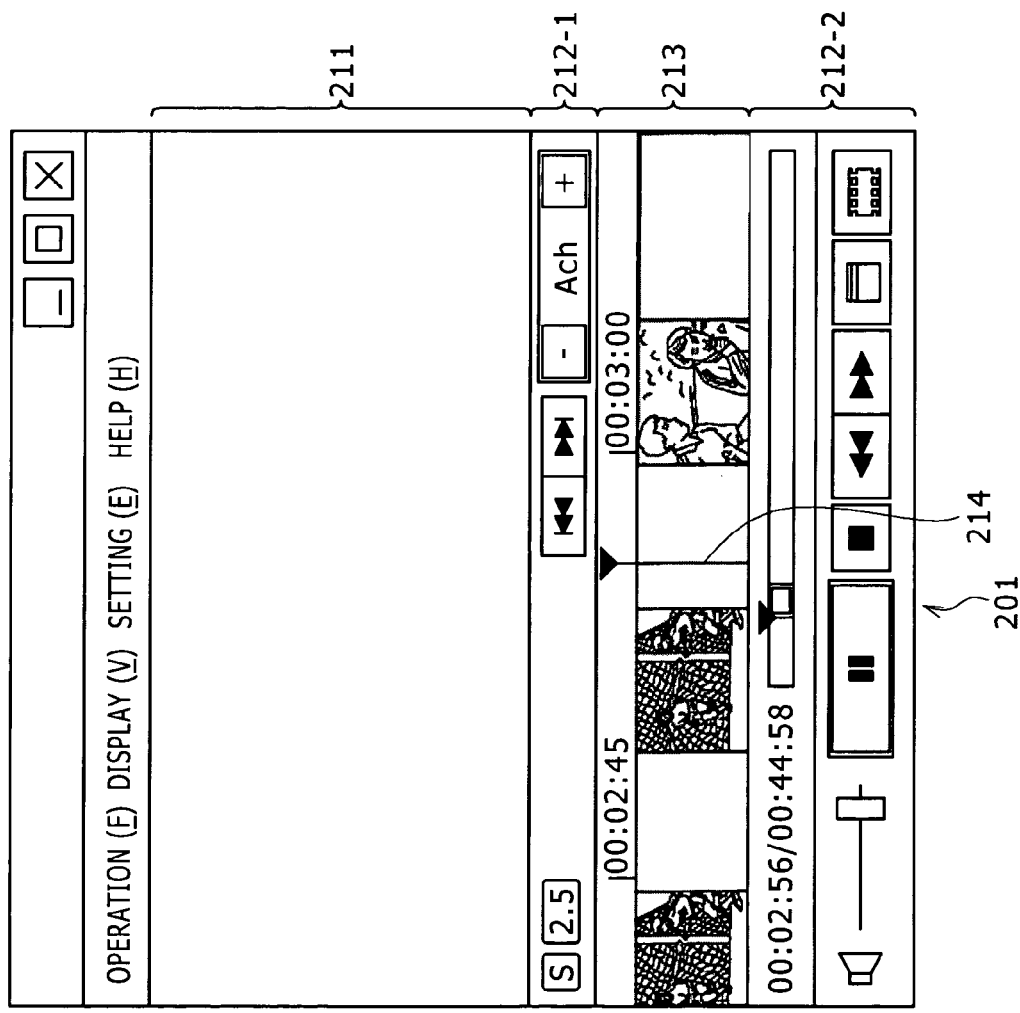

Referring to FIG. 29, the reproduction image 201 includes a region 211 which corresponds to the region 111 of the image 101 shown in FIG. 25 and so forth, and regions 212-1 and 212-2 which correspond to the region 112 of the image 101 shown in FIG. 25 and so forth. In particular, an image which forms a reproduction program is displayed in the region 211. The regions 212 are used as a GUI region in which a user instruction operation for reproduction control of a reproduction program is to be performed. In particular, the user can perform operations similar to the operations performed using the remote controller 6 by operating various software buttons and so forth in the regions 212 in a quite similar manner as in the region 112 using the mouse of the operation section 32 or the like.

Figure 30:
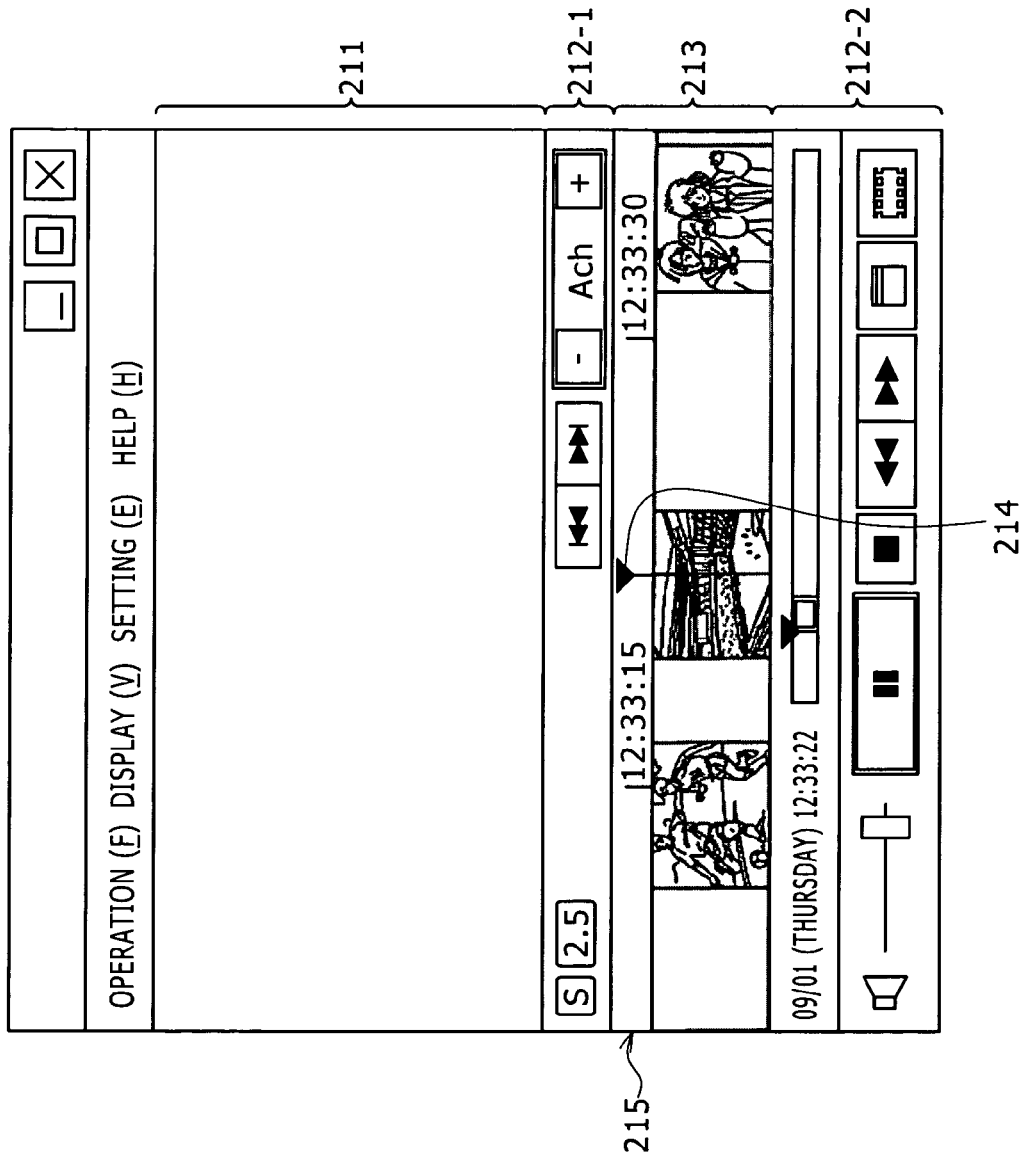

Further, the reproduction image 201 includes a region 213 in which thumbnail images of reproduction programs are to be displayed. The region 213 includes a slider 214 therein which indicates the reproduction position of the reproduction program, and a particular reproduction position is displayed in a region 215. Also the display form of the reproduction position in the region 215 may be such relative time as illustrated in FIG. 29 or such absolute time as illustrated in FIG. 30. The user can select any of the display forms freely and at any time by performing a predetermined operation using the mouse or the like.

As described above, in the information processing system of FIG. 1, each recorded program in the HDD 13 of the recording and reproduction apparatus 1 or the HDD 34 of the personal computer 2 can be reproduced from any of the television receiver 5 and the reproduction section 38 of the personal computer 2 which includes a display unit, a speaker and so forth.

Accordingly, if the reproduction control section 17 of the recording and reproduction apparatus 1 and the reproduction control section 37 of the personal computer 2 execute a suitable communication process therebetween, then synchronous reproduction of the same program by the reproduction section 38 of the personal computer 2 and the television receiver 5 can be implemented.

That such synchronous reproduction as described above can be implemented signifies that, from a point of view of an operation of the user, the user can perform a reproduction instruction operation or a reproduction control instruction operation of a desired program such as an instruction operation for stopping, fast feeding, rewinding, variable speed reproduction, temporary stopping or the like making use of the remote controller 6 while viewing the television receiver 5 and besides can perform such operations making use of the operation section 32 of the personal computer 2 such as a mouse while viewing the reproduction section 38 of the personal computer 2 such as a display unit. Further, from a point of view of enjoyment of the user, that the synchronous reduction can be implemented signifies that the user can enjoy a reproduction program on the television receiver 5 and also enjoy a reproduction program on the reproduction section 38 of the personal computer 2 such a display unit.

Accordingly, from the foregoing substance, the following first to fifth advantages can be achieved.

In particular, generally the television receiver 5 has a characteristic that the resolution is low when compared with the display unit or the like of the reproduction section 38 of the personal computer 2 and is limited in the display amount of a list of the substance of a plurality of recorded programs such as the past program table of FIG. 5, that is, the number of items of the substance of recorded programs which can be displayed at a time. The items of the substance of recorded programs here are display listings in the past program table in FIG. 5. Accordingly, where the user makes use of the remote controller 6 to perform a reproduction instruction operation of a desired recorded program while viewing the television receiver 5, it is difficult for the user to find out the desired recorded program from within the list of items of the substance of a comparatively small number of recorded programs displayed on the television receiver 5.

In contrast, the display unit of the reproduction section 38 of the personal computer 2 or the like has a characteristic that, since the resolution is high when compared with the television receiver 5, the display amount of the list of items of the substance of a plurality of recorded programs can be increased, that is, a greater number of items of the substance of recorded programs can be displayed at a time. As a result, a first effect can be exhibited that, to the user, the observability at a glance is enhanced to make it possible for the user to find out of a desired recorded program. It is to be noted that such a first advantage as just described is hereinafter referred to as glanceability enhancement advantage.

On the other hand, where the user performs a reproduction instruction operation of a desired recorded program making use of the remote controller 6 while viewing the television receiver 5, it is difficult or very difficult for the user to input a character using the remote controller 6. As a result, it is difficult for the user to perform a filtering or searching operation based on a character string.

In contrast, the operation section 32 of the personal computer 2 usually includes a mouse and a keyboard, and the foregoing description is based on this precondition. Therefore, the user can easily perform a filtering or searching operation based on a character string utilizing the mouse or the keyboard. Therefore, a second advantage that the user can easily find out a desired recorded program can be achieved. It is to be noted that the second advantage just described is hereinafter referred to as searchability enhancement advantage.

Further, as described hereinabove, a recorded program is recorded in the form of compressed content data compressed by an MPEG system or the like in the HDD 13 shown in FIG. 1 or the like. Accordingly, in order to reproduce a recorded program, a decoding process for the compressed content data is required.

The decoding process is performed, in the personal computer 2, by the reproduction control section 37. However, the reproduction control section 37 is frequently configured as software which is executed by a CPU (Central Processing Unit) itself. In this instance, if the performance of the CPU is low, then much time is required for the decoding process. Therefore, for example, where the recorded program is formed from an image having a high resolution and having a comparatively great information amount, it is difficult to smoothly reproduce the image. Further, depending upon the combination of the type of the image and the CPU, a miss of a frame occurs with the image, and normal reproduction cannot be anticipated.

In contrast, since generally the decoding section 18 of the recording and reproduction apparatus 1 is frequently formed from hardware for exclusive use, normal reproduction can normally be anticipated as a rule. In other words, a third advantage that clear reproduction can be anticipated by entrusting the hardware of the recording and reproduction apparatus 1 with the reproduction of an image can be achieved. It is to be noted that the third advantage just described is hereinafter referred to as CPU performance dependency elimination effect.

Further, as described hereinabove, in the present embodiment, such a reproduction instruction operation as to designate particular time, which may be absolute time or may be relative time where the top position of a recorded program of a reproduction object is set as reference time 00:00, and start reproduction from the designated position can be performed.

Where such a reproduction instruction operation as just described is performed, the user must perform such a cumbersome time-consuming operation as described below. In particular, where the remote controller 6 is utilized, the user causes the channel selection image 71 of FIG. 7 to be displayed and then depresses the date changing button 85 or the time changing button 86 in the channel selection image 71. Then, the user successively depresses suitable ones of the buttons from the date + button 60 to the time − button 63 shown in FIG. 6 until the reproduction starting absolute time or designated absolute time displayed in the display region 83 in the channel selection image 71 comes to indicate desired time. Then, when the desired time is reached, the user depresses the determination button of the remote controller 6 in the channel selection image 71.

In contrast, when the personal computer 2 is utilized, it is necessary for the user to perform such a simple operation as to move the slider 122 in the image 101 of FIGS. 25 to 28 by means of the mouse of the operation section 32 or the like.

In particular, where the user wants to perform such a complicated reproduction instruction operation, the user should utilize, as an operation apparatus therefor, the personal computer 2 which can be operated comparatively simply.

On the other hand, where the user wants to perform a simple reproduction control operation as an instruction operation for temporary stopping, fast feeding, rewinding or stopping as described above, the user should use the remote controller 6 which can be handled easily.

Thus, a fourth advantage that the remote controller 6 and the personal computer 2 can be used selectively depending upon the type of an operation as described above can be achieved. It is to be noted that the fourth advantage just described is hereinafter referred to as operability enhancement advantage.

It is to be noted that, in this instance, although it is possible to adopt a technique that both of the remote controller 6 and the personal computer 2 accept the same operation, the present embodiment adopts a different technique that, when an operation is performed on the personal computer 2 side, an operation of the remote controller 6 is not accepted. The last-mentioned technique is hereinafter referred to as exclusive operation technique.

Further, the user can utilize two display apparatus including the display unit or the like of the reproduction section 38 and the television receiver 5. Accordingly, the user can perform such an operation as to utilize, during reproduction of a predetermined program on the television receiver 5 side, the personal computer 2 as an operation apparatus to select a program different from the predetermined program or to designate a reproduction starting position of a different program. When such an operation as just described is performed, the preproduction of the predetermined program on the television receiver 5 is not disturbed, that is, an image necessary for an operation is not displayed specifically. Therefore, a fifth advantage that such an operation as described above does not disturb another user who is enjoying the predetermined program on the television receiver 5 can be anticipated. It is to be noted that the fifth advantage just described is hereinafter referred to as double display apparatus effect.

In the following, a flow of operations of the user for making it possible to achieve such various advantages as described above is described in connection with two particular examples.

In the first particular example, when the user is to perform a reproduction instruction operation of selecting a reproduction object program and issuing an instruction to start reproduction of the reproduction object program, the personal computer 2 is utilized. However, when a reproduction control operation of the reproduction object program is to be performed, the remote controller 6 is utilized. In the present example, after reproduction of the reproduction object program, no operation by the personal computer 2 is required. Further, the present example can achieve at least four ones of the five advantages described above except the double display apparatus advantage.

In particular, for example, the user would utilize the mouse of the operation section 32 of the personal computer 2 or the like to display the past program table described hereinabove with reference to FIG. 5 on the display unit of the reproduction section 38 of the personal computer 2 or the like.

Figure 31:
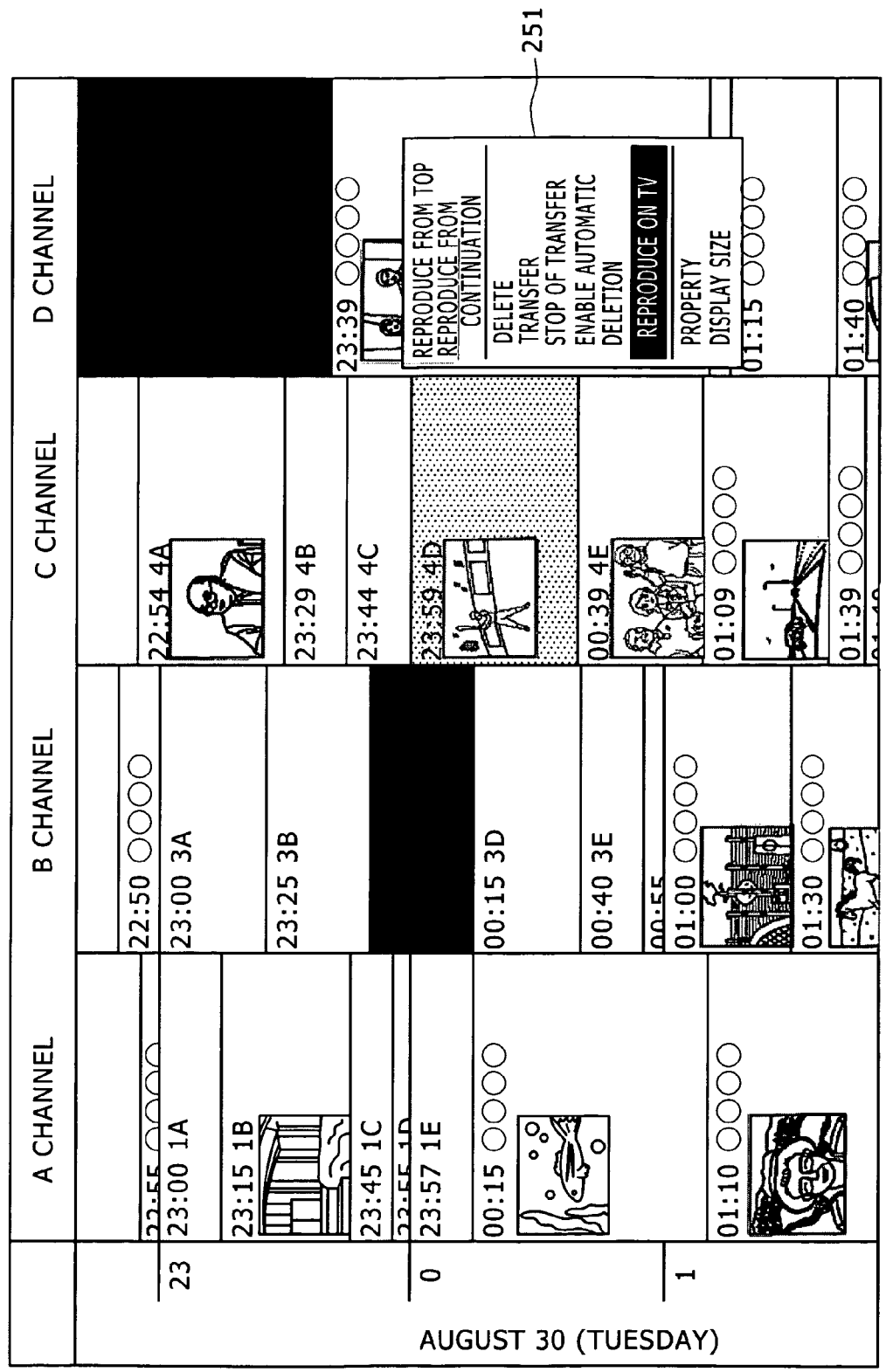
FIGS. 31 and 32 are views illustrating a user operation to be executed when reproduction synchronism is to be established between the personal computer and the recording and reproduction apparatus shown in FIG. 1.

Then, the user would search for a program listing of the reproduction object program from among a plurality of program listings which form the past program table and dispose the pointer of the mouse on the program listing of the reproduction object program. Then, the user would perform a right clicking operation. Consequently, for example, as seen in FIG. 31, the display color of the program listing of the preproduction object program changes, and a menu 251 is displayed rightwardly of the program listing of the reproduction object program. In the example of FIG. 31, the display color of the program listing of the "program 4D" of the C channel changes to a gray color.

In this state, the user would select the "reproduction on TV" in the menu 251 making use of the mouse or the like. As a result, an instruction to start reproduction of the reproduction object program is inputted.

The series of user operations described above makes a reproduction instruction operation.

If such a reproduction instruction operation as just described is performed, then the reproduction object program is reproduced by the television receiver 5. Accordingly, the user would thereafter utilize the remote controller 6 to suitably perform a reproduction control operation.

In contrast to such a first particular example as described above, the second particular example is such as follows. In particular, when the user is to perform a reproduction instruction operation of selecting a reproduction object program and issuing an instruction to start reproduction of the reproduction object program, the user would use the personal computer 2. This is similar to that in the case of the first particular example. However, where the reproduction control operation regarding the reproduction object program is to be performed, the user would utilize the personal computer 2, different from the first particular example. According to the present example, at least four ones of the five advantages described hereinabove except the operability enhancement advantage can be achieved.

In particular, for example, the reproduction instruction operation itself is quite similar to that of the first particular example. However, if such a reproduction instruction operation is performed, then in the second particular example, the reproduction object program is reproduced by the display unit of the reproduction section 38 of the personal computer 2 or the like. In other words, an image which forms the reproduction object program is displayed, for example, in the region 111 of the image 101 of FIG. 25 and so forth.

Figure 32:
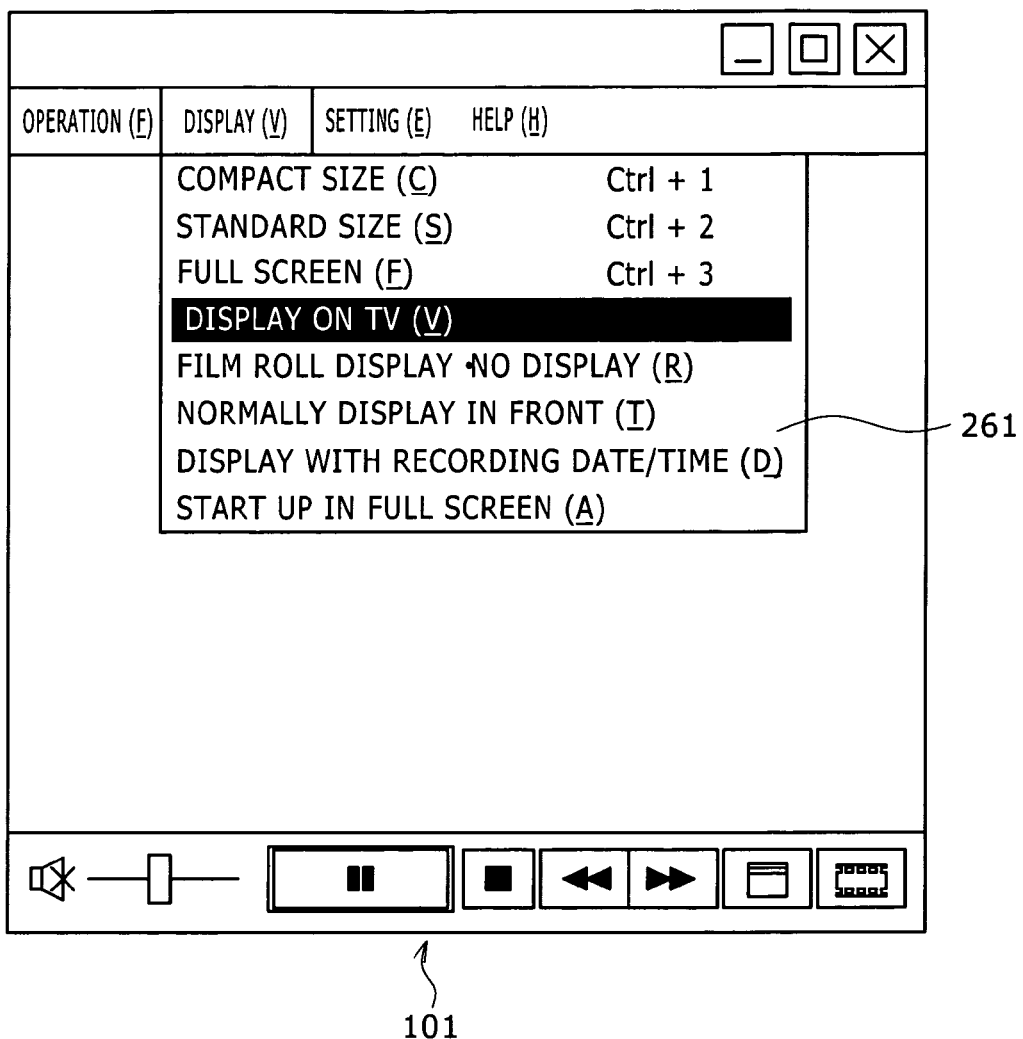

Therefore, the user would utilize the mouse of the operation section 32 of the personal computer 2 or the like to display, for example, a menu 261 shown in FIG. 32 on the image 101.

Then, the user would utilize the mouse or the like to select or check the "display on TV" in the menu 261. Consequently, reproduction of the reproduction object program is started also on the television receiver 5 side. Thereupon, the display substance of the region 111 of the image 101 on the personal computer 2 side is not restricted specifically, and an image which forms the reproduction object program may continue to be displayed or a fixed message such as "displayed on TV" may be left displayed.

Thereafter, the user would suitably perform a reproduction control operation making use of the image 101 on the personal computer 2.

It is to be noted that, if the selection or check of "display on TV" in the menu 261 is maintained, then upon a next reproduction instruction operation, the reproduction object program can be reproduced from the beginning on the television receiver 5 side.

As described above, when the user wants to utilize the remote controller 6 to perform a reproduction control operation, the user should basically adopt the first particular example. However, when the user wants to utilize the personal computer 2 to perform a reproduction control operation, the user should basically adopt the second particular example.

However, the present embodiment is configured such that, even where the second particular example is adopted, if the communication between the personal computer 2 and the recording and reproduction apparatus 1 is interrupted, then a reproduction control operation by the remote controller 6 is enabled or permitted. In the present embodiment, the communication is interrupted if the user ends the processing of the reproduction control section 37 of the personal computer 2. In this instance, where the reproduction control section 37 is configured as software, the software is ended. The communication is interrupted also when the selection of the "display on TV" in the menu 261 is canceled, that is, when the check is removed from the "display on TV." It is to be noted that a particular example of the communication is hereinafter described with reference to FIGS. 34 and 35.

Now, a communication process between the recording and reproduction apparatus 1 and the personal computer 2 in the information processing system of FIG. 1 when a user operation is performed on the personal computer 2 side, or in other words, when reproduction control of the television receiver 5 is executed subjectively by the reproduction control section 37 side of the personal computer 2, is described.

Such a communication process as just mentioned is implemented by communication performed by the reproduction control section 37 of the personal computer 2 and the reproduction control section 17 of the recording and reproduction apparatus 1 through the respective communication sections 33 and 19. In the present embodiment, information transferred by the communication is principally such as described below.

In particular, an operation command is issued or transmitted from the reproduction control section 37 of the personal computer 2 to the reproduction control section 17 of the recording and reproduction apparatus 1. Such operation commands as, for example, a play (reproduction) command, a stop (stopping) command, a fwd (fast feeding) command, a rew (rewinding) command, a lang (main/sub voice changing over) command and a pause (temporary stopping) command are used.

Figure 33:
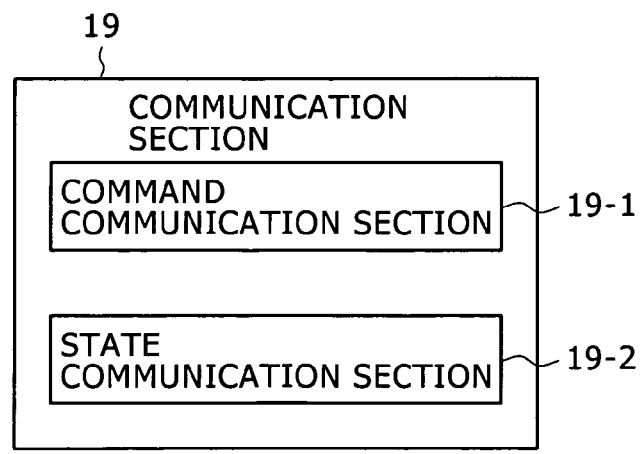
FIG. 33 is a functional block diagram showing an example of a detailed functional configuration of a communication section of the recording and reproduction apparatus shown in FIG. 1 where the personal computer and the recording and reproduction apparatus shown in FIG. 1 perform reproduction synchronization.

More accurately, for example, in the present embodiment, such a command communication section 19-1 and a state communication section 19-2 as shown in FIG. 33 are provided in the communication section 19 of the recording and reproduction apparatus 1 side. The command communication section 19-1 receives an operation command itself issued or transmitted from the reproduction control section 37 of the personal computer 2 and interprets the operation command. Then, the command communication section 19-1 issues an instruction which is a result of the interpretation to the reproduction control section 17 of the recording and reproduction apparatus 1.

Consequently, the reproduction control section 17 executes a process in accordance with the instruction from the command communication section 19-1. Further, the reproduction control section 17 provides a predetermined return value to the command communication section 19-1 as a response to the operation command from the reproduction control section 37 of the personal computer 2. Consequently, the command communication section 19-1 transmits the return value to the reproduction control section 37 through the communication section 33 of the personal computer 2.

In this manner, the command communication section 19-1 of the communication section 19 has a function as a mediator of an operation command between the reproduction control section 17 of the recording and reproduction apparatus 1 and the reproduction control section 37 of the personal computer 2.

Meanwhile, the state communication section 19-2 of the communication section 19 transmits a notification notify provided from the reproduction control section 17 of the recording and reproduction apparatus 1 to the reproduction control section 37 through the communication section 33 of the personal computer 2. In particular, the state communication section 19-2 has a function of keeping a state notification connection between the reproduction control section 17 of the recording and reproduction apparatus 1 and the reproduction control section 37 of the personal computer 2 in an established state. In this instance, if the state of the reproduction process of a reproduction object program or the state of the recording and reproduction apparatus 1 itself varies, then the reproduction control section 17 of the recording and reproduction apparatus 1 transmits the notification notify to the reproduction control section 37 via the communication section 33 of the personal computer 2 through the state notification connection by the state communication section 19-2. It is to be noted that the state of the reproduction process of a reproduction object program is hereinafter referred to also as state of a content.

The notification notify may be, for example, playtime representative of relative time indicative of the reproduction position at present of the reproduction object program by the recording and reproduction apparatus 1, audiomode representative of changeover of a sound mode (stereo, monaural, main/sub), state representative of a variation of the state, warning representative of occurrence of an abnormal state such as placement of the power supply into an off state, or the like. It is to be noted that the notification playtime is transmitted periodically, for example, in the present embodiment, at intervals of one second. Meanwhile, the notification state may be play representative of transition into a reproduction state, fwd representative of transition into a fast feeding state, rew representative of transition into a rewinding state, pause representative of transition into a temporary stopping state, stop representative of transition into a stopping state, last representative of arrival of the reproduction position at present of a reproduction object program by the recording and reproduction apparatus 1 at the last position, ready representative of entrance into a ready state so that a command can be accepted later, or the like.

If the reproduction control section 37 of the personal computer 2 receives any of the notifications notify, then it immediately reflects the substance of the notification notify on a reproduction image such as the image 101 shown in FIG. 25 and so forth reproduced by the reproduction section 38. Consequently, synchronism between the television receiver 5 and the reproduction section 38 can be established with regard to the reproduction state of the preproduction object program.

In the following, particular examples of a communication process performed between the reproduction control section 17 of the recording and reproduction apparatus 1 and the reproduction control section 37 of the personal computer 2 are described with reference to FIGS. 34 and 35.

FIG. 34 illustrates an example of the process where the user utilizes the personal computer 2 to perform a reproduction instruction operation, that is, where reproduction on the television receiver 5 side is executed subjectively by the reproduction control section 37 of the personal computer 2.

Referring to FIG. 34, at step S101, the reproduction control section 37 of the personal computer 2 transmits a command locktv for acquiring the right of reproduction by the television receiver 5 to the command communication section 19-1 of the communication section 19 of the recording and reproduction apparatus 1. It is to be noted that, while various kinds of information to be transferred between the reproduction control section 37 and the reproduction control section 17 are transmitted through the communication section 33, the following description is given such that description of such intervention of the communication section 33 is omitted.

At step S102, the command communication section 19-1 issues an instruction locktv which is a result of interpretation of the command locktv to the reproduction control section 17.

Consequently, at step S103, the reproduction control section 17 provides a return value ok representative of acceptance of the instruction locktv to the command communication section 19-1 of the communication section 19. At step S104, the command communication section 19-1 transmits the return value ok to the reproduction control section 37.

It is to be noted that, though not shown in FIG. 34, if a different program is reproduced on the television receiver 5 by reproduction control of reproduction software or the like of another personal computer, then the reproduction control section 17 returns an error value as a return value in place of the return value ok. In this instance, the reproduction control section 37 (reproduction software or the like) of the personal computer 2 which has tried to perform reproduction control later inhibits reproduction control in the television receiver 5.

A result which represents whether or not the reproduction right can be acquired in response to the command locktv, that is, a return value ok or an error value, is in most cases returned immediately to the reproduction control section 37. However, if a different program is being reproduced on the television receiver 5 side at the point of time, then time is required for an ending process of the different program. Therefore, the reproduction control section 37 does not execute the process immediately after it acquires the return value ok, but further waits that the notification ready is sent thereto.

In particular, after the reproduction control section 17 ends the execution of the ending process and so forth of the different program and completes preparations, it provides the notification ready to the state communication section 19-2 at step S105. At step S106, the state communication section 19-2 transmits the notification ready to the reproduction control section 37.

When the notification ready is sent to the reproduction control section 37 in this manner, the reproduction control section 37 is substantially enabled to execute reproduction control on the television receiver 5. Therefore, at step S107, the reproduction control section 37 transmits the reproduction command play regarding the reproduction object program to the command communication section 19-1. At step S108, the command communication section 19-1 issues the instruction play, which is a result of interpretation of the command play, to the reproduction control section 17.

At step S109, the reproduction control section 17 provides a return value ok representative of acceptance of the instruction play to the command communication section 19-1. At step S110, the command communication section 19-1 transmits the return value ok to the reproduction control section 37.

Further, the reproduction control section 17 controls reproduction of the reproduction object program on the television receiver 5 in accordance with the instruction play. Consequently, the state of the content changes to a reproduction state. Therefore, at step S111, the reproduction control section 17 provides a notification state=play representative of the change to the state communication section 19-2 of the communication section 19. At step S112, the state communication section 19-2 transmits the notification state=play to the reproduction control section 37.

Further, at step S113, the reproduction control section 17 provides a notification playtime to the state communication section 19-2. At step S114, the state communication section 19-2 transmits the notification playtime to the reproduction control section 37.

It is to be noted that, while, in the example of FIG. 34, the notification playtime is transmitted only once, actually it is transmitted periodically, in the present embodiment, at intervals of one second, as described hereinabove.

Further, at step S115, the reproduction control section 17 provides a notification audiomode for the notification of an audio mode to the state communication section 19-2. At step S116, the state communication section 19-2 transmits the notification audiomode to the reproduction control section 37.

It is to be noted that, although, in the example of FIG. 34, the notification audiomode is transmitted only once, actually it is transmitted every time the audio mode is changed.

In the meantime, where a reproduction control operation is performed through the operation section 32 of the personal computer 2, the reproduction control section 37 issues a command corresponding to the reproduction control operation such as, for example, a stop (stopping) command, a fwd (fast feeding) command, a rew (rewinding) command, a lang (voice changing over) command and a pause (temporary stopping) similarly to the instruction play. However, a particular example wherein the command fwd is issued is hereinafter described with reference to FIG. 35.

Meanwhile, if some state varies on the recording and reproduction apparatus 1 side, then a notification state representative of the state variation is transmitted from the reproduction control section 17 to the reproduction control section 37.

For example, if reproduction of a reproduction object program is performed up to the tail end of the reproduction object program, then the state of the content changes to a stopping state. In this instance, at step S117, the reproduction control section 17 provides a notification state indicative of the change to the state communication section 19-2. At step S118, the state communication section 19-2 transmits a notification state=stop to the reproduction control section 37.

After reproduction of the reproduction object program ends in this manner, if no different program is to be reproduced, the reproduction control section 37 transmits a command unlocktv for abandoning the right of reproduction on the television receiver 5 to the command communication section 19-1. At step S120, the command communication section 19-1 issues an instruction unlocktv, which is a result of interpretation of the command unlocktv, to the reproduction control section 17.

At step S121, the reproduction control section 17 provides a return value ok representative of acceptance of the instruction unlocktv to the command communication section 19-1. At step S122, the state communication section 19-2 transmits the return value ok to the reproduction control section 37.

On the other hand, after reproduction of the reproduction object program ends, if reproduction of a different program is to be controlled continuously, then the reproduction control section 37 repetitively executes the processes at the steps beginning with step S107. In other words, the reproduction control section 37 issues a command play with regard to the different program.

Now, an example of a process where an instruction operation, for example, for fast feeding is performed as a reproduction control operation by the operation section 32 of the personal computer 2 while a reproduction object program is being reproduced on the television receiver 5 side is described with reference to FIG. 35.

Though not illustrated in FIG. 35, if processes similar to those at steps S101 to S110 of FIG. 34 are executed, then a notification state=play is transmitted from the reproduction control section 17 to the reproduction control section 37 at steps S201 and S202 similarly as at steps S111 and S112 of FIG. 34, respectively.

In particular, the processes at steps beginning with step S203 of FIG. 35 represent another particular example of the processes executed at the steps beginning with step S112 of FIG. 34.

In the example of FIG. 35, a fast feeding instruction operation is performed by the user as described hereinabove. In this instance, at step S203, the reproduction control section 37 transmits a fast feeding command fwd to the command communication section 19-1. At step S204, the command communication section 19-1 issues an instruction fwd, which is a result of interpretation of the command fwd, to the reproduction control section 17.

At step S205, the reproduction control section 17 provides a return value ok indicative of acceptance of the instruction fwd to the command communication section 19-1. At step S206, the command communication section 19-1 transmits the return value ok to the reproduction control section 37.

Further, the reproduction control section 17 controls fast feeding of the reproduction object program in accordance with the instruction fwd. Consequently, the state of the content changes to a fast feeding state. In this instance, at step S207, the reproduction control section 17 provides a notification state=fwd representative of the change to the state communication section 19-2. At step S208, the state communication section 19-2 transmits a notification state=fwd to the reproduction control section 37.

At step S209, the reproduction control section 17 provides a notification playtime to the state communication section 19-2. At step S210, the state communication section 19-2 transmits the notification playtime to the reproduction control section 37.

Thereafter, the reproduction control section 17 periodically transmits the notification playtime, in the present embodiment, at intervals of one second. However, while fast feeding is performed, the reproduction time transmitted at intervals of one second increases in response to the speed of the fast feeding.

In particular, for example, it is assumed that a notification of time of 5 minutes and 30 seconds as a notification playtime is issued to the reproduction control section 37 by the processes at steps S209 and S210. Also it is assumed that the speed of fast feeding is 20 times that of normal feeding.

In this instance, by the processes at next steps S211 and S212 one minute later, time obtained by adding 20 seconds to the reproduction time playtime in the notification by the processes at steps S209 and S210, here, time of 5 minutes and 50 seconds, is conveyed as the notification playtime to the reproduction control section 37.

Similarly, by the processes at next steps S213 and S214 one minute later, time obtained by adding 20 seconds to the reproduction time playtime conveyed by the processes at immediately preceding steps S211 and 212, here, time of 6 minutes and 10 seconds, is conveyed as the notification playtime to the reproduction control section 37.

Meanwhile, every time the notification of the reproduction time playtime is received, the reproduction control section 37 successively updates the reproduction image to be displayed on the reproduction section 38, for example, the display substance of the image 101 of FIG. 25 or the like, based on the reproduction time of the received notification. In particular, the reproduction control section 37 successively updates the display substance in the region 121 shown in FIG. 25 and the position of the slider 122 so as to correspond to the reproduction time of the received notification. By the updating, the reproduction control section 37 can establish and keep synchronism with the reproduction state of the television receiver 5.

Thereafter, if a reproduction instruction operation for normal reproduction is performed by the user, then the reproduction control section 37 sends a reproduction command play to the command communication section 19-1 at step S216. The command communication section 19-1 issues an instruction play, which is a result of interpretation of the command play, to the reproduction control section 17.

At step S217, the reproduction control section 17 provides a return value ok representative of acceptance of the instruction play to the command communication section 19-1. At step S218, the command communication section 19-1 transmits the return value ok to the reproduction control section 37.

Further, the reproduction control section 17 controls reproduction of the reproduction object program at a normal speed in accordance with the instruction play. Consequently, the state of the content changes from a fast feeding state to a reproduction state again. Thus, at step S219, the reproduction control section 17 provides a notification state=play representative of the change to the state notification section 19-2. At step S220, the state notification section 19-2 transmits the notification state=play to the reproduction control section 37.

It is to be noted that, although there is no relationship to a fast feeding operation, it is assumed that the user stops the process of the reproduction control section 37 of the personal computer 2 or cancels the selection of, that is, removes the check from, the "display on TV" in the menu 261 shown in FIG. 32. Where the reproduction control section 37 is formed from software, the software is ended to end the process of the reproduction control section 37.

In this instance, at step S221, the reproduction control section 37 transmits a command unlocktv for abandoning the right of reproduction on the television receiver 5 to the command communication section 19-1. At step S222, the command communication section 19-1 issues an instruction unlocktv, which is a result of interpretation of the command unlocktv, to the reproduction control section 17.

At step S223, the reproduction control section 17 provides a return value ok representative of acceptance of the instruction unlocktv to the command communication section 19-1. At step S224, the command communication section 19-1 transmits the return value ok to the reproduction control section 37.

In this instance, however, different from the example of FIG. 34, reproduction of the reproduction object program on the television receiver 5 side is continued as it is. Accordingly, for the processes at the steps beginning with step S224 of the example of FIG. 35, the user can utilize the remote controller 6 to perform a reproduction control operation of the reproduction object program.

While the series of processes described above can be executed by hardware, it may otherwise be executed by software. Where the series of processes is executed by software, a program which constructs the software is installed from a program recording medium into a computer incorporated in hardware for exclusive use or, for example, a personal computer for universal use which can execute various functions by installing various programs.

FIG. 36 is a block diagram showing an example of a configuration of a personal computer which executes the series of processes described hereinabove in accordance with a program. In particular, the entirety or part (for example, the reproduction control section 17 and so forth described hereinabove) of the recording and reproduction apparatus 1 described hereinabove with reference to FIG. 1 can be configured also as a personal computer of the configuration shown in FIG. 36. By the same token, the personal computer 2 shown in FIG. 1 can be configured as a personal computer shown in FIG. 36.

Referring to FIG. 36, a central processing unit (CPU) 301 executes various processes in accordance with a program stored in a read only memory (ROM) 302 or a storage section 308. A program to be executed by the CPU 301, data and so forth are suitably stored into a random access memory (RAM) 303. The CPU 301, ROM 302 and RAM 303 are connected to one another by a bus 304.

Also an input/output interface 305 is connected to the CPU 301 through the bus 304. An inputting section 306 including a keyboard, a mouse, a microphone and so forth and an outputting section 307 including a display unit, a speaker and so forth are connected to the input/output interface 305. The CPU 301 executes various processes in accordance with an instruction inputted from the inputting section 306. Then, the CPU 301 outputs a result of the processes to the outputting section 307.

A storage section 308 formed from a hard disk or the like is connected to the input/output interface 305 and stores a program to be executed by the CPU 301 and various data. A communication section 309 communicates with an external apparatus connected thereto through a network such as the Internet and/or a local area network.

A program may be acquired through the communication section 309 and stored into the storage section 308.

A drive 310 is connected to the input/output interface 305. When a removable medium 311 such as a magnetic disk, an optical disk, a magneto-optical disk, a semiconductor memory or the like is suitably loaded into the drive 310, the drive 310 drives the removable medium 311. Thereupon, the drive 310 acquires a program, data and so forth recorded on the removable medium 311. The acquired program or data are transferred to and stored into the storage section 308 as occasion demands.

Further, when the removable medium 111 is loaded into the drive 310, the drive 310 may drive the removable medium 111 and record data and so forth on the removable medium 111.

The program recording medium on which a program to be installed into a computer and placed into an executable condition by the computer is recorded may be, for example, as shown in FIG. 36, a removable medium 311 in the form of a package medium formed from a magnetic disk (including a flexible disk), an optical disk (including a CD-ROM (Compact Disk-Read Only Memory) and a DVD (Digital Versatile Disk)), a magneto-optical disk, or a semiconductor memory. Else, the program recording medium may be formed as the ROM 302, a hard disk included in the storage section 308 or the like in which the program is recorded temporarily or permanently. Storage of the program into the program recording medium is performed, as occasion demands, through the communication section 309 which is an interface such as a router and a modem, making use of a wired or wireless communication medium such as a local area network, the Internet or a digital satellite broadcast.

Further, while the recording designation of a content is, in the example described hereinabove, the HDD, it is not limited specifically. For example, the removable medium 311 or the like may be used as the recording designation.

It is to be noted that, in the present specification, the steps which describe the program recorded in a program recording medium may be but need not necessarily be processed in a time series in the order as described, and include processes which are executed in parallel or individually without being processed in a time series.

Further, in the present specification, the term "system" is used to represent an entire apparatus composed of a plurality of devices or apparatus.

While preferred embodiments of the present invention have been described using specific terms, such description is for illustrative purpose only, and it is to be understood that changes and variations may be made without departing from the spirit or scope of the following claims.

What is claimed is:

1. An information processing apparatus for controlling reproduction of a plurality of recorded contents, comprising:
    means for reproducing a first recorded content item of a first channel at a user-designated reproduction starting absolute time and, when, during the reproduction of the first recorded content item, a reproduction channel changeover is user-designated by a single operation at a changeover instruction absolute time, reproducing a second recorded content item of a second channel that was recorded during a broadcast time interval overlapping with a broadcast time interval of the first recorded content item, the first and second recorded content items being content items which were previously recorded in their entirety; and
    means for decoding content items reproduced by said means for reproducing.

2. The information processing apparatus according to claim 1, wherein said means for reproducing includes means for reproducing the second recorded content item at a recording time position corresponding to the changeover instruction absolute time relative to the reproduction starting absolute time of the first recorded content item.

3. The information processing apparatus according to claim 2, wherein said means for reproducing includes means for accepting commands from a means for remote operation and for controlling reproduction in accordance with the commands.

4. The information processing apparatus according to claim 3, wherein
    said means for remote operation includes a first operation element that outputs a first command to shift up by one and a second operation element that outputs a second command to shift down by one, and
    said means for reproducing includes means for determining a predetermined order of channels corresponding to distribution sources and determining, when the first command is received from said means for remote operation, a channel immediately succeeding the first channel in the predetermined order as the second channel and determining, when the second command is received from said means for remote operation, a channel immediately preceding the first channel in the predetermined order as the second channel.

5. The information processing apparatus according to claim 1, wherein said means for reproducing includes means for displaying a message that a recorded content item does not exist, when the reproduction channel changeover is user-designated by the single operation and no second recorded content item of the second channel was recorded during the broadcast time interval overlapping with the broadcast time interval of the first recorded content item.

6. The information processing apparatus according to claim 1, wherein said means for reproducing includes means for searching for and reproducing a third recorded content item of a third channel, when the reproduction channel changeover designates the second channel but no second recorded content item of the second channel was recorded during the broadcast time interval overlapping with the broadcast time interval of the first recorded content item.

7. An information processing method for an information processing apparatus for controlling reproduction of a plurality of recorded contents, comprising:
   reproducing a first recorded content item of a first channel at a user-designated reproduction starting absolute time, the first recorded content item being a content item which was previously recorded in its entirety;
   reproducing a second recorded content item of a second channel that was recorded during a broadcast time interval overlapping with a broadcast time interval of the first recorded content item, when, during said reproducing a first recorded content item, a reproduction channel changeover is user-designated by a single operation at a changeover instruction absolute time, the second recorded content item being a content item which was previously recorded in its entirety; and
   decoding, by an arithmetic processor, content items reproduced by said reproducing a first recorded content item and said reproducing a second recorded content item.

8. A non-transitory computer readable storage medium storing computer readable instructions thereon that, when executed by an arithmetic processor, direct the arithmetic processor to perform a method of reproduction of a plurality of recorded contents comprising:
   reproducing a first recorded content item of a first channel at a user-designated reproduction starting absolute time, the first recorded content item being a content item which was previously recorded in its entirety;
   reproducing a second recorded content item of a second channel that was recorded during a broadcast time interval overlapping with a broadcast time interval of the first recorded content item, when, during said reproducing a first recorded content item, a reproduction channel changeover is user-designated by a single operation at a changeover instruction absolute time, the second recorded content item being a content item which was previously recorded in its entirety; and
   decoding content items reproduced by said reproducing a first recorded content item and said reproducing a second recorded content item.

9. An information processing apparatus for controlling reproduction of a plurality of recorded contents comprising:
   a reproduction control section configured to reproduce a first recorded content item of a first channel at a user-designated reproduction starting absolute time and, when, during the reproduction of the first recorded content item, a reproduction channel changeover is user-designated by a single operation at a changeover instruction absolute time, reproduce a second recorded content item of a second channel that was recorded during a broadcast time interval overlapping with a broadcast time interval of the first recorded content item, the first and second recorded content items being content items which were previously recorded in their entirety; and
   a decoding section configured to decode content items reproduced by said reproduction control section.

* * * * *